United States Patent
Wang et al.

(10) Patent No.: US 9,467,700 B2
(45) Date of Patent: Oct. 11, 2016

(54) NON-ENTROPY ENCODED REPRESENTATION FORMAT

(71) Applicant: QUALCOMM Incorporated, San Diego, CA (US)

(72) Inventors: Ye-Kui Wang, San Diego, CA (US); Ying Chen, San Diego, CA (US); Adarsh Krishnan Ramasubramonian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 373 days.

(21) Appl. No.: 14/247,066

(22) Filed: Apr. 7, 2014

(65) Prior Publication Data

US 2014/0301483 A1    Oct. 9, 2014

Related U.S. Application Data

(60) Provisional application No. 61/809,858, filed on Apr. 8, 2013.

(51) Int. Cl.
*H04N 19/91* (2014.01)
*H04N 19/597* (2014.01)
*H04N 19/70* (2014.01)
*H04N 19/46* (2014.01)
(Continued)

(52) U.S. Cl.
CPC ........ *H04N 19/00951* (2013.01); *H04N 19/29* (2014.11); *H04N 19/30* (2014.11); *H04N 19/44* (2014.11); *H04N 19/46* (2014.11); *H04N 19/513* (2014.11); *H04N 19/597* (2014.11); *H04N 19/70* (2014.11); *H04N 19/91* (2014.11)

(58) Field of Classification Search
CPC ................ H04N 19/00951; H04N 19/00884; H04N 19/00533; H04N 19/00545
See application file for complete search history.

(56) References Cited

U.S. PATENT DOCUMENTS 6,301,428 B1  10/2001  Linzer
6,411,739 B2   6/2002  Boo
(Continued)

FOREIGN PATENT DOCUMENTS

EP    1385337 A1    1/2004
TW    201009701 A   3/2010
(Continued)

OTHER PUBLICATIONS

Jill, et al., "Adaptive Slice Parameter Set (APS)", JCT-VC of ITU-T SG16 WP3 and ISO/IEC JTC1/SC29/WG11 6th Meeting: Torino, IT, Jul. 14-22, 2011, JCTVC-F747, Jul. 17, 2011; 8 pp.
(Continued)

*Primary Examiner* — Dave Czekaj
*Assistant Examiner* — Nam Pham
(74) *Attorney, Agent, or Firm* — Shumaker & Sieffert, P.A.

(57) ABSTRACT

Systems, methods, and devices for coding multilayer video data are disclosed that may include encoding, decoding, transmitting, or receiving multilayer video data. The systems, methods, and devices may receive or transmit a non-entropy coded representation format within a video parameter set (VPS). The systems, methods, and devices may code (encode or decode) video data based on the non-entropy coded representation format within the VPS, wherein the representation format includes one or more of chroma format, whether different color planes are separately coded, picture width, picture height, luma bit depth, and chroma bit depth.

20 Claims, 13 Drawing Sheets

(51) Int. Cl.
  *H04N 19/513* (2014.01)
  *H04N 19/30* (2014.01)
  *H04N 19/44* (2014.01)
  *H04N 19/29* (2014.01)

(56) References Cited

U.S. PATENT DOCUMENTS

| | | |
|---|---|---|
| 6,661,358 B1 | 12/2003 | Hashimoto |
| 7,302,490 B1 | 11/2007 | Gupta et al. |
| 7,373,005 B2 | 5/2008 | Venkataraman |
| 7,724,818 B2 | 5/2010 | Hannuksela et al. |
| 7,742,524 B2 | 6/2010 | Jeon et al. |
| 7,848,407 B2 | 12/2010 | Yoon |
| 8,145,498 B2 | 3/2012 | Herre et al. |
| 8,891,619 B2 | 11/2014 | Leontaris et al. |
| 2001/0043654 A1 | 11/2001 | Yamazaki |
| 2001/0053182 A1 | 12/2001 | Ishiyama |
| 2004/0006575 A1 | 1/2004 | Visharam et al. |
| 2004/0261104 A1 | 12/2004 | Gordon |
| 2005/0069039 A1 | 3/2005 | Crinon |
| 2005/0254575 A1 | 11/2005 | Hannuksela et al. |
| 2005/0276323 A1 | 12/2005 | Martemyanov et al. |
| 2006/0039480 A1 | 2/2006 | Seo |
| 2006/0050793 A1 | 3/2006 | Wang et al. |
| 2006/0059426 A1 | 3/2006 | Ogikubo |
| 2006/0158355 A1 | 7/2006 | Jeon et al. |
| 2006/0233247 A1 | 10/2006 | Visharam |
| 2006/0239563 A1 | 10/2006 | Chebil |
| 2006/0242310 A1 | 10/2006 | Quah et al. |
| 2006/0256851 A1 | 11/2006 | Wang |
| 2006/0268166 A1 | 11/2006 | Bossen et al. |
| 2006/0294171 A1 | 12/2006 | Bossen et al. |
| 2007/0086521 A1 | 4/2007 | Wang |
| 2007/0171903 A1 | 7/2007 | Zeng |
| 2007/0177671 A1 | 8/2007 | Yang |
| 2007/0291836 A1 | 12/2007 | Shi |
| 2008/0144723 A1 | 6/2008 | Chen |
| 2008/0253671 A1 | 10/2008 | Choi et al. |
| 2009/0003431 A1 | 1/2009 | Zhu et al. |
| 2009/0022230 A1 | 1/2009 | Kirenko |
| 2009/0074060 A1 | 3/2009 | Kim et al. |
| 2010/0027654 A1 | 2/2010 | Jeon et al. |
| 2010/0091841 A1 | 4/2010 | Ishtiaq |
| 2010/0091881 A1 | 4/2010 | Pandit et al. |
| 2010/0131980 A1 | 5/2010 | Rodriguez |
| 2010/0132007 A1 | 5/2010 | Rodriguez |
| 2010/0153395 A1 | 6/2010 | Hannuksela |
| 2010/0189182 A1 | 7/2010 | Hannuksela |
| 2010/0195738 A1 | 8/2010 | Zhu et al. |
| 2010/0208796 A1 | 8/2010 | Luo et al. |
| 2010/0266042 A1 | 10/2010 | Koo et al. |
| 2011/0128923 A1 | 6/2011 | Cilli et al. |
| 2011/0150351 A1 | 6/2011 | Singh et al. |
| 2011/0274158 A1 | 11/2011 | Fu et al. |
| 2012/0057635 A1 | 3/2012 | Rusert et al. |
| 2012/0063515 A1 | 3/2012 | Panchal et al. |
| 2012/0092452 A1 | 4/2012 | Tourapis |
| 2012/0124633 A1 | 5/2012 | Lu et al. |
| 2012/0183060 A1 | 7/2012 | Hong |
| 2012/0183076 A1 | 7/2012 | Boyce |
| 2012/0230429 A1 | 9/2012 | Boyce |
| 2012/0230430 A1 | 9/2012 | Wenger |
| 2012/0230431 A1 | 9/2012 | Boyce |
| 2012/0236111 A1 | 9/2012 | Halavy et al. |
| 2013/0034170 A1 | 2/2013 | Chen et al. |
| 2013/0114670 A1 | 5/2013 | Chen et al. |
| 2013/0114694 A1 | 5/2013 | Chen et al. |
| 2013/0182755 A1 | 7/2013 | Chen et al. |
| 2013/0195201 A1 | 8/2013 | Boyce |
| 2014/0003491 A1 | 1/2014 | Chen et al. |
| 2014/0003492 A1 | 1/2014 | Chen et al. |
| 2014/0003493 A1 | 1/2014 | Chen et al. |
| 2014/0086332 A1 | 3/2014 | Wang |
| 2014/0218473 A1 | 8/2014 | Hannuksela |
| 2014/0301441 A1 | 10/2014 | Wang et al. |
| 2014/0301469 A1 | 10/2014 | Wang et al. |
| 2014/0301483 A1 | 10/2014 | Wang et al. |
| 2014/0301484 A1 | 10/2014 | Wang et al. |
| 2014/0307803 A1 | 10/2014 | Wang et al. |
| 2014/0341305 A1* | 11/2014 | Qu .................. H04N 19/30 375/240.26 |
| 2015/0117526 A1 | 4/2015 | Choi |
| 2015/0245063 A1 | 8/2015 | Rusanovskyy et al. |
| 2015/0326881 A1 | 11/2015 | Ikai et al. |

FOREIGN PATENT DOCUMENTS

| | | |
|---|---|---|
| WO | 2004010700 A1 | 1/2004 |
| WO | 2007114608 A1 | 10/2007 |
| WO | 2007126508 A2 | 11/2007 |
| WO | 2008085013 A1 | 7/2008 |
| WO | 2008088497 A2 | 7/2008 |
| WO | 2010086501 A1 | 8/2010 |
| WO | 2010126612 A1 | 11/2010 |
| WO | 2014056150 A1 | 4/2014 |

OTHER PUBLICATIONS

Tech, et al., "MV-HEVC Draft Text 3 (ISO/IEC 23008-2:201x/PDAM2)," JVT Meeting; MPEG Meeting; Jan. 17-23, 2013; Antalya, ;(Joint Video Team of ISO/IEC JTCIISC29NVG11 and ITU-T SG.16 ); No. JCT3V-C1004_d3, version 4; Mar. 27, 2013; 34 pp.

Bross, et al., "High Efficiency Video Coding (HEVC) text specification draft 9," JVT Meeting; MPEG Meeting; Oct. 10-19, 2012; Antalya, ;(Joint Video Team of ISO/IEC JTCIISC29NVG11 and ITU-T SG.16 ); No. JCTVC-K1003_v8, Nov. 7, 2012; 292 pp.

Bross, et al., "High Efficiency Video Coding (HEVC) text specification draft 10 (for FDIS & Consent)," JVT Meeting; MPEG Meeting; Jan. 14-23, 2013; Antalya, ;(Joint Video Team of ISOIIEC JTCIISC29NVG11 and ITU-T SG.16 ); No. JCTVC-L1003_v20, Feb. 12, 2013, 332 pp.

Chen, et al., "SHVC Draft Text 1," JVT Meeting; MPEG Meeting; Jan. 14-23, 2013; Antalya, ;(Joint Video Team of ISO/IEC JTCIISC29NVG11 and ITU-T SG.16 ); No. JCTVC-L1008, Mar. 20, 2013; 34 pp.

Boyce, et al., "High level syntax hooks for future extensions", JCT-VC Meeting; MPEG Meeting; Feb. 1-10, 2012; San Jose; (Joint Collaborative Team on Video Coding of ISO/IEC JTC1/SC29/WG11 and ITU-T SG.16); URL: http:// wftp3. itu.int/av-arch/jctvc-site/, No. JCTVC-H0388, XP030111415, 8 pp.

Boyce, et al., "NAL unit header and parameter Set designs for HEVC extensions", JCT-VC Meeting; MPEG Meeting; Oct. 10-19, 2012, Shanghai; (Joint Collaborative Team on Video Coding of ISO/IEC JTC1/SC29/WG11 and ITU-T SG.16); URL: http://wftp3.itu.int/av-arch/jctvc-site/, No. JCTVC-K1007, 8 pp.

Wang, et al., "AHG9: VPS and SPS designs in HEVC 3DV and scalable extensions", JCT-VC Meeting; MPEG Meeting; Apr. 18-26, 2013; Incheon; (Joint Collaborative Team on Video Coding of ISO/IEC JTC1/SC29/WG11 and ITU-T SG.16); URL: http://wftp3.itu.int/av-arch/jctvc-site/, No. JCTVC-M0268, 22 pp.

Chen, et al., "SHVC Working Draft 1", JCT-VC Meeting; MPEG Meeting; Jan. 14-23, 2013; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-L1008_v34, updated Mar. 20, 2013, XP030113953, 33 pp.

Chen, et al., "AHG10: On video parameter set for HEVC extensions," JCT-VC Meeting; MPEG Meeting; Jul. 11-20, 2012; Stockholm; (Joint Collaborative Team on Video Coding of ISO/IEC JTC1/SC29/WG11 and ITU-T SG.16); URL: http://wftp3.itu.int/av-arch/jctvc-site/, No. JCTVC-J0124, XP030112486, 15 pp.

Chen, et al., "AHG10: Video parameter set for HEVC base specification", JCT-VC Meeting; MPEG Meeting; Jul. 11-20, 2012; Stockholm; (Joint Collaborative Team on Video Coding of ISO/IEC JTC1/SC29/WG11 and ITU-T SG.16 ); URL: URL:http://wftp3.itu.int/av-arch/jctvc-site/, No. JCTVC-J0114,XP030112476, 15 pp.

Chen, et al., "AHG7: Target output views for MV-HEVC", JCT-3V Meeting; MPEG Meeting; Jan. 17-23, 2013; Geneva; (The Joint

(56) References Cited

OTHER PUBLICATIONS

Collaborative Team on 3D Video Coding Extension Development of ISO/IEC JTC1/SC29/WG11 and ITU-T SG.16); URL: http://phenix.int-evry.fr/jct2/, No. JCT3V-00059, XP030130475, 2 pp.

Deshpande "On Video Signal Information in VPS", JCT-3V Meeting; Oct. 23-Nov. 1, 2013; Geneva; (The Joint Collaborative Team on 3D Video Coding Extension Development of ISO/IEC JTC1/SC29/WG11 and ITU-T SG.16); URL:http://phenix.int-evry.fr/jct2/, No. JCT3V-F0063, XP030131470, 6 pp.

Ikai, et al., "AHG7: On VPS extension", JCT-3V Meeting; MPEG Meeting; Jan. 17-23, 2013; Geneva; (The Joint Collaborative Team on 3D Video Coding Extension Development of ISO/IEC JTC1/SC29/WG11 and ITU-T SG.16); URL: http://phenix.int-evry.fr/jct2/, No. JCT3V-00086, XP030130502, 6 pp.

Tech, et al., "MV-HEVC Draft Text 3", JCT-3V Meeting; MPEG Meeting, Jan. 17-23, 2013, Geneva, (The Joint Collaborative Team on 3D Video Coding Extension Development of ISO/IEC JTC1/SC29/WG11 and ITU-T SG.16 ), URL: http://phenix.int-evry.fr/jct2/, No. JCT3V-C1804, XP030130663, 27 pp.

Rusert, "On VPS extension design", JCT-VC Meeting; MPEG Meeting; Jan. 14-23, 2013; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-L0138, XP030113626, 7 pp.

Skupin et al., "3D-HLS: Design of the Video Parameter Set for 3D-HEVC", JCT-3V Meeting; MPEG Meeting; Jul. 16, 2012-Jul. 20, 2012; Stockholm; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-A0121, XP030130120, 10 pp.

Skupin, et al., "AHG9/AHG10: Design of the Video Parameter Set", JCT-VC Meeting; MPEG Meeting; Jul. 11-Jul. 20, 2012; Stockholm; (Joint Collaborative Team on Video Cooing of ISO/IEC JTC1/SC29/WG11 and ITU-T SG.16); URL: http://wftp3.itujnt/av-arch/jctvc-site/, No. JCTVC-J0257, XP030112619, 9 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Oct. 4, 2011, 226 pp.

Bross et al., "WD5: Working Draft 5 of High-Efficiency Video Coding," 7th Meeting: Geneva, Switzerland, Dec. 30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 9, 2012, JCTVC-J1003_d7, 261 pp.

Bross et al., "High efficiency video coding (HEVC) text specification draft 9," 11th Meeting: Shanghai, CN, Nov. 2, 2012, JCTVC-K1003_v7, 290 pp.

Bross et al., "High efficiency video coding (HEVC) text specification draft 10 (For FDIS & Last Call)," 12th Meeting: Geneva, CH, Mar. 19, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

International Search Report and Written Opinion from International Application No. PCT/US2014/033374, dated Aug. 1, 2014, 13 pp.

Response to Written Opinion dated Aug. 1, 2014 from International Application No. PCT/US2014/033374, filed on Feb. 6, 2015, 6 pp.

Second Written Opinion from International Application No. PCT/US2014/033374, dated Apr. 8, 2015, 8 pp.

International Application number from International Application No. PCT/US2014/033374, dated Jun. 30, 2015, 9 pp.

Boyce et al., "SEI message for sub-bitstream profile & level indicators," JCT-VC Meeting; MPEG Meeting; Geneva, CH; (Joint Collaborative Team on Video Coding of ISO/IEC JTC1/SC29/WG11 and ITU-T SG.16); URL: http:// wftp3 .itu .i nt/ a v -arch/-jctvc-site/, No. Document JCTVC-I0231, Apr. 27-May 7, 2012, 7 pp.

Boyce et al., "Extensible High Layer Syntax for Scalability," MPEG Meeting; Mar. 16-23, 2011; Geneva, CH; Motion Picture Expert Group or ISO/IEC JTC1/SC29/WG11), JCTVC-E279, XP030048373, 10 pp.

Bross et al., "Editors' proposed corrections to HEVC version 1," Joint Collaborative Team on Video Coding (JCT-VC) of ITU-T SG16 WP3 and ISO/IEC JTC1/SC29/WG11, 13th Meeting, Incheon, KR, Document JCTVC-M0432_v3, Apr. 18-26, 2013, 310 pp.

Bross et al., "High Efficiency video coding (HEVC) text specification draft 7," Draft of HEVC, Joint Collaborative Team on Video Coding (JCT-VC) of ITU-T SG16 WP3 and ISO/IEC JTC1/SC29/WG11, 9th Meeting, Geneva, CH Document JCTVC-I1003_d5, Apr. 27-May 7, 2012, 295 pp. [Uploaded in 3 parts].

Bross et al., "High Efficiency video coding (HEVC) text specification draft 7," Joint Collaborative Team on Video coding (JCT-VC) of ITU-T SG16 WP3 and ISO/IEC JTC1/SC29/WG11, Document JCTVC-I1003_d4, 9th Meeting: Geneva, CH, Apr. 27-May 7, 2012, 297 pp.

Bross et al., "High Efficiency Video Coding (HEVC) text specification draft 9," Joint Collaborative Team on Video coding (JCT-VC) of ITU-T SG16 WP3 and ISO/IEC JTC1/SC29/WG11, 11th Meeting: Shanghai, CN, Document: JCTVC_K1003_v10, Oct. 10-19, 2012, 306 pp.

Bross et al., "High efficiency video coding (HEVC) text specification draft 7," Joint Collaborative Team on Video Coding, JCTVC-11003_d2, Apr. 27-May 7, 2012, 290 pp.

Bross et al., "WD4: Working Draft 4 of High-Efficiency Video Coding," Joint Collaborative Team on Video Coding (JCT-VC) of ITU-T SG16 WP3 and ISO/IEC JTC1/SC29/WG11, Document JCTVC-F803_d1, 6th Meeting: Torino, IT, Jul. 14-22, 2011, 222 pp.

Bross et al., "WD4: Working Draft 4 of High-Efficiency Video Coding," Joint Collaborative Team on Video Coding, 6th Meeting, Torino, IT, JCTVC-F803_d2, Jul. 14-22, 2011, 226 pp.

Chen et al., "3D-HLS: Video parameter set for 3D-HEVC," JCT-3V Meeting; MPEG Meeting; Stockholm, SE; (The Joint Collaborative Team on 3D Video Coding Extension Development of ISO/IEC JTC1/SC29/WG11 and ITU-T SG.16); URL: http://phenix.int-evry.fr/jct2/,No. Document JCT2-A0099, Jul. 16-20, 2012, 15 pp.

Chen et al., "AHG12: Video parameter set and its use in 3D-HEVC," JCT-VC Meeting; MPEG Meeting; Geneva, CH; (Joint Collaborative Team on Video Coding of ISO/IEC JTC1/SC29/WG11 and ITU-T SG.16 ); URL: http://wftp3.itu.int/av-arch/jctvc-site/, No. Document JCTVC-I0571, Apr. 27-May 7, 2012, 9 pp.

Chen et al., "Unified NAL unit header design for HEVC and its extensions," JCT-VC Meeting; MPEG Meeting; Nov. 21-30, 2011;

(56) References Cited

OTHER PUBLICATIONS

Geneva, CH; (Joint Collaborative Team on Video Coding of ISO/IEC JTC1/SC29/WG11 and ITU-TSG. 16 ); URL: http:l/wftp3.1tu.int/av-arch/jctvc-site/, No. JCTVC-G336, XP030110320, 8 pp.

Flynn et al., "High Efficiency Video Coding (HEVC) Range Extensions text specification: Draft 4," Joint Collaborative Team on Video Coding (JCT-VC) of ITU-T SG16 WP3 and ISO/IEC JTC1/SC29/WG11, 13th Meeting: Incheon, KR, Apr. 18-26, 2013, Document: JCTVC-N1005_v1, 332 pp.

Hannuksela, "Coding of Parameter Sets," Joint Video Team of ISO/IEC MPEG & ITU-T VCEG), Fairfax, VA, US, JVT-C078, May 6-10, 2002, 14 pp.

Hannuksela et al.,"Scalable multiview video coding," JVT Meeting; Apr. 24-29, 2008, Geneva, CH; (Joint Video Team ofISO/IEC JTC1/SC29/WG11 and ITU-TSG. 16), No. JVT-AA044-L, XP030007387, 6 pp.

Ikai et al., "AHG7: On VPS extension," JCT-3V Meeting; MPEG Meeting; Jan. 17-23, 2013; Geneva, CH; (The Joint Collaborative Team on 3D Video Coding Extension Development of ISO/IEC JTC1/SC29/WG11 and ITU-T SG.16); URL: http:l/phenix.int-evry.frijct2/, No. JCT3V-00086, XP030130502, 6 pp.

ITU-T H.264, Series H: Audiovisual and Multimedia Systems, Infrastructure of audiovisual services—Coding of moving video, Advanced video coding for generic audiovisual services, The International Telecommunication Union, Standardization Sector of ITU, Jun. 2011, 674 pp.

ITU-T H.264, Series H: Audiovisual and Multimedia Systems, Infrastructure of audiovisual services—Coding of moving video, Advanced video coding for generic audiovisual services, The International Telecommunication Union, Mar. 2005, 343 pp.

ITU-T H.265, Series H: Audiovisual and Multimedia Systems, Infrastructure of audiovisual services—Coding of moving video, High efficiency video coding, The International Telecommunication Union, Apr. 2013, 317 pp.

Li et al., "Comments on Slice Common Information Sharing," Joint Collaborative Team on Video Coding, 5th Meeting, Torino, IT; JCTVC-F187, Jun. 14-22, 2011, 3 pp.

Pandit et al., "H.264/AVC extension for MVC using SEI message," Joint Video Team (JVT) of ISO/IEC MPEG & ITU-T VCEG (ISO/IEC JTC1/SC29/WG11 and ITU-T SG16 Q6), No. JVT-X061, Jun. 29-Jul. 6, 2007, XP002506970, 14 pp.

Rusert et al., "High level syntax for scalability support in HEVC," Joint Collaborative Team on Video Coding (JCT-VC) of ITU-T SG13 WP3 and ISO/IEC JTC1/SC29/WG11, Document No. JCTVC-F491, Jul. 21, 2011, 9 pp.

Schierl et al., "System Layer Integration of High Efficiency Video Coding," IEEE Transactions on Circuits and Systems for Video Technology, vol. 22, No. 12, Dec. 2012, pp. 1871-1884.

Singer, "Towards storing JVT in an MP4 File," International Organisation for Standardisation, MPEG4/M8438, Apr. 2002, 10 pp.

Singer, "HEVC Profile Signalling," JCT-VC Meeting; MPEG Meeting; Geneva, CH; (Joint Collaborative Team on Video Coding of ISO/IEC JTC1/SC29/WG11 and ITU-T SG.16 ); URL: http://wftp3.itu .i nt/ a v-arc h/jctvc-s ite/, No. MPEG2012/m25028, XP030112262, Apr. 24, 2012, 5 pp.

Sjoberg, "On num_reorder_frames and max_dec_frame_buffering," JCT-VC Meeting; MPEG Meeting; Mar. 16-23, 2011; Geneva, CH; (Joint Collaborative Team on Video Coding of ISO/IEC JTC1/SC29/WG11and ITU-T SG.16 ); URL: http://wftp3.itu.int/av-arch/jctvc-site/, No. JCTVC-E339, XP030008845, 4 pp.

Sjoberg et al., "Overview of HEVC High-Level Syntax and Reference Picture Management," IEEE Transactions on Circuits and Systems for Video Technology, vol. 22, No. 12, XP811487884, Dec. 2012, pp. 1858-1870.

Skupin et al.,"Generic HEVC high level syntax for scalability and adaptation," JCT-VC Meeting; MPEG Meeting; Geneva, CH; (Joint Collaborative Team on Video Coding of ISO/IEC JTC1/SC29/WG11 and ITU-TSG.16 ); URL: http:// wftp3.itu.int/av-arch/jctvc-site/,, No. Document JCTVC-10217, XP030111980, Apr. 27-May 7, 2012, 6 pp.

Song et al., "Comments on view dependency information," JVT Meeting; MPEG Meeting; San Jose CA, US; (Joint Video Team of ISO/IEC JTC1/SC29/WG11 and ITU-T SG.16 ), No. Document JVT-W074r1.doc, XP030007034, Apr. 21-27, 2007, 11 pp.

Suh et ai.,"A Shortened NAL Header for Light Applications," JVT Meeting; MPEG Meeting; Jan. 13-19, 2007, Marrakech, Morocco; (Joint Video Team of ISO/IEC JTC1/SC29/WG11 and ITU-T SG. 16), No. JVT-V129, XP030006937, 8 pp.

Tsai et al., "Non-CE8: Pure VLC for SAO and ALF," JCT-VC Meeting; MPEG Meeting; Geneva, CH; (Joint Collaborative Team on Video Coding of ISO/IEC JTC1/SC29/WG11 and ITU-T SG.16); URL: http://wftp3.1tu.int/av-arch/jctvc-site/,, No. Document JCTVC-G220, Nov. 21-30, 2011, 5 pp.

Vetro et al.,"Joint Draft 6.0 on Multiview Video Coding," JVT Meeting; MPEG Meeting; Jan. 13-18, 2008, Antalya, Turkey; (Joint Video Team of ISO/IEC JTCIISC29NVG11 and ITU-T SG.16 ), No. JVT-Z209, XP030007344, 41 pp.

Wang et al., "HRD parameters in VPS," JCT-VC Meeting; MPEG Meeting; Stockholm, SE; (Joint Collaborative Team on Video Coding of ISO/IEC JTC1/SC29/WG11 and ITU-T SG.16 ), Document JCTVC-J0562, Jul. 11-20, 2012, 10 pp.

Wang et al., "MVC HRD and bitstream restriction," JVT Meeting; Apr. 6, 2008-Apr. 10, 2008; Geneva, CH; (Joint Video Team ofISO/IEC JTC1/SC29/WG11 and ITU-T SG.16 ), No. JVT-AA020, Apr. 28, 2008, XP030007363, ISSN: 0000-0091, 19 pp.

Wenger et al.,"Adaptation Parameter Set (APS)," 6th Meeting, Torino, IT; Joint Collaborative Team on Video Coding, JCTVC-F747r3, Jul. 14-22, 2011, 10 pp.

Wenger et al., "High level syntax for loop filter parameters," Joint Collaborative Team on Video Coding, JCTVC-F747 PowerPoint, Jul. 14-22, 2011, 7 slides.

Zhu et al., "SVC Hypothetical Reference Decoder," JVT Meeting; MPEG Meeting, Marrakech, Morocco, Joint Video Team of ISO/IEC JTC1/SC29/WG11 and ITU-T SG.16, No. Document JVT-V068r2, Jan. 13-19, 2007, 10 pp.

Response to Second Written Opinion dated Apr. 8, 2015, from International Application No. PCT/US2014/033374, Filed on Jun. 8, 2015, 9 pp.

\* cited by examiner

NON-ENTROPY ENCODED REPRESENTATION FORMAT

This application claims the benefit of U.S. Provisional Application No. 61/809,858, filed Apr. 8, 2013, which is incorporated herein by reference in its entirety.

TECHNICAL FIELD

This disclosure relates to coding of parameter sets in video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may be encoded using spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to the transform coefficients to achieve further compression.

SUMMARY

This disclosure relates to techniques for coding parameter sets such that more than one output layer set may be coded for one layer set. In one example, a first output layer set for a layer set and a second output layer set for the layer set may be used to code video data. For example, video data may be coded for the first output layer set and for the second output layer set.

This disclosure relates to techniques for coding parameter sets. For example, a video coder may code all profile, tier, and/or level information in the VPS, and profile, tier, level information may be associate with each output layer set signalled by one profile, tier, level syntax structure, in some examples in a way that it is accessible without entropy decoding. In one example, the disclosure describes techniques for coding profile_tier_level syntax structures in parameter set extension syntax, such as video parameter set (VPS) extension syntax, in some examples at a position within the parameter set extension syntax that is accessible without entropy coding (i.e., prior to any entropy-coded syntax elements in the parameter set extension). While in some examples all profile, tier, and/or level information in the VPS may be accessible without entropy coding, in other examples, a reduced amount of entropy coding or some limited entropy coding may be required for some or all profile, tier, and/or level information in the VPS.

In another example, this disclosure relates to techniques for coding layer dependency information in multilayer video data in a VPS such that it is accessible without entropy decoding. Some examples may code multilayer video data, including transmitting or receiving a non-entropy encoded layer dependency information at a position within a VPS extension prior to syntax elements of parameter set extension syntax that are entropy encoded. The technique may include coding video data of one or more of the layers of video data based on the non-entropy encoded layer dependency information. The layer dependency information indicates whether one of the layers is a direct reference layer for another of the layers.

In another example, this disclosure relates to techniques for coding parameter sets. For example, a video coder may code all profile, tier, and/or level information in the VPS, and profile, tier, level information may be associate with each output layer set signalled by one profile, tier, level syntax structure, in some cases in a way that it is accessible without entropy decoding. While in some examples all profile, tier, and/or level information in the VPS may be accessible without entropy coding, in other examples, a reduced amount of entropy coding or some limited entropy coding may be required for some or all profile, tier, and/or level information in the VPS.

In another example, this disclosure relates to techniques for coding visual signal information, such as video_format, video_full_range_flag, colour_primaries, transfer_characteristics, matrix_coeffs, per layer in the VPS.

In another example, this disclosure relates to techniques for SPS sharing by layers of different spatial resolutions, bit depth, or color formats.

In another example, this disclosure relates to techniques for video coding such that no timing information is provided in the Video Usability Information (VUI) of a sequence parameter set (SPS) with layer ID (nuh_layer_id) greater than 0.

In another example, this disclosure relates to techniques for video coding such that no explicit signaling of target output layers is provided for the default output layer sets.

In another example, this disclosure relates to techniques for avoiding the signaling of the maximum number of temporal sub-layers that may be present in each coded video sequence (CVS) (sps_max_sub_layers_minus1) or whether inter prediction is additionally restricted for CVSs (sps_temporal_id_nesting_flag) in SPSs with layer ID greater than 0.

In another example, this disclosure relates to techniques for, syntax element output_layer_set_idx[i] may be changed to output_layer_set_idx_minus1[i] in accordance with the techniques of this disclosure.

In one example, the disclosure describes a method of decoding multilayer video data, the method including receiving a non-entropy encoded representation format within a video parameter set (VPS), wherein the representation format includes one or more of chroma format, whether different colour planes are separately coded, picture width, picture height, luma bit depth, and chroma bit depth and decoding video data based on the non-entropy encoded representation format within the VPS.

In another example, the disclosure describes a method of encoding multilayer video data, the method including encoding video data based on a non-entropy encoded representation format within a video parameter set (VPS), wherein the representation format includes one or more of chroma format, whether different colour planes are separately coded, picture width, picture height, luma bit depth, and chroma bit depth; and transmitting the non-entropy encoded representation format within the VPS.

In another example, the disclosure describes an apparatus for decoding video data including a memory configured to store video data and one or more processors configured to receive a non-entropy encoded representation format within a video parameter set (VPS), wherein the representation format includes one or more of chroma format, whether different colour planes are separately coded, picture width, picture height, luma bit depth, and chroma bit depth and decode video data based on the non-entropy encoded representation format within the VPS.

In another example, the disclosure describes an apparatus for decoding video data including means for receiving a non-entropy encoded representation format within a video parameter set (VPS), wherein the representation format includes one or more of chroma format, whether different colour planes are separately coded, picture width, picture height, luma bit depth, and chroma bit depth and means for decoding video data based on the non-entropy encoded representation format within the VPS. In another example, the disclosure describes a computer-readable storage medium. The computer-readable storage medium having stored thereon instructions that upon execution cause one or more processors to receive a non-entropy encoded representation format within a video parameter set (VPS), wherein the representation format includes one or more of chroma format, whether different colour planes are separately coded, picture width, picture height, luma bit depth, and chroma bit depth and decode video data based on the non-entropy encoded representation format within the VPS.

The details of one or more examples are set forth in the accompanying drawings and the description below. Other features, objects, and advantages will be apparent from the description and drawings, and from the claims.

DETAILED DESCRIPTION

Figure 1:
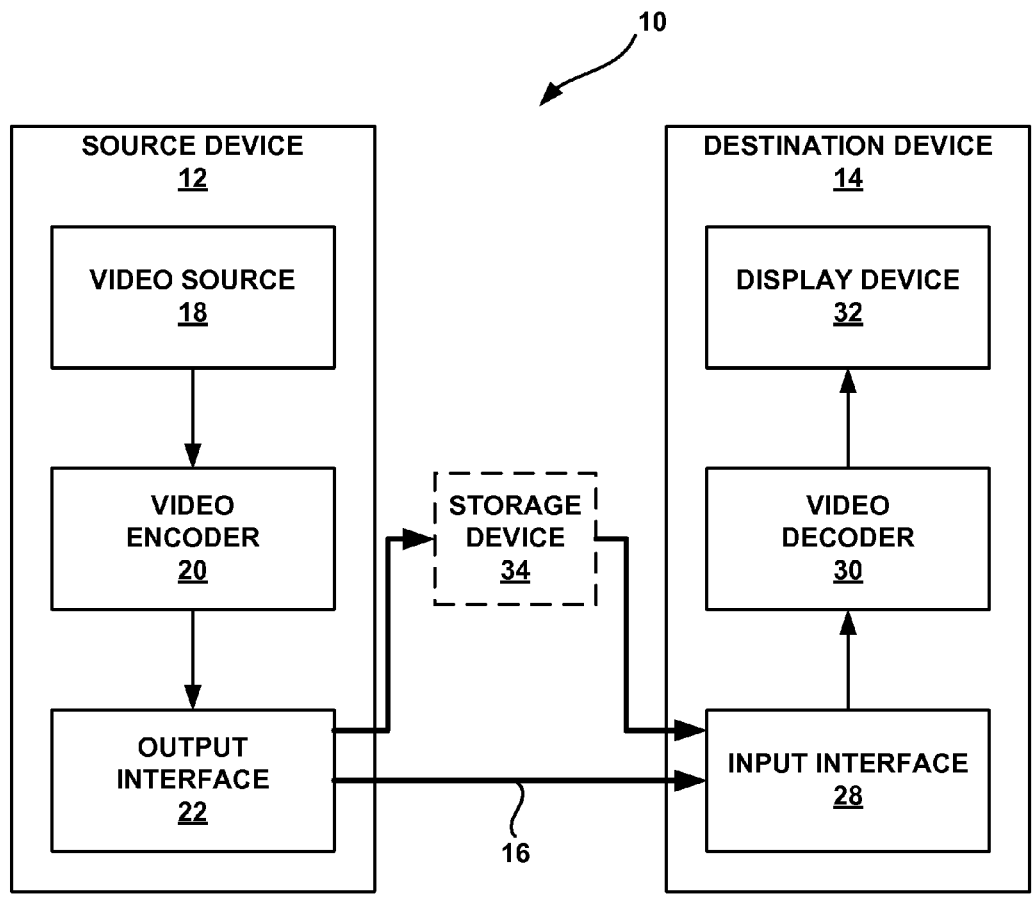
FIG. 1 is a block diagram illustrating an example video encoding and decoding system that may utilize the techniques described in this disclosure.

This disclosure is generally related to the field of video coding and compression. As one example, the disclosure is related to the high efficiency video coding (HEVC) standard currently under development. The term "coding" refers to encoding and decoding, and the techniques may apply to encoding, decoding or both encoding and decoding. As described in more detail, the techniques may be related to intra-coding (e.g., intra-prediction) in which a block within a picture is predicted with respect to another block or blocks in the same picture (i.e., spatial prediction).

In previous video coding systems, accessing of the profile, tier and level for layer sets require entropy decoding. Similarly, the layer dependency information is not accessible without entropy decoding. Signaling of an output layer set may also be problematic and inefficient.

One example of the systems, methods, and devices described herein provides for a set of profile_tier_level( ) syntax structures to be signalled in parameter set extension syntax, such as video parameter set (VPS) extension syntax, potentially at a position within the extension syntax that is accessible without entropy coding, (e.g., prior to entropy-coded elements in the extension syntax) and/or with some reduced or limited entropy coding. The VPS extension syntax will be described throughout this disclosure for purposes of example. In an example, the VPS is a syntax structure containing syntax elements that apply to zero or more entire coded video sequences (CVSs) as determined by the content of a syntax element found in the SPS referred to by a syntax element found in the PPS referred to by a syntax element found in each slice segment header. In an example, a CVS is a sequence of access units that include, in decoding order, of an IRAP access unit with NoRas1OutputFlag equal to 1, followed by zero or more access units that are not IRAP access units with NoRas1OutputFlag equal to 1, including all subsequent access units up to but not including any subsequent access unit that is an IRAP access unit with NoRas1OutputFlag equal to 1. Furthermore, a profile_tier_level( ) syntax structure may be associated with an output layer set instead of a layer set, because a layer set may correspond to more than one output layer set, and different output layer sets corresponding to one layer set may comply to different levels.

The profile_tier_level( ) syntax structure is a syntax structure that provides syntax information related to profiles, tiers, and levels. Profiles, tiers, and levels specify different points of conformance for implementing the HEVC standard or an HEVC extension standard such that it is interoperable across various applications that may have similar functional requirements. In some examples, a profile may define a set of coding tools or algorithms that may be used in generating a conforming bitstream. In some examples, a tier and a level may place constraints on some of the parameters of the bitstream. In some examples, these parameters may correspond to decoder processing load and decoder memory capabilities. The level information may establish restrictions on processing of data. For example, the level information may include maximum sample rate, maximum picture size, maximum bit rate, minimum compression ratio. The level information may also include capacities of the decoded picture buffer (DPB) and the coded picture buffer (CPB). The CPB holds compressed data prior to its decoding for data flow management purposes. The DPB holds decoded picture data.

Another example of the systems, methods, and devices described herein provides for coding multilayer video data including layers of video data. These systems, methods, and devices may include transmitting or receiving a non-entropy encoded layer dependency information at a position within a parameter set extension syntax, such as VPS extension syntax, prior to syntax elements of the extension that are entropy encoded. Additionally, the systems, methods, and devices may decode video data of one or more of the layers of video data based on the non-entropy encoded layer dependency information. The layer dependency information indicates whether one of the layers is a direct reference layer for another of the layers. Again, the VPS extension syntax will be described throughout this disclosure for purposes of example.

As is described in greater detail below, in one example, more than one output layer set may be signalled for one layer set. For example, as described herein, the syntax element output_layer_flag[1sIdx][j] may be changed to output_layer_flag[i][j], and related semantics are changed accordingly.

As is described in greater detail below, in another example, profile, tier, and level information may be signalled in the VPS in a way that it is accessible without entropy decoding. This is illustrated in one or more of the tables below with parameters that have descriptors other than ue(v) (ue(v) indicating entropy coding). For example, the descriptors may indicate fixed length coding, e.g., u(n), where n is an integer 1 or greater.

As is described in greater detail below, in another example, the layer dependency information may be signalled in the VPS in a way that it is accessible without entropy. This is illustrated in one or more of the tables below with parameters that have descriptors other than ue(v). For example, the descriptors may indicate fixed length coding, e.g., u(n), where n is an integer 1 or greater.

As is described in greater detail below, in another example, a representation format may be signalled in the VPS, potentially in a way that it is accessible without entropy decoding or some reduced or limited entropy coding. For example, representation format parameters such as chroma_format_vps_idc, separate_colour_plane_vps_flag, pic_width_vps_in_luma_samples, pic_height_vps_in_luma_samples, bit_depth_vps_luma_minus8, and bit_depth_vps_chroma_minus8 are signalled in the VPS, and not entropy coded in some examples. This is illustrated in one or more of the tables below with these parameters having descriptors other than ue(v). The representation format parameters may have descriptors that indicate that the particular parameter is fixed length coding, e.g., u(n), where n is an integer 1 or greater. In some cases the "_vps" has been dropped from various parameter names, e.g., chroma_format_vps_idc may also be referred to as chroma_format_idc, separate_colour_plane_vps_flag as separate_colour_plane_flag, pic_width_vps_in_luma_samples as pic_width_in_luma_samples, pic_heigh_vps_in_luma_samples as pic_height_in_luma_samples, bit_depth_vps_luma_minus8 as bit_depth_luma_minus8, and bit_depth_vps_chroma_minus8 as bit_depth_vps_chroma_minus8, as well as other parameters.

As is described in greater detail below, in another example, visual signal information such as video_format, video_full_range_flag, colour_primaries, transfer_characteristics, or matrix_coeffs may be signalled per layer in the VPS. As described herein the visual signal information such as video_format, video_full_range_flag, colour_primaries, transfer_characteristics, matrix_coeffs may be a subset of the Video Usability Information (VUI) parameters, as specified in Annex E of the HEVC standard, for example. The VUI, and hence the visual signal information, is in the VPS and may be signalled per layer in the VPS.

As is described in greater detail below, in another example, sequence parameter set (SPS) sharing may be performed by layers with different spatial resolutions, bit depth, or color formats. In an example, the SPS is a syntax structure containing syntax elements that apply to a layer in zero or more entire CVSs as determined by the content of a syntax element found in the PPS referred to by a syntax element found in each slice segment header. In some examples, a method of decoding multilayer video data may include receiving a video parameter set and a first sequence parameter set. The method may also include receiving a first layer that refers to the first sequence parameter set, receiving a second layer that has a different value of at least one of a spatial resolution, a bit depth, and a color format than the first layer, and that refers to the first sequence parameter set. Furthermore, the example method may include decoding video data of the first and second layers based on information from the video parameter set and the first sequence parameter set.

As is described in greater detail below, in another example, no timing information is coded in the VUI of SPSs with layer ID (nuh_layer_id) greater than 0. In some examples, for a layer that refers to an SPS with layer ID greater than 0, the timing information signalled in the VPS is used.

As is described in greater detail below, in another example, no explicit signaling of target output layers is used for default output layer sets. For example, because having multiple_output_layer_sets_in_layer_set_flag equal to 0 specifies that only one output layer set is specified by the VPS for each layer set, with the highest layer being the only target output layer, no explicit signaling of target output layers for the default output layer sets is needed. For example, there is no need to signal which layers are to be output when multiple_output_layer_sets_in_layer_set_flag is equal to 0 because there is only one output layer set for each layer set and the highest layer is the only target output layer.

As is described in greater detail below, in another example, the sps_max_sub_layers_minus1 and sps_temporal_id_nesting_flag are not signalled in the SPS. In some cases, this signaling does not occur in the SPS when nuh_layer_id>0.

As is described in greater detail below, in another example, the syntax element output_layer_set_idx[i] may be changed to output layer set_idx_minus1[i]. This is because the syntax element layer_id_included_flag[i][j] used for output_layer_set_idx[i] equal to 0 is for layer set 0, while for layer set 0 layer_id_included_flag[i][j] is not defined. Additionally, the target output layer for layer set 0 is always layer 0 (the base layer).

Various examples above may include aspects with various data, parameters, etc. that are not entropy coded. Because of this, the data, parameters, etc. may be accessible to devices without an entropy coder to perform entropy coding. For example, in some cases a Media Aware Network Entities (MANEs) may not have an entropy coding device, but would generally be able to code (e.g., decode) non-entropy coded information such as data, parameters, etc.

A recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan., 2013, which, as of Oct. 15, 2013, is downloadable from: http://phenix.int-evry.fr/jct/doc_end_user/documents/12_Geneva/wg11/JCTVC-L1003-v34.zip Another recent working Draft (WD) of HEVC, referred to as "HEVC Working Draft 6" or "WD6," is described in document JCTVC-H1003, Bross et al., "High-Efficiency Video Coding (HEVC) text specification draft 6," Joint Collaborative Team on Video Coding (JCT-VC) of ITU-T SG16 WP3 and ISO/IEC JTC1/SC29/WG11, 8th Meeting: San Jose, Calif., USA, February 2012, which as of Oct. 15, 2013 is downloadable from: http://phenix.int-evry.fr/jct/doc_end_user/documents/8_San%20Jose/wg11/JCTVC-H1003-v22.zip Another recent working Draft (WD) of HEVC, referred to as "HEVC Working Draft 8" or "WD8," is described in document JCTVC-J1003, Bross et al., "High-Efficiency Video Coding (HEVC) text specification draft 8," Joint Collaborative Team on Video Coding (JCT-VC) of ITU-T SG16 WP3 and ISO/IEC JTC1/SC29/WG11, 10th Meeting: Stockholm, SE, 11-20 Jul. 2012, which as of Oct. 15, 2013 is downloadable from: http://phenix.int-evry.fr/jct/doc_end_user/documents/10_Stockholm/wg11/JCTVC-J1003-v8.zip HEVC Range Extensions are described in document JCTVC-N1005_v3, Flynn et al., "High Efficiency Video Coding (HEVC) Range Extensions text specification: Draft 4," Joint Collaborative Team on Video Coding (JCT-VC) of ITU-T SG16 WP3 and ISO/IEC JTC1/SC29/WG11, 13th Meeting: Incheon, KR, 18-26 Apr. 2013, which as of Oct. 15, 2013 is downloadable from: http://phenix.it-sudparis.eu/jct/doc_end_user/current_document.php?id=8139.

FIG. 1 is a block diagram illustrating an example video encoding and decoding system 10 that may utilize the techniques described in this disclosure. As illustrated in FIG. 1, system 10 includes a video encoder 20 that generates encoded video data to be decoded at a later time by a video decoder 30. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from video encoder 20 to video decoder 30. In one example, link 16 may comprise a communication medium to enable video encoder 20 to transmit encoded video data directly to video decoder 30 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 34. Similarly, input interface 28 may access encoded data from storage device 34. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by video encoder 20. Destination device 14 may access stored video data from storage device 34 via streaming or download via input interface 28. The file server may be any type of server capable of storing encoded video data and transmitting that encoded video data to the video decoder 30. Example file servers include a web server (e.g., for a website), a File Transfer Protocal (FTP) server, network attached storage (NAS) devices, or a local disk drive. Video decoder 30 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

Video encoder 20 encodes the captured, pre-captured, or computer-generated video received from video source 18. The captured, pre-captured, or computer-generated video may be formatted according to any of the sample formats described above including the 4:2:0, 4:2:2 or 4:4:4 sample formats. Video encoder 20 may perform video coding on video formatted according to any of the 4:2:0, 4:2:2 or 4:4:4 sample formats. In some cases, video encoder 20 may up sample or down sample the captured, pre-captured, or computer-generated video as part of the coding process. For example, captured video may be formatted according to the 4:4:4 sample format, video encoder 20 may down sample captured video to the 4:2:2 format and perform video encoding on the down sampled video. The encoded video data may be transmitted directly to destination device 14 via output interface 22 of source device 12. The encoded video data may also (or alternatively) be stored onto storage device 34 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 34, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may generally conform to the current HEVC Test Model (HM) or a future HM.

Alternatively, video encoder 20 and video decoder 30 may operate according to other proprietary or industry standards, such as the ITU-T H.264 standard, alternatively referred to as MPEG-4, Part 10, Advanced Video Coding (AVC), or revisions or extensions of such standards. The techniques of this disclosure are described as applicable to HEVC extensions, but are not necessarily limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In the illustrated example of FIG. 1, a video coder, such as a video encoder 20 or a video decoder 30 may transmit or receive a non-entropy encoded set of profile, tier, and level syntax structures. For example, video encoder 20 may transmit a non-entropy encoded set of profile, tier, and level syntax structures and video decoder 30 may receive a non-entropy encoded set of profile, tier, and level syntax structures, e.g., sent from video encoder 20.

The non-entropy encoded set of profile, tier, and level syntax structures may be at a position within a VPS extension prior to other syntax elements of the VPS extension that are entropy encoded. The video coder (e.g., video encoder 20 or video decoder 30) may refer to one of the profile, tier, and level syntax structures for each of a plurality of output layer sets and decode video data of one of the output layer sets based on information from the profile, tier, and level syntax structure referred to for the output layer set. For example, video encoder 20 may refer to one of the profile, tier, and level syntax structures for each of a plurality of output layer sets and encode video data of one of the output layer sets based on information from the profile, tier, and level syntax structure referred to for the output layer set. Video decoder 30 may refer to one of the profile, tier, and level syntax structures for each of a plurality of output layer sets and decode video data of one of the output layer sets based on information from the profile, tier, and level syntax structure referred to for the output layer set.

In some examples, the video coder may further transmit or receive a sequence parameter set (SPS) with a nuh_layer_id equal to 0, wherein the SPS includes a profile, tier, and level syntax structure for a layer of video data. The nuh_layer_id may be used to indicate a particular layer. A layer may be a set of video coding layer (VCL) network abstraction layer (NAL) units that all have a particular value of nuh_layer_id and the associated non-VCL NAL units, or one of a set of syntactical structures having a hierarchical relationship. nuh_layer_id shall be equal to 0 in a bitstream containing only one layer. Other values of nuh_layer_id may appear in bitstreams containing multiple layers. In an example, a NAL unit is a syntax structure containing an indication of the type of data to follow and bytes containing that data in the form of a raw byte sequence payload (RBSP) interspersed as necessary with emulation prevention bytes. In an example, an RBSP is a syntax structure containing an integer number of bytes that is encapsulated in a NAL unit and that is either empty or has the form of a string of data bits containing syntax elements followed by an RBSP stop bit and zero or more subsequent bits equal to 0.

Video encoder 20 may transmit an SPS with a nuh_layer_id equal to 0, wherein the SPS includes the profile, tier, and level syntax structure for a layer of video data. Video decoder 30 may receive the SPS with a nuh_layer_id equal to 0, wherein the SPS includes a profile, tier, and level syntax structure for a layer of video data.

In some examples, when a layer with nuh_layer_id greater than 0 refers to the SPS, the video decoder might not decode video data of the layer with nuh_layer_id greater than 0 using the profile, tier, and level syntax structure of the SPS. Some examples may link the profile, tier, and level syntax structures to respective ones of the output layer sets. Accordingly, one or more specific profile, tier, and level syntax structures may be connected to one or more specific output layer sets such that the one or more specific profile, tier, and level syntax structures may be used to encode and/or decode one or more specific output layer sets. Linking may include identifying each of the output layer sets to which each of the profile, tier and level syntax structures is linked based on a syntax element representing an index to the profile, tier, and level syntax structures. Decoding video data may include decoding video data of one or more of the output layer sets based on information from the profile, tier, and level syntax structures linked to the respective output layer sets.

In an example that includes multiple layers, a bitstream of all of the layers may be split into multiple compliant bitstreams, e.g., one bitstream for each layer set. Each of these multiple compliant bitstreams may be referred to as a layer set. The layer set may include a reference to the particular layer and any reference layers which that particular layer is dependent upon for decoding. This assumes there are reference layers that the particular layer depends on. Accordingly, a layer set is a compliant bitstream that may include NAL units associated with the particular layer and NAL units for any reference layers required for decoding the particular layer.

An output layer set is a layer set for which the list of target output layers is specified. For a layer set, the list of target output layers is not specified. The output layer set may be for one or more particular layers that are intended to be output for display. In some examples, more than one output layer set may be signalled for one layer set.

In some examples, the video coder (e.g., video encoder 20 or video decoder 30) may transmit or receive, as applicable, an output layer flag [i][j] that, when equal to 1, specifies that a j-th layer in the layer set is a target output layer of an i-th output layer set, and, when equal to 0, specifies that the j-th layer in the layer set is not the target output layer of the i-th output layer set. For examples, video encoder 20 may transmit an output layer flag [i][j] that, when equal to 1, specifies that a j-th layer in the layer set is a target output layer of an i-th output layer set, and, when equal to 0, specifies that the j-th layer in the layer set is not the target output layer of the i-th output layer set. Video decoder 30 may transmit an output layer flag [i][j] that, when equal to 1, specifies that a j-th layer in the layer set is a target output layer of an i-th output layer set, and, when equal to 0, specifies that the j-th layer in the layer set is not the target output layer of the i-th output layer set.

The video coder (e.g., video encoder 20 or video decoder 30) may also generate the output layer set based on the output layer flag [i][j] by specifying the layers corresponding to output layer flag [i][j] equal to 1 as the associated list of target output layers. For example, video encoder 20 may encode the output layer set based on the output layer flag [i][j]. Video decoder 30 may decode the output layer set based on the output layer flag [i][j]. In the illustrated example of FIG. 1, a video coder, such as a video encoder 20 or a video decoder 30 may code multilayer video data including layers of video data.

The video coder (e.g., video encoder 20 or video decoder 30) may transmit or receive a non-entropy encoded layer dependency information at a position within a VPS extension prior to syntax elements of the VPS extension that are entropy encoded. This can allow the layer dependency information to be encoded or decoded by devices that do not include an entropy coder, e.g., such as a MANE. Additionally, it may also allow the layer dependency information to be coded sooner. For example, the layer dependency information may be decoder earlier in the decoding process. For example, video encoder 20 may transmit a non-entropy encoded layer dependency information at a position within a VPS extension prior to syntax elements of the VPS extension that are entropy encoded. Video decoder 30 may receive a non-entropy encoded layer dependency information at a position within a VPS extension prior to syntax elements of the VPS extension that are entropy encoded.

The video coder (e.g., video encoder 20 or video decoder 30) may code video data of one or more of the layers of video data based on the non-entropy encoded layer dependency information. For example, video encoder 20 may encode video data of one or more of the layers of video data based on the non-entropy encoded layer dependency information. Video decoder 30 may encode video data of one or more of the layers of video data based on the non-entropy encoded layer dependency information. The layer dependency information indicates whether one of the layers is a direct reference layer for another of the layers.

In some examples, the layer dependency information includes a direct_dependency_flag[i][j] that, when equal to 0, specifies that a layer with index j is not a direct reference layer for a layer with index I, and when equal to 1, specifies that the layer with index j may be a direct reference layer for the layer with index i.

One example of the systems, methods, and devices described herein provides for a set of profile_tier_level( ) syntax structures to be signalled in VPS extension syntax. In some examples, the set of profile_tier_level( ) syntax structures is signalled in VPS extension syntax at a position within the VPS extension syntax that is accessible without entropy coding, i.e., prior to entropy-coded elements in the VPS extension syntax.

Some examples provide profile, tier, and level syntax structures before entropy coded elements of the VPS extension syntax. These syntax structures can be linked to output layer sets. In some examples, the syntax element vps_num_layer_sets_minus1 plus 1 specifies the number of layer sets that are specified by the VPS. A layer set may be a set including a layer and any (zero or more) other layers on which the layer is dependent. For example, a layer set for layer 2 in scalable video coding may include layer 0, layer 1 and layer 2. For each layer set, one or more output layer sets may be specified. Each output layer set is designated to have a profile, level and tier.

In one example of the disclosure, a portion of the VPS syntax may be as follows in Table 1:

TABLE 1

An example portion of the VPS syntax

| video_parameter_set_rbsp( ) { | Descriptor |
|---|---|
| vps_video_parameter_set_id | u(4) |
| vps_reserved_three_2bits | u(2) |
| vps_max_layers_minus1 | u(6) |
| vps_max_sub_layers_minus1 | u(3) |
| vps_temporal_id_nesting_flag | u(1) |
| vps_extension_offset //vps_reserved_0xffff_16bits | u(16) |
| profile_tier_level( 1, vps_max_sub_layers_minus1 ) | |
| vps_sub_layer_ordering_info_present_flag | u(1) |
| for( i = ( vps_sub_layer_ordering_info_present_flag ? 0 : vps_max_sub_layers_minus1 ); | |
|    i <= vps_max_sub_layers_minus1; i++ ) { | |
|   vps_max_dec_pic_buffering_minus1[ i ] | ue(v) |
|   vps_max_num_reorder_pics[ i ] | ue(v) |
|   vps_max_latency_increase_plus1[ i ] | ue(v) |
| } | |
| vps_max_layer_id | u(6) |
| vps_num_layer_sets_minus1 | ue(v) |
| for( i = 1; i <= vps_num_layer_sets_minus1; i++ ) | |
|   for( j = 0; j <= vps_max_layer_id; j++ ) | |
|     layer_id_included_flag[ i ][ j ] | u(1) |
| vps_timing_info_present_flag | u(1) |
| if( vps_timing_info_present_flag ) { | |
|   vps_num_units_in_tick | u(32) |
|   vps_time_scale | u(32) |
|   vps_poc_proportional_to_timing_flag | u(1) |
|   if( vps_poc_proportional_to_timing_flag ) | |
|     vps_num_ticks_poc_diff_one_minus1 | ue(v) |
|   vps_num_hrd_parameters | ue(v) |

As illustrated above in the example of Table 1, vps_num_layer_sets_minus1 is entropy coded, as indicated by the ue(v) descriptor, in the VPS, and there are other entropy coded syntax elements before vps_num_layer_sets_minus1 in the VPS. In some examples, entropy decoding may be undesirable. This may be particularly true for intermediate network devices that may perform splicing or stream adaptation (e.g., temporal rate, quality, spatial adaptation). A decoder (e.g., video decoder 30) will generally have an entropy decoder. In many cases, however, it may be desirable for an intermediate network device to not have an entropy decoder. This simplifies the intermediate device, which may decrease cost and power consumption in some cases. In addition, in either case, it may be desirable to quickly access profile, tier, and level information without having to perform entropy decoding.

To avoid entropy decoding the profile, level and tier syntax structures (profile_tier_level( ) syntax), in some examples, this disclosure proposes presenting the profile, level and tier syntax structures before any entropy-coded elements in the VPS extension syntax, and accessible without parsing the entropy-coded vps_num_layer_sets_minus1 syntax element. In some cases, extensions may be developed for video coding standards, such as the HEVC video coding standards. These extensions may provide additional functionality not provided by or not required by the video coding standards. An extension syntax is a syntax for one of these extensions to a video coding standard. For example, the VPS extension syntax may include the syntax of messages used for an extension to the HEVC video coding standards. Previously, it appears that these would be accessed as each layer is accessed. Now, a system, method, or device implementing one or more of the concepts described herein may access all of them up front, and then link them later.

TABLE 2

Example syntax in the VPS extension

| vps_num_profile_tier_level_minus1 | u(6) |
|---|---|
| for( i = 1; i <= vps_num_profile_tier_level_minus1; i++ ) { | |
|   vps_profile_present_flag[ i ] | u(1) |
|   if( !vps_profile_present_flag[ i ] ) | |
|     profile_ref_minus1[ i ] | u(6) |
|   profile_tier_level( vps_profile_present_flag[ i ], vps_max_sub_layers_minus1 ) | |
| } | |

As used in Table 2, vps_num_profile_tier_level_minus1 plus 1 specifies the number of profile_tier_level( ) syntax structures in the VPS. A vps_profile_present_flag[i] equal to 1 specifies that the profile and tier information is present in the i-th profile_tier_level( ) syntax structure. A vps_profile_present_flag[1sIdx] equal to 0 specifies that profile and tier information is not present in the i-th profile_tier_level( ) syntax structure and may be inferred for the i-th profile_tier_level( ) syntax structure.

The syntax element profile_ref_minus1[i] specifies that the profile and tier information for the i-th profile_tier_level( ) syntax structure may be inferred to be equal to the profile and tier information for the (profile_ref_minus1[i]+1)-th profile_tier_level( ) syntax structure. The value of profile_ref_minus1[i]+1 may be less than i.

As illustrated in Table 2, in the syntax above, the decoder or intermediate network device loops through a set of profile_tier_level( ) syntax structures to access them before parsing elements of the syntax for which entropy coding is required (later in the VPS extension syntax). These syntax structures may also be linked to corresponding layer sets with another looping process. In particular, profile_level_tier_idx[i] specifies the index, into the set of profile_tier_level( ) syntax structures in the VPS, of the profile_tier_level( ) syntax structure that applies to i-th output layer set.

For another example aspect, systems, methods, and devices implementing one or more examples described herein may use output_layer_set_idx_minus1[i] to indicate the index of the layer set for layers above layer 0 (the base layer).

The output_layer_set_idx_minus1[i] plus 1 specifies the index (1sIdx) of the layer set for the i-th output layer set. In an example, the value of output_layer_set_idx_minus1[i] may be in the range of 0 to vps_num_layer_sets_minus1−1, inclusive. The length of the output_layer_set_idx_minus1[i] syntax element is Ceil(Log 2(vps_num_layer_sets_minus1)) bits.

Another example of the systems, methods, and devices described herein provides for coding multilayer video data including layers of video data. These systems, methods, and devices may be configured to perform operations including transmitting or receiving a non-entropy encoded layer dependency information at a position within a VPS extension prior to syntax elements of the VPS extension that are entropy encoded. Additionally, the systems, methods, and devices may decode video data of one or more of the layers of video data based on the non-entropy encoded layer dependency information. The layer dependency information indicates whether one of the layers is a direct reference layer for another of the layers.

According to one example, a video coder, such as video encoder 20 or video decoder 30 may code more than one output layer set for one layer set in accordance with the techniques of this disclosure. For example, video encoder 20 may encode more than one output layer set for one layer set. The encoded output layer sets may be signalled, transmitted or otherwise transferred by output interface 22 through link 16 or using storage device 34 and received by input interface 28. The encoded output layer sets may be decoded by video decoder 30.

According to another example, a video coder, such as video encoder 20 or video decoder 30 may code all profile, tier, and/or level information in the VPS, potentially in a way that it is accessible without entropy decoding in accordance with the techniques of this disclosure. For example, video encoder 20 may encode all profile, tier, level information in the VPS, potentially in a way that it is potentially accessible without entropy decoding, i.e., without entropy encoding the profile, tier, and/or level information. The encoded profile, tier, and/or level information in the VPS may be signalled, transmitted, or otherwise transferred by output interface 22 through link 16 or using storage device 34 and received by input interface 28. The encoded profile, tier, and/or level information in the VPS may be decoded by video decoder 30, which may be a device that does not include an entropy decoder, such as a MANE. Some examples may use reduced or limited entropy encoding for the profile, tier, level information in the VPS. For example, perhaps some profile, tier, level information in the VPS is entropy encoded while other profile, tier, level information in the VPS is not entropy encoded.

According to another example, a video coder, such as video encoder 20 or video decoder 30 may code layer dependency information in the VPS such that it is accessible without entropy decoding in accordance with the techniques of this disclosure. For example, video encoder 20 may encode layer dependency information in the VPS such that it is accessible without entropy decoding, i.e., without entropy encoding the layer dependency information. The encoded layer dependency information in the VPS may be signalled, transmitted, or otherwise transferred by output interface 22 through link 16 or using storage device 34 and received by input interface 28. The encoded layer dependency information in the VPS may be decoded by video decoder 30, which may be a device that does not include an entropy decoder, such as a MANE.

According to another example, a video coder, such as video encoder 20 or video decoder 30 may code representation format in the VPS, potentially in a way that it is accessible without entropy decoding in accordance with the techniques of this disclosure, and each layer may be associated with a particular representation format. For example, video encoder 20 may encode representation format in the VPS, potentially in a way that it is accessible without entropy decoding, i.e., without entropy encoding the representation format in the VPS. The encoded representation format in the VPS may be signalled, transmitted, or otherwise transferred by output interface 22 through link 16 or using storage device 34 and received by input interface 28. The encoded representation format in the VPS may be decoded by video decoder 30, which may be a device that does not include an entropy decoder, such as a MANE. Some examples may use reduced or limited entropy decoding for the profile, tier, level information in the VPS. For example, perhaps some profile, tier, level information in the VPS is entropy decoded while other profile, tier, level information in the VPS is not entropy decoded (e.g., because some profile, tier, level information in the VPS was entropy encoded while other profile, tier, level information in the VPS was not entropy encoded).

According to another example, a video coder, such as video encoder 20 or video decoder 30 may code visual signal information (video_format, video_full_range_flag, colour_primaries, transfer_characteristics, matrix_coeffs) per layer in the VPS in accordance with the techniques of this disclosure. For example, video encoder 20 may encode the visual signal information per layer in the VPS. The encoded visual signal information may be signalled, transmitted, or otherwise transferred by output interface 22 through link 16 or using storage device 34 and received by input interface 28. The encoded visual signal information per layer in the VPS may be decoded by video decoder 30. In some examples, the video_format parameter indicates a format of a representation of pictures to be coded. The video_full_range_flag parameter indicates the black level and range of the luma and chroma signals. The colour_primaries parameter indicates the chromaticity coordinates of the source primaries. The transfer_characteristics parameter indicates the opto-electronic transfer characteristic of the source picture. The matrix_coeffs parameter describes the matrix coefficients used in deriving luma and chroma signals from the green, blue, and red primaries.

According to another example, an SPS may be shared by layers with different spatial resolutions, bit depth, or color formats in accordance with the techniques of this disclosure. A video coder, such as video encoder 20 or video decoder 30 may code the SPS. For example, video encoder 20 may encode the SPS. The encoded SPS may be signalled, transmitted, or otherwise transferred by output interface 22 through link 16 or using storage device 34 and received by input interface 28. The encoded SPS may be decoded by video decoder 30.

According to another example, no timing information is provided in a VUI of SPSs with layer ID greater than 0 in accordance with the techniques of this disclosure. A video coder, such as video encoder 20 or video decoder 30 may code the SPS with a layer ID greater than 0, which does not include timing information in the VUI. For example, video encoder 20 may encode the SPS. The encoded SPS may be signalled, transmitted, or otherwise transferred by output interface 22 through link 16 or using storage device 34 and received by input interface 28. The encoded SPS may be decoded by video decoder 30.

According to another example, no explicit signaling of target output layers is provided for the default output layer sets in accordance with the techniques of this disclosure. A video coder, such as video encoder 20 or video decoder 30 may code the default output layer sets, which does not include any explicit signaling of target output layers for the default output layer sets. For example, video encoder 20 encodes the default output layer sets. The encoded default output layer sets may be signalled, transmitted, or otherwise transferred by output interface 22 through link 16 or using storage device 34 and received by input interface 28. The encoded default output layer sets may be decoded by video decoder 30.

According to another example, signaling of the maximum number of temporal sub-layers that may be present (sps_max_sub_layers_minus1) and whether inter prediction is additionally restricted (sps_temporal_id_nesting_flag) is absent in SPSs with layer ID (nuh_layer_id) greater than 0. A video coder, such as video encoder 20 or video decoder 30 may code video data without coding, in SPSs with layer ID greater than 0, the maximum number of temporal sub-layers that may be present in each CVS referring to the SPS and without coding whether inter prediction is additionally restricted for CVSs referring to the SPS. For example, video encoder 20 may encode video data without coding, in SPSs with layer ID greater than 0, the maximum number of temporal sub-layers that may be present in each CVS referring to the SPS and whether inter prediction is additionally restricted for CVSs referring to the SPS. The encoded information may be signalled, transmitted, or otherwise transferred by output interface 22 through link 16 or using storage device 34 and received by input interface 28. The encoded information may be decoded by video decoder 30.

According to another example, syntax element output_layer_set_idx[i] may be changed to output_layer_set_idx_minus1[i] in accordance with the techniques of this disclosure. A video coder, such as video encoder 20 or video decoder 30 may code output_layer_set_idx_minus1[i] to indicate the index of the layer set that corresponds to an output layer set.

Figure 2:
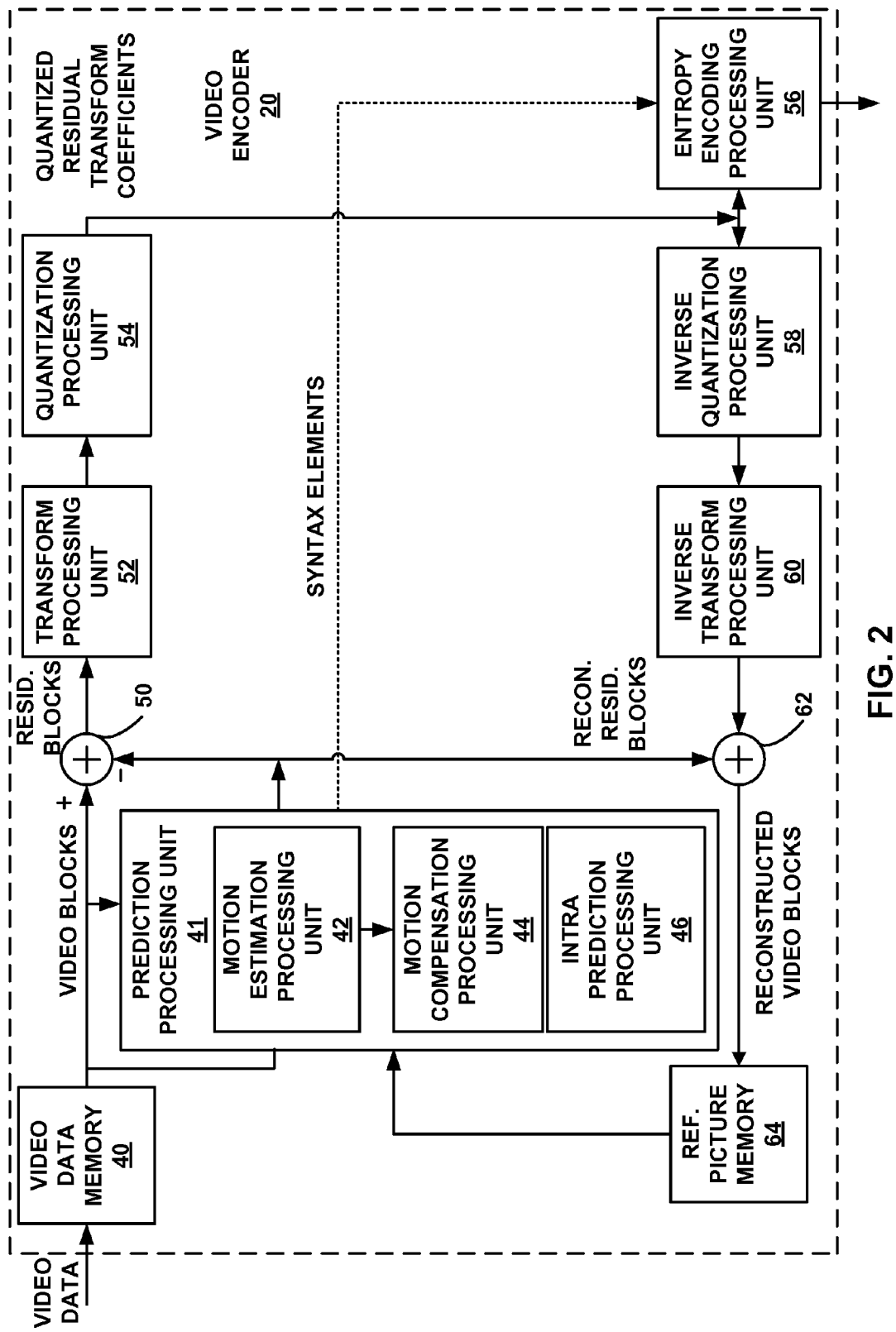
FIG. 2 is a block diagram illustrating an example video encoder that may implement the techniques described in this disclosure.

FIG. 2 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction or inter-layer to reduce or remove temporal redundancy or inter-layer redundancy in video within adjacent frames or pictures in the same layer or across different layers of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes video data memory 40, a prediction processing unit 41, reference picture memory 64, summer 50, transform processing unit 52, quantization processing unit 54, and entropy encoding processing unit 56. Prediction processing unit 41 includes motion estimation processing unit 42, motion compensation processing unit 44, and intra prediction processing unit 46. For video block reconstruction, video encoder 20 also includes inverse quantization processing unit 58, inverse transform processing unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter.

Video data memory 40 may store video data to be encoded by the components of video encoder 20. The video data stored in video data memory 40 may be obtained, for example, from video source 18. A decoded picture buffer (DPB) may be a reference picture memory 64 that stores reference video data for use in encoding video data by video encoder 20, e.g., in intra- or inter-coding modes. Video data memory 40 and the DPB (e.g., reference picture memory 64) may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 40 and the DPB (e.g., reference picture memory 64) may be provided by the same memory device or separate memory devices. In various examples, video data memory 101 may be on-chip with other components of video encoder 20, or off-chip relative to those components.

As shown in FIG. 2, video encoder 20 receives video data, and prediction processing unit 41 partitions the data into video blocks. In some cases, prediction processing unit 41 may partition video data based on a rate distortion analysis. Received video data may be formatted according to any of the sample formats described above. For example, video data may be formatted according to the 4:2:2 sample format. Partitioning may include partitioning video data into slices, tiles, or other larger units, as well as video block partitioning, e.g., according to a quadtree structure of LCUs and CUs.

Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation processing unit 42 and motion compensation processing unit 44 within prediction processing unit 41 perform inter-predictive coding of the current video block relative to one or more predictive blocks in one or more reference pictures to provide temporal compression.

Motion estimation processing unit 42 may be configured to determine the inter-prediction mode for a video slice according to a predetermined pattern for a video sequence. The predetermined pattern may designate video slices in the sequence as P slices or B slices. Motion estimation processing unit 42 and motion compensation processing unit 44 may be highly integrated, but are illustrated separately for conceptual purposes. Motion estimation, performed by motion estimation processing unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block, for inter-coding, may be a block that is found to closely match the PU of the video block to be coded in terms of pixel difference, which may be determined by sum of absolute difference (SAD), sum of square difference (SSD), or other difference metrics. Alternatively, a predictive block, for intra-coding, may be a block that is formed based on spatial prediction with respect to pixel values from one or more neighboring blocks. In some examples, for inter-prediction, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation processing unit 42 may perform a motion search relative to the full pixel positions and fractional pixel positions and output a motion vector with fractional pixel precision.

Motion estimation processing unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation processing unit 42 sends the calculated motion vector to entropy encoding processing unit 56 and motion compensation processing unit 44.

Motion compensation, performed by motion compensation processing unit 44, may involve fetching or generating the predictive block based on the motion vector determined by motion estimation, possibly performing interpolations to sub-pixel precision. Upon receiving the motion vector for the PU of the current video block, motion compensation processing unit 44 may locate the predictive block to which the motion vector points in one of the reference picture lists.

Video encoder 20 forms a residual video block, for inter or intra coding, by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation processing unit 44 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion estimation processing unit 42 and motion compensation processing unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or a mode select processing unit, in some examples) may select an appropriate intra-prediction mode to use from the tested modes.

For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block. It should be noted that rate-distortion analysis may be performed on an combination of the color components.

In any case, after selecting an intra-prediction mode for a block, intra-prediction processing unit 46 may provide information indicative of the selected intra-prediction mode for the block to entropy encoding processing unit 56. Entropy encoding processing unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts. The bitstream may also (or alternatively) be stored onto storage device 34 for later access by destination device 14 or other devices, for decoding and/or playback.

After prediction processing unit 41 generates the predictive block for the current video block via either inter prediction or intra prediction, video encoder 20 forms a residual video block by subtracting the predictive block from the current video block. The residual video data in the residual block may be included in one or more transform units (TUs) and applied to transform processing unit 52. Note that transform processing unit 52 refers to a component, module, processor or processors, or functional unit of video encoder 20, and should not be confused with a TU, which is a basic unit of data for the transform and quantization process. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain. Transform processing unit 52 may send the resulting transform coefficients to quantization processing unit 54.

In the illustrated example of FIG. 2, a video encoder 20 may refer to one of the profile, tier, and level syntax structures for each of a plurality of output layer sets and encode video data of one of the output layer sets based on information from the profile, tier, and level syntax structure referred to for the output layer set.

Video encoder 20 may transmit a non-entropy encoded set of profile, tier, and level syntax structures. The non-entropy encoded set of profile, tier, and level syntax structures may be at a position within a VPS extension prior to syntax elements of the VPS extension that are entropy encoded, such that an intermedia networking device, splicing engine, media aware network element, or decoder can parse the non-entropy encoded set of profile, tier, and level syntax structures without the need for entropy coding.

In some examples, the video encoder 20 may transmit or receive an SPS with a nuh_layer_id equal to 0, wherein the SPS includes a profile, tier, and level syntax structure for a layer of video data. For example, video encoder 20 may send an SPS with a nuh_layer_id equal to 0, wherein the SPS includes a profile, tier, and level syntax structure for a layer of video data.

Video encoder 20 may encode the output layer set based on the output layer flag [i][j]. Video encoder 20 may also transmit an output layer flag [i][j] that, when equal to 1, specifies that a j-th layer in the layer set is a target output layer of an i-th output layer set, and, when equal to 0, specifies that the j-th layer in the layer set is not the target output layer of the i-th output layer set.

Video encoder 20 may non-entropy encode some video data of one or more of the layers of video data. The non-entropy encoded video data may include layer dependency information. The layer dependency information may indicate whether one of the layers is a direct reference layer for another of the layers. In some examples, the layer dependency information includes a direct_dependency_flag [i][j] that, when equal to 0, specifies that a layer with index j is not a direct reference layer for a layer with index I, and when equal to 1, specifies that the layer with index j may be a direct reference layer for the layer with index i.

Video encoder 20 may transmit the non-entropy encoded layer dependency information at a position within a VPS extension prior to syntax elements of the VPS extension that are entropy encoded.

According to one example, video encoder 20 may encode more than one output layer set for one layer set. In some examples, the encoding may be performed by entropy encoding processing unit 56.

According to another example, video encoder 20 may encode all profile, tier, level information in the VPS, potentially in a way that it is accessible without entropy decoding, i.e., without entropy encoding the profile, tier, and/or level information. In some examples, the encoding may be performed by entropy encoding processing unit 56, however, without entropy encoding. Accordingly, entropy encoding processing unit may perform other types of encoding in addition to entropy encoding.

According to another example, video encoder 20 may encode layer dependency information in the VPS such that it is accessible without entropy decoding, i.e., without entropy encoding the layer dependency information. In some examples, the encoding may be performed by entropy encoding processing unit 56, however, without entropy encoding. Accordingly, entropy encoding processing unit may perform other types of encoding in addition to entropy encoding.

According to another example, video encoder 20 may encode representation format in the VPS, potentially in a way that it is accessible without entropy decoding, i.e., without entropy encoding the representation format in the VPS. In some examples, each layer may be associated with a particular representation format. In some examples, the encoding may be performed by entropy encoding processing unit 56, however, without entropy encoding. Accordingly, entropy encoding processing unit may perform other types of encoding in addition to entropy encoding. Video encoder 20 or may encode representation format in the VPS, potentially in a way that it is accessible without entropy decoding in accordance with the techniques of this disclosure, and each layer may be associated with a particular representation format.

According to another example, video encoder 20 may code visual signal information (video_format, video_full_range_flag, colour_primaries, transfer_characteristics, matrix_coeffs) per layer in the VPS in accordance with the techniques of this disclosure. In some examples, the encoding may be performed by entropy encoding processing unit 56.

According to another example, an SPS may be shared by layers with different spatial resolutions, bit depth, or color formats in accordance with the techniques of this disclosure. Video encoder 20 may encode the SPS. In some examples, the encoding may be performed by entropy encoding processing unit 56.

According to another example, no timing information is provided in VUI of SPS with layer ID greater than 0 in accordance with the techniques of this disclosure. Video encoder 20 may encode the SPS. In some examples, the encoding may be performed by entropy encoding processing unit 56.

According to another example, no explicit signaling of target output layers is provided for the default output layer sets in accordance with the techniques of this disclosure. Video encoder 20 may encode the default output layer sets.

In some examples, the encoding may be performed by entropy encoding processing unit 56.

According to another example, signaling of the maximum number of temporal sub-layers that may be present (sps_max_sub_layers_minus1) and whether inter prediction is additionally restricted (sps_temporal_id_nesting_flag) occurs in an SPS only when the nuh_layer_id_is equal to 0, i.e. not signalled in SPS with layer ID greater than 0. Video encoder 20 may encode video data without coding in SPSs with layer ID greater than 0 the maximum number of temporal sub-layers that may be present in each CVS referring to the SPS and whether inter prediction is additionally restricted for CVSs referring to the SPS. In some examples, the encoding may be performed by entropy encoding processing unit 56.

According to another example, syntax element output_layer_set_idx[i] may be changed to output_layer_set_idx_minus1[i] in accordance with the techniques of this disclosure. Video encoder 20 may encode the syntax element output_layer_set_idx_minus1[i] to indicate the index of the layer set that corresponds to the i-th output layer set specified by the VPS. In some examples, the encoding may be performed by entropy encoding processing unit 56.

Figure 3:
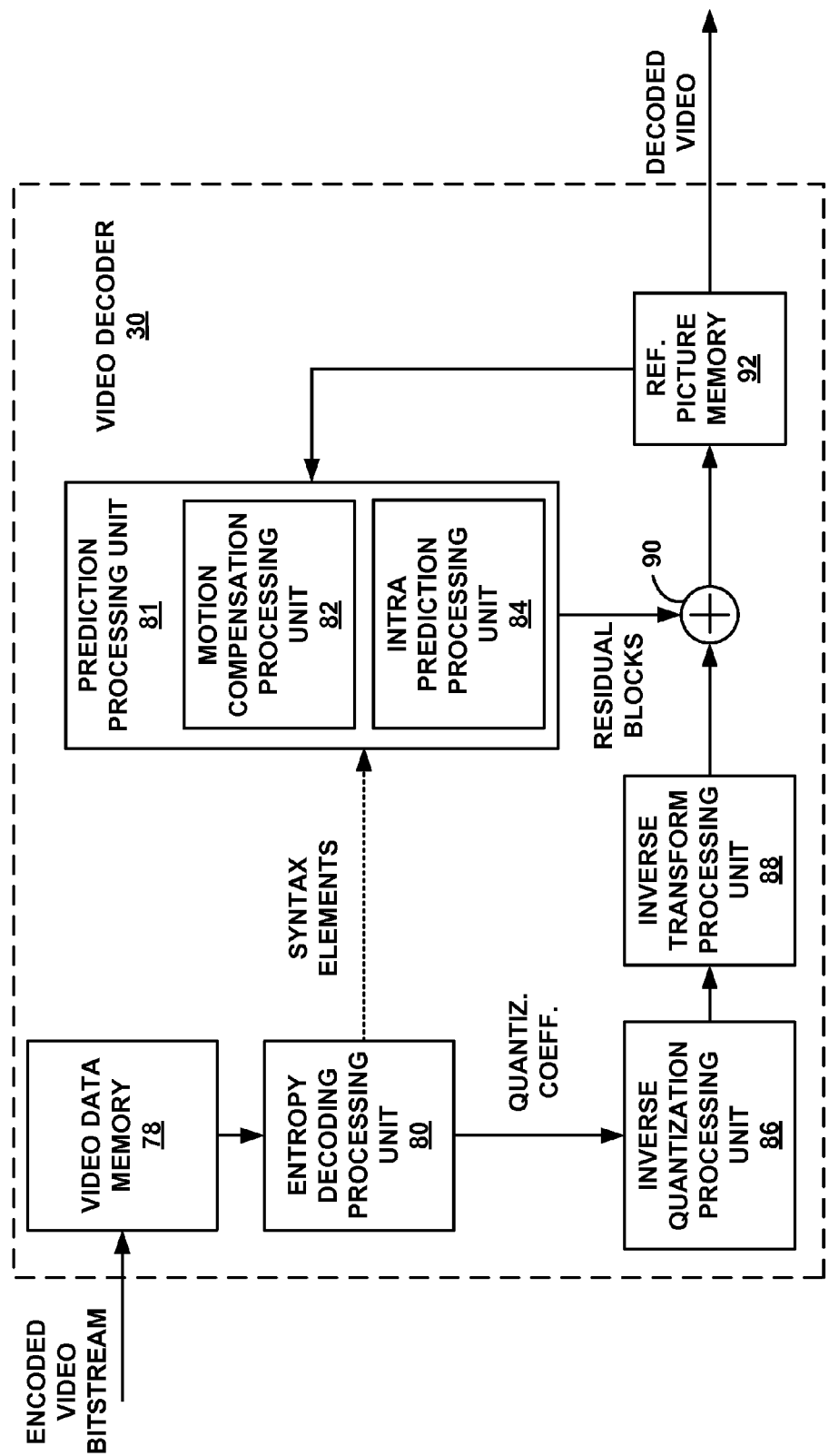
FIG. 3 is a block diagram illustrating an example video decoder that may implement the techniques described in this disclosure.

FIG. 3 is a block diagram illustrating an example video decoder 30 that may implement the techniques described in this disclosure. In the example of FIG. 3, video decoder 30 includes video data memory 78, an entropy decoding processing unit 80, prediction processing unit 81, inverse quantization processing unit 86, inverse transformation processing unit 88, summer 90, and reference picture memory 92. Prediction processing unit 81 includes motion compensation processing unit 82 and intra prediction processing unit 84. Video decoder 30 may, in some examples, perform a decoding pass generally reciprocal to the encoding pass described with respect to video encoder 20 from FIG. 2.

Video data memory 78 may store video data, such as an encoded video bitstream, to be decoded by the components of video decoder 30. The video data stored in video data memory 78 may be obtained, for example, from a computer-readable medium, e.g., from a local video source, such as a camera, via wired or wireless network communication of video data, or by accessing physical data storage media. Video data memory 78 may form a coded picture buffer (CPB) that stores encoded video data from an encoded video bitstream. A decoded picture buffer (DPB) may be a reference picture memory 92 that stores reference video data for use in decoding video data by video decoder 30, e.g., in intra- or inter-coding modes. Video data memory 78 and the DPB may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 78 and the DPB may be provided by the same memory device or separate memory devices. In various examples, video data memory 78 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding processing unit 80 of video decoder 30 entropy decodes the bitstream to generate quantized coefficients, motion vectors, and other syntax elements. Entropy decoding processing unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signalled intra prediction mode and data from previously decoded blocks of the current frame or picture. When the video frame is coded as an inter-coded (i.e., B or P) slice, motion compensation processing unit 82 of prediction processing unit 81 produces predictive blocks for a video block of the current video slice based on the motion vectors and other syntax elements received from entropy decoding processing unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation processing unit 82 determines prediction information for a video block of the current video slice by parsing the motion vectors and other syntax elements, and uses the prediction information to produce the predictive blocks for the current video block being decoded. For example, motion compensation processing unit 82 uses some of the received syntax elements to determine a prediction mode (e.g., one of a plurality of inter-prediction modes) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation processing unit 82 may also perform interpolation based on interpolation filters. Motion compensation processing unit 82 may use interpolation filters as used by video encoder 20 during encoding of the video blocks to calculate interpolated values for sub-integer pixels of reference blocks. In this case, motion compensation processing unit 82 may determine the interpolation filters used by video encoder 20 from the received syntax elements and use the interpolation filters to produce predictive blocks.

Inverse quantization processing unit 86 inverse quantizes, i.e., de-quantizes, the quantized transform coefficients provided in the bitstream and decoded by entropy decoding processing unit 80. The inverse quantization process may include use of a quantization parameter calculated by video encoder 20 for each video block in the video slice to determine a degree of quantization and, likewise, a degree of inverse quantization that should be applied.

Inverse transform processing unit 88 receives transform coefficients and applies an inverse transform, e.g., an inverse DCT, an inverse integer transform, or a conceptually similar inverse transform process, to the transform coefficients in order to produce residual blocks in the pixel domain. In some examples, inverse transform processing unit 88 may receive transform coefficients that were generated by a video encoder based on the transform unit partitioning techniques.

After motion compensation processing unit 82 or intra prediction processing unit 84 generates the predictive block for the current video block based on the motion vectors and other syntax elements, video decoder 30 forms a decoded video block by summing the residual blocks from inverse transform processing unit 88 with the corresponding predictive blocks generated by motion compensation processing unit 82. Summer 90 represents the component or components that perform this summation operation.

If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

In the illustrated example of FIG. 3 video decoder 30 may receive a non-entropy encoded set of profile, tier, and level syntax structures.

Video decoder 30 may refer to one of the profile, tier, and level syntax structures for each of a plurality of output layer sets and decode video data of one of the output layer sets based on information from the profile, tier, and level syntax structure referred to for the output layer set.

In some examples, the video coder may transmit or receive an SPS with a nuh_layer_id equal to 0, wherein the SPS includes a profile, tier, and level syntax structure for a layer of video data. Video decoder 30 may receive an SPS with a nuh_layer_id equal to 0, wherein the SPS includes a profile, tier, and level syntax structure for a layer of video data.

In some examples, when a layer with nuh_layer_id greater than 0 refers to the SPS, video decoder 30 might not decode video data of the layer with nuh_layer_id greater than 0 using the profile, tier, and level syntax structure of the SPS.

Video decoder 30 may transmit an output layer flag [i][j] that, when equal to 1, specifies that a j-th layer in the layer set is a target output layer of an i-th output layer set, and, when equal to 0, specifies that the j-th layer in the layer set is not the target output layer of the i-th output layer set.

Video decoder 30 may also generate the output layer set based on the output layer flag [i][j].

In the illustrated example of FIG. 3, video decoder 30 may decode multilayer video data including layers of video data.

Video decoder 30 may receive a non-entropy encoded layer dependency information at a position within a VPS extension prior to syntax elements of the VPS extension that are entropy encoded.

Video decoder 30 may encode video data of one or more of the layers of video data based on the non-entropy encoded layer dependency information. The layer dependency information indicates whether one of the layers may be a direct reference layer for another of the layers.

In some examples, the layer dependency information includes a direct_dependency_flag[i][j] that, when equal to 0, specifies that a layer with index j is not a direct reference layer for a layer with index i, and when equal to 1, specifies that the layer with index j may be a direct reference layer for the layer with index i.

In some examples, this disclosure describes methods for enhanced designs of VPS and SPS for HEVC extensions, including changes to signaling of profile, tier, and level information for output layer sets, signaling of output layer sets, and signaling of layer dependency. In some examples, this disclosure also describes methods for enhanced designs of VPS and SPS for HEVC extensions, including changes to signaling of information on representation format (spatial resolution, color format, and bit depth in the VPS (extension) for session negotiation as well as efficient signaling of SPS parameters with individual control of different categories.

In some examples, the current VPS and SPS designs may be associated at least with the following problems: (1) because the syntax element vps_num_layer_sets_minus1 is ue(v) coded and there are also other ue(v) coded syntax elements before it, currently accessing of the profile, tier, and level for layer sets needs entropy decoding; (2) similarly, layer dependency information is not accessible without entropy decoding; and (3) signaling of output layer set is problematic and not efficient, because: (a) the syntax element layer_id_included_flag[ ][ ] used for output_layer_set_idx[i] equal to 0 is for layer set 0, while for layer set 0 layer_id_included_flag[ ][ ] is not defined in HEVC version 1 (i.e. HEVC WD10), (b) it is clear that the target output layer for layer set 0 is layer 0 (the base layer) anyway, (c) currently at most one output layer set can be signalled for each layer set and (d) currently, the syntax uses a loop of layer IDs from 0 to the greatest possible layer ID in the VPS is complicated.

In multiview scenarios, the case is often that one layer set is associated with multiple sets of different target output layers. Thus, the syntax element output_layer_flag[1sIdx][j] is changed to output_layer_flag[i][j], and related semantics are changed accordingly, and, as mentioned above in item (d), currently, the syntax uses a loop of layer IDs from 0 to the greatest possible layer ID in the VPS is complicated. It would be much simpler just to use a loop of the layers in the layer set, excluding the highest layer in the layer set as that layer is surely a target output layer.

According to one example, video decoder 30 may decode more than one output layer set for one layer set. In some examples, the decoding may be performed by entropy encoding processing unit 80.

According to another example, video decoder 30 may decode all profile, tier, level information in the VPS, potentially in a way that it is accessible without having to entropy decoding. In some examples, the decoding may be performed by entropy decoding processing unit 80, however, without entropy decoding. Accordingly, decoding may also be performed by devices that do not have an entropy decoder.

According to another example, video decoder 30 may decode layer dependency information in the VPS such that it is accessible without entropy decoding. In some examples, the decoding may be performed by entropy decoding processing unit 80, however, without entropy encoding. Accordingly, decoding may also be performed by devices that do not have an entropy decoder.

According to another example, video decoder 30 may decode representation format in the VPS, potentially in a way that it is accessible without entropy decoding, i.e., without entropy encoding the representation format in the VPS. In some examples, the decoding may be performed by entropy decoding processing unit 80, however, without entropy decoding. Accordingly, decoding may also be performed by devices that do not have an entropy decoder. Video decoder 30 may decode representation format in the VPS, potentially without entropy decoding in accordance with the techniques of this disclosure, and each layer may be associated with a particular representation format.

According to another example, video decoder 30 may decode visual signal information (video_format, video_full_range_flag, colour_primaries, transfer_characteristics, matrix_coeffs) per layer in the VPS in accordance with the techniques of this disclosure. In some examples, the encoding may be performed by entropy encoding processing unit 80. In some examples, the video_format parameter indicates a format of a representation of pictures to be coded. The video_full_range_flag parameter indicates the black level and range of the luma and chroma signals. The colour_primaries parameter indicates the chromaticity coordinates of the source primaries. The transfer_characteristics parameter indicates the opto-electronic transfer characteristic of the source picture. The matrix_coeffs parameter describes the matrix coefficients used in deriving luma and chroma signals from the green, blue, and red primaries.

According to another example, an SPS may be shared by layers with different spatial resolutions, bit depth, or color formats in accordance with the techniques of this disclosure. Video decoder 30 may decode the SPS. In some examples, the encoding may be performed by entropy encoding processing unit 80.

According to another example, no timing information is provided in VUI of SPSs with layer ID greater than 0 in accordance with the techniques of this disclosure. Video decoder 30 may decode the SPS. In some examples, the decoding may be performed by entropy decoding processing unit 80.

According to another example, no explicit signaling of target output layers is provided for the default output layer sets in accordance with the techniques of this disclosure. Video decoder 30 may decode the default output layer sets. In some examples, the decoding may be performed by entropy decoding processing unit 80.

According to another example, signaling of the maximum number of temporal sub-layers that may be present (sps_max_sub_layers_minus1) and whether inter prediction is additionally restricted (sps_temporal_id_nesting_flag) occurs in an SPS only when nuh_layer_id_is equal to 0. Video decoder 30 may decode video data without coding, in SPSs with layer ID greater than 0, the maximum number of temporal sub-layers that may be present in each CVS referring to the SPS and whether inter prediction is additionally restricted for CVSs referring to the SPS. In some examples, the decoding may be performed by entropy decoding processing unit 80.

According to another example, syntax element output_layer_set_idx[i] may be changed to output_layer_set_idx_minus1[i] in accordance with the techniques of this disclosure. Video decoder 30 may decode the syntax element output_layer_set_idx_minus1[i] to indicate the index of the layer set corresponding to the i-th output layer set specified by the VPS.

In the examples below, bracketed labels (e.g., [START EXAMPLE A] and [END EXAMPLE A]) will be used to indicate text related to the example indicated. Changes may be indicated with respect to a current version of the SHVC, which as of Apr. 2, 2013 is downloadable from: http://phenix.int-evry.fr/jct/doc_end_user/documents/12_Geneva/wg11/JCTVC-L1008-v1.zip or MV-HEVC standard, which as of Apr. 2, 2013 is downloadable from: http://phenix.it-sudparis.eu/jct2/doc_end_user/documents/3_Geneva/wg11/JCT3V-C1004-v4.zip Several changes on signaling of profile, tier, and level information for layer sets, signaling of output layer sets, and signaling of layer dependency, are indicated by [START EXAMPLE A] and [END EXAMPLE A] which will be used in this submission to indicate example A included herein, according to aspects of this disclosure.

Due to the fact that the syntax element vps_num_layer_sets_minus1 is ue(v) coded (i.e., entropy encoded) and there are also other ue(v) coded syntax elements before it, currently accessing of the profile, tier, and level for layer sets needs entropy decoding. For this information to be accessible without entropy decoding, a set of profile_tier_ level( ) syntax structures may be signalled at a position that is accessible without entropy decoding. The set of profile_tier_level( ) syntax structures may then be referenced for linking to output layer sets. Multiple output layer sets of the same layer set may need different DPB sizes, and hence can conform to different levels.

In some examples, the syntax element output_layer_set_idx[i] may be changed to output layer set_idx_minus1[i], as described below. When an SPS with nuh_layer_id equal to 0 is referred by a layer with nuh_layer_id greater than 0, the profile_tier_level( ) syntax structure in the SPS is not applied for that layer. For the similar reason as above, the signaling of layer dependency is moved up to be accessible without entropy decoding. Changing of the syntax element output_layer_set_idx[i] to output_layer_set_idx_minus1[i] is due to the following reasons. The syntax element layer_id_included_flag[ ][ ] used for output_layer_set_idx[i] equal to 0 is for layer set 0, while for layer set 0 layer_id_included_flag[ ][ ] is not defined. It is clear that the target output layer for layer set 0 is layer 0 (the base layer).

Accordingly, as can be seen above, each layer needs to refer to an SPS. Conventionally, any two layers that are of different values of spatial resolutions, bit depths, or color formats have to refer to two different SPSs as these representation format parameters are signalled in the SPS. However, when these parameters for all SPSs except those with nuh_layer_id equal to 0 are moved to the VPS, and when it is specified that the representation format parameters in an SPS with nuh_layer_id equal to 0 that is referred to by a layer with nuh_layer_id greater than 0 are ignored, it is possible for layers with different values of spatial resolutions, bit depths, or color formats to refer to the same SPSs. In other words, according to some embodiments of this disclosure, layers with different values of spatial resolutions, bit depths, or color formats can share the same SPSs, as long as other SPS.

Some examples described herein may change the syntax and semantics for output layer set signaling. In some cases, this may solve one or more of the following issues, first currently at most one output layer set can be signalled for each layer set. In multiview scenarios, the case is often that one layer set is associated with multiple sets of different target output layers. Thus, the syntax element output_layer_flag[1sIdx][j] may be changed to output_layer_flag[i][j], and related semantics are changed accordingly. Accordingly, more than one output layer set may be signalled for one layer set. Second, currently, the syntax uses a loop of layer IDs from 0 to the greatest possible layer ID in the VPS, which is complicated. Rather, it would be much simpler just to use of a loop of the layers in the layer set, excluding the highest layer in the layer set as that layer is surely a target output layer.

Signaling of information on representation format (spatial resolution, colour format, and bit depth in the VPS (extension) for session negotiation, for which the changes are indicated using bracketed labels [START EXAMPLE B] and [END EXAMPLE B] which will be used in this submission to indicate example B. The representation format is signalled for each layer, including the base layer, through an index to a list of such information, and is not signalled in SPSs with nuh_layer_id greater than 0, same as for the profile_tier_level( ) syntax structure. Consequently, this also reduces redundantly sending the same representation format information in different SPSs with nuh_layer_id greater than 0. When an SPS with nuh_layer_id equal to 0 is referred by a layer with nuh_layer_id greater than 0, the values of the syntax elements chroma_format_idc, separate_colour_plane_flag, pic_width_in_luma_samples, pic_height_in_luma_samples, bit_depth_luma_minus8, and bit_depth_chroma_minus8 are not applied for that layer.

When efficient signaling of SPS parameters with individual control of different categories, the parameters that may be included in SPSs may be classified into the following six categories: (1) Cat1: profile-tier-level information, already addressed in Scalable HEVC Video Coding (SHVC) WD1 and Multi-View HEVC (MV-HEVC) WD3 and above, (2) Cat2: representation format information, addressed above, (3) Cat3: sub-layer information (sps_max_sub_layers_minus1, sps_temporal_id_nesting_flag, sps_max_dec_pic_buffering_minus1[i], sps_max_num_reorder_pics[i], and sps_max_latency_increase_plus1[i]) (These changes are indicated by bracketed labels [START EXAMPLE C] and [END EXAMPLE C] which will be used in this submission to indicate example C, which is also referred to as and Cat3), (4) Cat4: short-term reference picture set (RPS) candidates (the changes for this are indicated by bracketed labels [START EXAMPLE D] and [END EXAMPLE D], which will be used in this submission to indicate example D, which is also referred to as Cat4, (5) Cat5: Video Usability Information (VUI) parameters (the changes for this are indicated by bracketed labels [START EXAMPLE E] and [END EXAMPLE E], which will be used in this submission to indicate example E, which is also referred to as Cat 5), and (6) Cat6: other SPS parameters, the changes for this and the common changes are indicated by bracketed labels [START EXAMPLE F] and [END EXAMPLE F] will be used in this submission to indicate example F, also referred to as Cat6.

For enhancement layers or layer sets involving enhancement layers, information of categories 3 to 6 may be either inherited from the active VPS or directly signalled in the SPS, while information of categories 1 and 2 has to be signalled in the VPS due to the importance for session negotiation. In an SPS with nuh_layer_id greater than 0, to the minimum only three syntax elements to signal the VPS ID, SPS ID and a flag (to indicate whether data of categories 3 to 6 (Cat3 to Cat6) are present in the SPS or inherited from the active VPS) are present. Such a dummy SPS's role is only to pass the active VPS ID to the Picture Parameter Sets (PPS) and then indirectly to the Video Coding Layer (VCL) Network Abstraction Layer (NAL) units.

Changes below are based on MV-HEVC WD3 and SHVC WD1 and are identified by different color codes, i.e., highlighted in different colors, as noted above, and removals are shown as strikethrough texts. Parts that are not mentioned are the same as in MV-HEVC WD3 and SHVC WD1.

Illustrated below in Table 3 is example syntax for a video parameter set (VPS) for the raw byte sequence payload (RBSP) syntax and semantics. This is the same as in SHVC WD1 and MV-HEVC WD3. The syntax is copied below (in Table 3) for convenience.

TABLE 3

Example syntax for VPS for RBSP syntax and semantics

| video_parameter_set_rbsp( ) { | Descriptor |
|---|---|
| vps_video_parameter_set_id | u(4) |
| vps_reserved_three_2bits | u(2) |
| vps_max_layers_minus1 | u(6) |
| vps_max_sub_layers_minus1 | u(3) |
| vps_temporal_id_nesting_flag | u(1) |
| vps_extension_offset //vps_reserved_0xffff_16bits | u(16) |
| profile_tier_level( 1, vps_max_sub_layers_minus1 ) | |

TABLE 3-continued

Example syntax for VPS for RBSP syntax and semantics

| video_parameter_set_rbsp( ) { | Descriptor |
|---|---|
| vps_sub_layer_ordering_info_present_flag | u(1) |
| for( i = ( vps_sub_layer_ordering_info_present_flag ? 0 : vps_max_sub_layers_minus1 ); | |
| i <= vps_max_sub_layers_minus1; i++ ) { | |
| vps_max_dec_pic_buffering_minus1[ i ] | ue(v) |
| vps_max_num_reorder_pics[ i ] | ue(v) |
| vps_max_latency_increase_plus1[ i ] | ue(v) |
| } | |
| vps_max_layer_id | u(6) |
| vps_num_layer_sets_minus1 | ue(v) |
| for( i = 1; i <= vps_num_layer_sets_minus1; i++ ) | |
| for( j = 0; j <= vps_max_layer_id; j++ ) | |
| layer_id_included_flag[ i ][ j ] | u(1) |
| vps_timing_info_present_flag | u(1) |
| if( vps_timing_info_present_flag ) { | |
| vps_num_units_in_tick | u(32) |
| vps_time_scale | u(32) |
| vps_poc_proportional_to_timing_flag | u(1) |
| if( vps_poc_proportional_to_timing_flag ) | |
| vps_num_ticks_poc_diff_one_minus1 | ue(v) |
| vps_num_hrd_parameters | ue(v) |

TABLE 3-continued

Example syntax for VPS for RBSP syntax and semantics

| video_parameter_set_rbsp( ) { | Descriptor |
|---|---|
| for( i = 0; i < vps_num_hrd_parameters; i++ ) { | |
| hrd_layer_set_idx[ i ] | ue(v) |
| if( i > 0 ) | |
| cprms_present_flag[ i ] | u(1) |
| hrd_parameters( cprms_present_flag[ i ], vps_max_sub_layers_minus1 ) | |
| } | |
| vps_extension_flag | u(1) |
| if( vps_extension_flag ) { | |
| vps_extension( ) | |
| vps_extension2_flag | u(1) |
| if( vps_extension2_flag ) | |
| while( more_rbsp_data( ) ) | |
| vps_extension_data_flag | u(1) |
| } | |
| rbsp_trailing_bits( ) | |
| } | |

Table 4 illustrates an example of video parameter set extension and semantics.

TABLE 4

Video parameter set extension syntax and semantics

| vps extension( ) { | Descriptor |
|---|---|
| while( !byte_aligned( ) ) | |
| vps_extension_byte_alignment_reserved_one_bit | u(1) |
| avc_base_layer_flag | u(1) |
| splitting_flag | u(1) |
| for( i = 0, NumScalabilityTypes = 0; i < 16; i++ ) { | |
| scalability_mask[ i ] | u(1) |
| NumScalabilityTypes += scalability_mask[ i ] | |
| } | |
| for( j = 0; j <NumScalabilityTypes; j++ ) | |
| dimension_id_len_minus1[ j ] | u(3) |
| vps_nuh_layer_id_present_flag | u(1) |
| for( i = 1; i <= vps_max_layers_minus1; i++ ) { | |
| if( vps_nuh_layer_id_present_flag ) | |
| layer_id_in_nuh[ i ] | u(6) |
| for( j = 0; j < NumScalabilityTypes; j++ ) | |
| dimension_id[ i ][ j ] | u(v) |
| } | |
| [START EXAMPLE A] vps_num_profile_tier_level_minus1 | u(6) |
| for( i = 1; i <= vps_num_profile_tier_level_minus1; i++ ) { | |
| vps_profile_present_flag[ i ] | u(1) |
| if( !vps_profile_present_flag[ i ] ) | |
| profile_ref_minus1[ i ] | u(6) |
| profile_tier_level( vps_profile_present_flag[ i ], vps_max_sub_layers_minus1) | |
| } | |
| for( i = 1; i <= vps_max_layers_minus1; i++ ) | |
| for( j = 0; j < i; j++ ) | |
| direct_dependency_flag[ i ][ j ] | u(1) [END EXAMPLE A] |
| [START EXAMPLE B] vps_num_rep_fromats | u(4) |
| for( i = 0; i < vps_num_rep_fromats; i++ ) | |
| rep_format( ) | |
| for( i = 1; i <= vps_max_layers_minus1; i++ ) | |
| if( vps_num_rep_fromats > 1) | |
| vps_rep_format_idx[ i ] | u(4) [END EXAMPLE B] |
| [START EXAMPLE C] for( i = 1; i <= vps_max_layers_minus1; i++ ) | |
| { | |
| max_sub_layers_vps_predict_flag[ i ] | u(1) |
| if( !max_sub_layers_vps_predict_flag[ i ] ) | |
| max_sub_layers_vps_minus1[ i ] | u(3) |
| } // fixed-length-coded info until above [END EXAMPLE C] | |
| [START EXAMPLE A] multiple_output_layer_sets_in_layer_set_flag | u(1) |
| if( !multiple_output_layer_sets_in_layer_set_flag ) | |
| numOutputLayerSets = vps_num_layer_sets_minus1 + 1 | |

TABLE 4-continued

Video parameter set extension syntax and semantics

```
else {
  num_output_layer_sets_minus1                                            ue(v)
  numOutputLayerSets = num_output_layer_sets_minus1 + 1
}
for( i = 1; i < numOutputLayerSets; i++ ) {
  if( i > vps_num_layer_sets_minus1 ) {
    output_layer_set_idx_minus1[ i ]                                      u(v)
    lsIdx = output_layer_set_idx_minus1[ i ] + 1
    for( j = 0 ; j < NumLayersInIdList[ lsIdx ] − 1; j++)
      output_layer_flag[ i ][ j ]                                         u(1)
  }
  profile_level_tier_idx[ i ]                                             u(v)
}
for( lsIdx = 1; lsIdx <= vps_num_layer_sets_minus1; lsIdx++ ) {
  vps_profile_present_flag[ lsIdx ]                                       u(1)
  if( !vps_profile_present_flag[ lsIdx ] )
    profile_layer_set_ref_minus1[ lsIdx ]                                 ue(v)
  profile_tier_level( vps_profile_present_flag[ lsIdx ],
vps_max_sub_layers_minus1 )
}
num_output_layer_sets                                                     ue(v)
for( i = 0; i < num_output_layer_sets; i++ ) {
  output_layer_set_idx[ i ]                                               ue(v)
  lsIdx = output_layer_set_idx[ i ]
  for( j = 0 ; j <= vps_max_layer_id; j++)
    if( layer_id_included_flag[ lsIdx ][ j ] )
      output_layer_flag[ lsIdx ][ j ]                                     u(1)
}
for( i = 1; i <= vps_max_layers_minus1; i++ )
  for( j = 0; j < i; j++ )
    direct_dependency_flag[ i ][ j ]                                      u(1) [END EXAMPLE A]
[START EXAMPLE F] vps_num_other_sps_params                                ue(v)
for( i = 0; i < vps_num_other_sps_params; i++)
  other_sps_parameters( ) [END EXAMPLE F]
[START EXAMPLE D] vps_num_st_rps_candidates                               ue(v)
for( i = 0; i < vps_num_st_rps_candidates; i++ )
  short_term_rps_candidates( ( i = = 0 ) ? 0 : 1 )[END EXAMPLE
D]
[START EXAMPLE E] vps_num_vui_params                                      ue(v)
for( i = 0; i < vps_num_vui_params; i++ )
  vui_parameters( 0 ) [END EXAMPLE E]
[START EXAMPLE F] for( i = 1; i <= vps_max_layers_minus1; i++
)
{
  if( vps_num_other_sps_params > 1 )
    vps_other_sps_params_idx[ i ]                                         u(v) [END EXAMPLE F]
[START EXAMPLE D] if( vps_num_st_rps_candidates > 1 )
    vps_st_rps_idx[ i ]                                                   u(v) [END EXAMPLE D]
[START EXAMPLE E] if( vps_num_vui_params > 1 )
    vps_vui_params_idx[ i ]                                               u(v)
} [END EXAMPLE E]
[START EXAMPLE C] for( i = 1; i < numOutputLayerSets; i++
) {
  sub_layer_vps_buf_info_predict_flag[ i ]                                u(1)
  if( !sub_layer_vps_buff_info_predict_flag[ i ] ) {
    sub_layer_vps_buf_info_present_flag[ i ]                              u(1)
    for( j = (sub_layer_vps_buf_info_present_flag[ i ] ? 0 :
MaxSubLayers[ i ] − 1 );
         j <= MaxSubLayers[ i ] − 1; j++
)
      max_vps_dec_pic_buffering_minus1[ i ][ j ]                          ue(v)
  }
}
for( i = 1; i <= vps_max_layers_minus1; i++ ) {
  if( max_sub_layers_vps_predict_flag[ i ] )
    sub_layer_vps_ordering_info_predict_flag[ i ]                         u(1)
  if( !sub_layer_ordering_info_predict_flag[ i ] ) {
    sub_layer_vps_ordering_info_present_flag[ i ]                         u(1)
    for( j = ( sub_layer_vps_ordering_info_present_flag[ i ] ? 0 :
         max_sub_layers_vps_minus1[ i ] ); j
<= max_sub_layers_vps_minus1 [ i ]; j++ )
      max_vps_num_reorder_pics[ i ][ j ]                                  ue(v)
      max_vps_latency_increase_plus1[ i ][ j ]                            ue(v)
  }
}
}[END EXAMPLE C]
}
```

The parameter vps_num_profile_tier_level_minus1 plus 1 specifies the number of profile_tier_level( ) syntax structures in the VPS. The vps_profile_present_flag[i] equal to 1 specifies that the profile and tier information is present in the i-th profile_tier_level( ) syntax structure. vps_profile_present_flag[1sIdx] equal to 0 specifies that profile and tier information is not present in the i-th profile_tier_level( ) syntax structure and may be inferred for the i-th profile_tier_level( ) syntax structure.

The parameter profile_ref_minus1[i] specifies that the profile and tier information for the i-th profile_tier_level( ) syntax structure may be inferred to be equal to the profile and tier information for the (profile_ref_minus1[i]+1)-th profile_tier_level( ) syntax structure. The value of profile_ref_minus1[i]+1 may be less than i.

The parameter direct_dependency_flag[i][j] equal to 0 specifies that the layer with index j is not a direct reference layer for the layer with index i. direct_dependency_flag[i][j] equal to 1 specifies that the layer with index j may be a direct reference layer for the layer with index i. When direct_dependency_flag[i][j] is not present for i and j in the range of 0 to vps_max_layers_minus1, it may be inferred to be equal to 0.

The variables NumDirectRefLayers[i] and RefLayerId[i][j] may be derived as follows:
for(i=1; i<=vps_max_layers_minus1; i++)
for(j=0, NumDirectRefLayers[i]=0; j<i; j++)
if(direct_dependency_flag[i][j]==1)
RefLayerId[i][NumDirectRefLayers[i]++]=layer_id_in_nuh[j][END EXAMPLE A]

[START EXAMPLE B] The parameter vps_num_rep_formats specifies the number of the following rep_format( ) syntax structures in the VPS. The vps_rep_format_idx[i] specifies the index, into the set of rep_format( ) syntax structures in the VPS, of the rep_format( ) syntax structure that applies to the layer with nuh_layer_id equal to layer_id_in_nuh[i]. When i is equal to 0 or vps_num_rep_formats is equal to 1, the value of vps_rep_format_idx[i] may be inferred to be equal to 0. The value of vps_rep_format_idx[i] may be in the range of 0 to vps_num_rep_formats−1, inclusive. [END EXAMPLE B]

[START EXAMPLE C] max_sub_layers_vps_predict_flag[i] equal to 1 specifies that max_sub_layers_vps_minus1[i] may be inferred to be equal to max_sub_layers_vps_minus1[i−1] and that sub_layer_vps_ordering_predict_flag[i] is present. max_sub_layers_vps_predict_flag[i] equal to 0 specifies that max_sub_layers_vps_minus1[i] is explicitly signalled. The value of max_sub_layers_vps_predict_flag[0] may be inferred to be equal to 0.

The parameter max_sub_layers_vps_minus1[i] is used for the inference of the SPS syntax element sps_max_sub_layers_minus1. When max_sub_layers_vps_predict_flag[i] is equal to 1, max_sub_layers_vps_minus1[i] may be inferred to be equal to max_sub_layers_vps_minus1[i−1]. The value of max_sub_layers_vps_minus1[i] may be inferred to be equal to vps_max_sub_layers_minus1. [END EXAMPLE C][START EXAMPLE A] multiple_output_layer_sets_in_layer_set_flag equal to 1 specifies that more than one output layer set may be specified by the VPS for each layer set. multiple_output_layer_sets_in_layer_set_flag equal to 0 specifies that only one output layer set is specified by the VPS for each layer set, with the highest layer being the only target output layer. Accordingly, because multiple_output_layer_sets_in_layer_set_flag equal to 0 specifies that only one output layer set is specified by the VPS for each layer set, with the highest layer being the only target output layer, no explicit signaling of target output layers for the default output layer sets is needed. For example, there is not need to signal which layers are to be output because there is only one output layer set for each layer set.

The parameter num_output_layer_sets_minus1 plus 1 specifies the number of output layer sets specified by the VPS. The value of num_output_layer_sets_minus1 may be in the range of 0 to 1023, inclusive. [END EXAMPLE A]

Alternatively, instead of num_output_layer_sets_minus1, num_addn_output layer sets which indicates the number of output layer sets in addition to the vps_num_layers_sets_minus1+1 may be signalled.

[START EXAMPLE A] The parameter output layer set_idx_minus1[i] plus 1 specifies the index of the layer set for the i-th output layer set. The value of output_layer_set_idx_minus1[i] may be in the range of 0 to vps_num_layer_sets_minus1−1, inclusive. The length of the output_layer_set_idx_minus1[i] syntax element is Ceil(Log 2(vps_num_layer_sets_minus1)) bits output_layer_flag[i][j] equal to 1 specifies that the j-th layer in the layer set is a target output layer of the i-th output layer set. output_layer_flag[i][j] equal to 0 specifies that the j-th layer in the layer set is not a target output layer of the i-th output layer set.

The value of output_layer_flag[i][NumLayersInIdList[1sIdx]−1] may be inferred to be equal to 1, where 1sIdx is equal to output layer set_idx_minus1[i]+1.
[END EXAMPLE A]

Alternatively, the value of output_layer_flag[i][NumLayersInIdList[1sIdx]−1] may be inferred to be equal to 1, where 1sIdx is equal to output layer set_idx_minus1[i]+1 and i is in the range of 0 to vps_num_layer_sets_minus1, inclusive and the value of output_layer_flag[i][j] may be inferred to be equal to 0 for i in the range of 0 to vps_num_layer_sets_minus1, inclusive, and j in the range of 0 to NumLayerIdInList[1sIdx]−2, inclusive and 1sIdx is equal to output_layer_set_idx_minus1[i]+1.

[START EXAMPLE A] The parameter profile_level_tier_idx[i] specifies the index, into the set of profile_tier_level( ) syntax structures in the VPS, of the profile_tier_level( ) syntax structure that applies to i-th output layer set. The length of the profile_level_tier_idx[i] syntax element may be Ceil(Log 2(vps_num_profile_tier_level_minus1+1)) bits. The value of profile_level_tier_idx[0] may be inferred to be equal to 0. The value of profile_level_tier_idx[i] may be in the range of 0 to vps_num_profile_tier_level_minus1, inclusive. [END EXAMPLE A]

[START EXAMPLE F] The parameter vps_num_other_sps_params specifies the number of the following other_sps_parameters( ) syntax structures in the VPS. The value of vps_num_other_sps_params may be in the range of 0 to 15, inclusive. [END EXAMPLE F]

[START EXAMPLE D] The parameter vps_num_st_rps_candidates specifies the number of the following short_term_rps_candidates( ) syntax structures in the VPS. The value of vps_num_st_rps_candidates may be in the range of 0 to 15, inclusive. [END EXAMPLE D]

[START EXAMPLE E] The parameter vps_num_vui_params specifies the number of the following vui_parameters( ) syntax structures in the VPS. The value of vps_num_vui_params may be in the range of 0 to 15, inclusive. [END EXAMPLE E]

[START EXAMPLE F] vps_other_sps_params_idx[i] specifies the index, into the set of other_sps_parameters( ) syntax structures in the VPS, of the other_sps_parameters( ) syntax structure that applies to the layer with nuh_layer_id equal to layer_id_in_nuh[i]. The length of the vps_ other_sps_params_idx[i] syntax element may be Ceil(Log 2(vps_num_other_sps_params)) bits. When vps_num_other_sps_params is equal to 1, the value of vps_other_sps_params_idx[i] may be inferred to be equal to 0. The value of vps_other_sps_params_idx[i] may be in the range of 0 to vps_num_other_sps_params−1, inclusive. [END EXAMPLE F]

[START EXAMPLE D] The parameter vps_st_rps_idx[i] specifies the index, into the set of short_term_rps_candidates( ) syntax structures in the VPS, of the short_term_rps_candidates( ) syntax structure that applies to the layer with nuh_layer_id equal to layer_id_in_nuh[i]. The length of the vps_st_rps_idx[i] syntax element may be Ceil(Log 2(vps_num_st_rps_candidates)) bits. When vps_num_st_rps_candidates is equal to 1, the value of vps_st_rps_idx[i] may be inferred to be equal to 0. The value of vps_st_rps_idx[i] may be in the range of 0 to vps_num_st_rps_candidates−1, inclusive. [END EXAMPLE D]

[START EXAMPLE E] The parameter vps_vui_params_idx[i] specifies the index, into the set of vui_parameters( ) syntax structures in the VPS, of the vui_parameters( ) syntax structure that applies to the layer with nuh_layer_id equal to layer_id_in_nuh[i]. The length of the vps_vui_params_idx[i] syntax element may be Ceil(Log 2(vps_num_vui_params)) bits. When vps_num_vui_params is equal to 1, the value of vps_vui_params_idx[i] may be inferred to be equal to 0. The value of vps_vui_params_idx [i] may be in the range of 0 to vps_num_vui_params−1, inclusive. [END EXAMPLE E]

[START EXAMPLE C] The variable MaxSubLayers [setId] for setId in the range of 0 to num_output_layer_sets−1, inclusive, is derived as follows:

```
for( setId = 0; setId < num_output_layer_sets; setId++ ) {
    lsIdx = outptut_layer_set_idx_minus1[ setId ] + 1 // Layer set
        index
    highestLayerId =
LayerSetLayerIdList[ lsIdx ][ NumLayersInIdList[ lsIdx ] − 1 ]
    MaxSubLayers[ setId ] = ( max_sub_layers_vps_minus1[
        highestLayerId ] + 1 )
}
```

The parameter max_sub_layers_vps_predict_flag[i] equal to 1 specifies that max_sub_layers_vps_minus1[i] may be inferred to be equal to max_sub_layers_vps_minus1[i−1] and that sub_layer_vps_ordering_predict_flag[i] is present. max_sub_layers_vps_predict_flag[i] equal to 0 specifies that max_sub_layers_vps_minus1[i] is explicitly signalled. The value of max_sub_layers_vps_predict_flag[0] may be inferred to be equal to 0.

The parameter sub_layer_vps_buf_info_predict_flag[i] equal to 1 specifies that max_vps_dec_pic_buffering_minus1[i][j] may be inferred to be equal to max_vps_dec_pic_buffering_minus1[i−1][j] for each value of j. sub_layer_vps_buf_info_predict_flag[i] equal to 0 specifies that max_vps_dec_pic_buffering_minus1[i][j] for at least one value of j is explicitly signalled.

The parameter sub_layer_vps_buf_info_present_flag[i] equal to 1 specifies that max_vps_dec_pic_buffering_minus1[i][j] are present for MaxSubLayers[i] sub-layers. sub_layer_vps_buf_info_present_flag[i] equal to 0 specifies that the values of max_vps_dec_pic_buffering_minus1[i] [MaxSubLayers[i]−1] apply to all sub-layers.

The parameter max_vps_dec_pic_buffering_minus1[i][j] are used for inference of the values of the SPS syntax elements sps_max_dec_pic_buffering_minus1[j]. When max_vps_dec_pic_buffering_minus1[i][j] is not present for i in the range of 0 to MaxSubLayers[i]−2, inclusive, due to sub_layer_vps_buf_info_present_flag[i] being equal to 0, it may be inferred to be equal to max_vps_dec_pic_buffering_minus1[i][MaxSubLayers[i]−1].

The value of max_vps_dec_pic_buffering_minus1[0][j] for each value of j may be inferred to be equal to vps_max_dec_pic_buffering_minus1[j].

The parameter sub_layer_vps_ordering_info_predict_flag[i] equal to 1 specifies that the syntax elements sub_layer_vps_ordering_info_present_flag[i], max_vps_num_reorder_pics[i][j], and max_vps_latency_increase_plus1[i][j] are inferred to be equal to sub_layer_vps_ordering_info_present_flag[i−1], max_vps_num_reorder_pics[i−1][j], and max_vps_latency_increase_plus1 [i−1][j], respectively. sub_layer_vps_ordering_info_predict_flag[i] equal to 0 indicates that the syntax elements sub_layer_vps_ordering_info_present_flag[i], max_vps_num_reorder_pics[i][j], and max_vps_latency_increase_plus1[i][j] are explicitly signalled. When not present, the value of sub_layer_vps_ordering_info_predict_flag[i] is set equal to 0.

The parameter sub_layer_vps_ordering_info_present_flag[i] equal to 1 specifies that max_vps_num_reorder_pics[i][j] and max_vps_latency_increase_plus1[i][j] are present for max_sub_layers_vps_minus1+1 sub-layers. sub_layer_vps_ordering_info_present_flag[i] equal to 0 specifies that the values of max_vps_num_reorder_pics[i] [vps_max_sub_layers_minus1] and max_vps_latency_increase_plus1[i][max_sub_layers_vps_minus1] apply to all sub-layers.

The parameter max_vps_num_reorder_pics[i][j] is used for inference of the values of the SPS syntax element sps_max_num_reorder_pics[j]. When max_vps_num_reorder_pics[i][j] is not present for i in the range of 0 to max_sub_layers_vps_minus1[i]−1, inclusive, due to sub_layer_vps_ordering_info_present_flag[i] being equal to 0, it may be inferred to be equal to max_vps_num_reorder_pics[i][max_sub_layers_vps_minus1[i]].

The parameter max_vps_latency_increase_plus 1[i][j] is used for inference of the values of the SPS syntax elements sps_max_latency_increase_plus1[j]. When max_vps_latency_increase_plus1 [i][j] is not present for i in the range of 0 to max_sub_layers_vps_minus1[i]−1, inclusive, due to sub_layer_vps_ordering_info_present_flag[i] being equal to 0, it may be inferred to be equal to max_vps_latency_increase_plus1[i][max_sub_layers_vps_minus1[i]]. [END EXAMPLE C]

[START EXAMPLE B]

Table 5 illustrates an example of a representative format and semantics.

TABLE 5

Representation format syntax and semantics

| rep_format( ) { | Descriptor |
|---|---|
| chroma_format_vps_idc | u(2) |
| if( chroma_format_vps_idc = = 3 ) | |
| separate_colour_plane_vps_flag | u(1) |
| pic_width_vps_in_luma_samples | u(16) |
| pic_height_vps_in_luma_samples | u(16) |
| bit_depth_vps_luma_minus8 | u(3) |
| bit_depth_vps_chroma_minus8 | u(3) |
| } | |

The parameter chroma_format_vps_idc, separate_colour_plane_vps_flag, pic_width_vps_in_luma_samples, pic_height_vps_in_luma_samples, bit_depth_vps_luma- _minus8, and bit_depth_vps_chroma_minus8 may be used for inference of the values of the SPS syntax elements chroma_format_idc, separate_colour_plane_flag, pic_width_in_luma_samples, pic_height_in_luma_samples, bit_depth_luma_minus8, and bit_depth_chroma_minus8, respectively, for each SPS that refers to the VPS. For each of these syntax elements, all constraints, if any, that apply to the value of the corresponding SPS syntax element also apply. [END EXAMPLE B] Representation format information may generally include bit depth, chroma sampling format, resolution of the sequences, for example. As illustrated in the example of Table 5, the representation format may include chroma_format_vps_idc, separate_colour_plane_vps_flag, pic_width_vps_in_luma_samples, pic_height_vps_in_luma_samples, bit_depth_vps_luma_minus8, and bit_depth_vps_chroma_minus8. Furthermore, as illustrated in Table 5, signaling of representation format in the VPS may be performed such that the representation format, e.g., chroma_format_vps_idc, separate_colour_plane_vps_flag, pic_width_vps_in_luma_samples, pic_height_vps_in_luma_samples, bit_depth_vps_luma_minus8, and bit_depth_vps_chroma_minus8, is accessible without entropy decoding. In other words, as illustrated in Table 5, chroma_format_vps_idc, separate_colour_plane_vps_flag, pic_width_vps_in_luma_samples, pic_height_vps_in_luma_samples, bit_depth_vps_luma_minus8, and bit_depth_vps_chroma_minus8 are not entropy coded, i.e., the descriptors are not ue(v). In some examples, each layer may be associated with a particular representation format.

[START EXAMPLE F] Table 6 illustrates an example of other SPS parameters syntax and semantics.

TABLE 6

Other SPS parameters syntax and semantics

| other_sps_parameters( ) { | Descriptor |
|---|---|
|     conformance_window_vps_flag | u(1) |
|     if( conformance_window_vps_flag ) { | |
|         conf_win_vps_left_offset | ue(v) |
|         conf_win_vps_right_offset | ue(v) |
|         conf_win_vps_top_offset | ue(v) |
|         conf_win_vps_bottom_offset | ue(v) |
|     } | |
|     log2_vps_max_pic_order_cnt_lsb_minus4 | ue(v) |
|     log2_vps_min_luma_coding_block_size_minus3 | ue(v) |
|     log2_vps_diff_max_min_luma_coding_block_size | ue(v) |
|     log2_vps_min_transform_block_size_minus2 | ue(v) |
|     log2_vps_diff_max_min_transform_block_size | ue(v) |
|     max_vps_transform_hierarchy_depth_inter | ue(v) |
|     max_vps_transform_hierarchy_depth_intra | ue(v) |
|     scaling_list_enabled_vps_flag | u(1) |
|     if( scaling_list_enabled_vps_flag ) | |
|         sps_scaling_list_data_present_vps_flag | u(1) |
|         if( sps_scaling_list_data_present_vps_flag ) | |
|             scaling_list_data( ) | |
|     } | |
|     amp_enabled_vps_flag | u(1) |
|     sample_adaptive_offset_enabled_vps_flag | u(1) |
|     pcm_enabled_vps_flag | u(1) |
|     if( pcm_enabled_vps_flag ) { | |
|         pcm_vps_sample_bit_depth_luma_minus1 | u(4) |
|         pcm_vps_sample_bit_depth_chroma_minus1 | u(4) |
|         log2_vps_min_pcm_luma_coding_block_size_minus3 | ue(v) |
|         log2_vps_diff_max_min_pcm_luma_coding_block_size | ue(v) |
|         pcm_vps_loop_filter_disabled_flag | u(1) |
|     } | |
|     long_term_ref_pics_present_vps_flag | u(1) |
|     if( long_term_ref_pics_present_vps_flag ) { | |
|         num_long_term_ref_pics_vps | ue(v) |
|         for( i = 0; i < num_long_term_ref_pics_vps; i++ ) { | |
|             lt_ref_pic_poc_lsb_vps[ i ] | u(v) |
|             used_by_curr_pic_lt_vps_flag[ i ] | u(1) |
|         } | |
|     } | |
|     temporal_mvp_enabled_vps_flag | u(1) |
|     strong_intra_smoothing_enabled_vps_flag | u(1) |
| } | |

For each of the syntax elements below, all constraints, if any, that apply to the value of the corresponding SPS syntax element also apply: conformance_window_vps_flag, conf_win_vps_left_offset, conf_win_vps_right_offset, conf_win_vps_top_offset, conf_win_vps_bottom_offset, log 2_vps_max_pic_order_cnt_lsb_minus4, log 2_vps_min_luma_coding_block_size_minus3, log 2_vps_diff_max_min_luma_coding_block_size, log 2_vps_min_transform_block_size_minus2, log 2_vps_diff_max_min_transform_block_size, max_vps_transform_hierarchy_depth_inter, max_vps_transform_hierarchy_depth_intra, scaling_list_enabled_vps_flag, sps_scaling_list_data_present_vps_flag, amp_enabled_vps_flag, sample_adaptive_offset_enabled_vps_flag, pcm_enabled_vps_flag, pcm_vps_sample_bit_depth_luma_minus1, pcm_vps_sample_bit_depth_chroma_minus1, log 2_vps_min_pcm_luma_coding_block_size_minus3, log 2_vps_diff_max_min_pcm_luma_coding_block_size, pcm_vps_loop_filter_disabled_flag, long_term_ref_ pics_present_vps_flag, num_long_term_ref_pics_vps, lt_ref_pic_poc_lsb_vps[i], used_by_curr_pic_lt_vps_flag[i], temporal_mvp_enabled_vps_flag, and strong_intra_smoothing_enabled_vps_flag may be used for inference of the values of the SPS syntax elements conformance_window_flag, conf_win_left_offset, conf_win_right_offset, conf_win_top_offset, conf_win_bottom_offset, log 2_max_pic_order_cnt_lsb_minus4, log 2_min_luma_coding_block_size_minus3, log 2_diff_max_min_luma_coding_block_size, log 2_min_transform_block_size_minus2, log 2_diff_max_min_transform_block_size, max_transform_hierarchy_depth_inter, max_transform_hierarchy_depth_intra, scaling_list_enabled_flag, sps_scaling_list_data_present_flag, amp_enabled_flag, sample_adaptive_offset_enabled_flag, pcm_enabled_flag, pcm_sample_bit_depth_luma_minus1, pcm_sample_bit_depth_chroma_minus1, log 2_min_pcm_luma_coding_block_size_minus3, log 2_diff_max_min_pcm_luma_coding_block_size, pcm_loop_filter_disabled_flag, long_term_ref_pics_present_flag, num_long_term_ref_pics_sps, lt_ref_pic_poc_lsb_sps[i], used_by_curr_pic_t flag[i], sps_temporal_mvp_enabled_flag, and strong_intra_smoothing_enabled_flag, respectively. [END EXAMPLE F]

[START EXAMPLE D] Table 7 illustrates an example of short-term RPS candidates syntax and semantics.

TABLE 7

Short-term RPS candidates syntax and semantics

| | Descriptor |
|---|---|
| short_term_rps_candidates( inferenceEnabledFlag ) { | |
|   num_short_term_ref_pic_sets | ue(v) |
|   if( inferenceEnabledFlag ) | |
|     pred_st_rps_cand_idx_plus1 | u(v) |
|   for( i = 0; i < num_short_term_ref_pic_sets; i++) { | |
|     if( pred_st_rps_cand_idx_plus1 > 0 ) | |
|       pred_from_rps_cand_list_flag[ i ] | u(1) |
|     if( !pred_from_rps_cand_list_flag[ i ] ) | |
|       short_term_ref_pic_set( i ) | |
|     else | |
|       idx_in_rps_cand[ i ] | ue(v) |
|   } | |
| } | |

The parameter num_short_term_ref_pic_sets specifies the number of the following short_term_ref_pic_set( ) syntax structures. The value of num_short_term_ref_pic_sets may be in the range of 0 to 64, inclusive.

NOTE 1—A decoder should allocate memory for a total number of num_short_term_ref_pic_sets+1 short_term_ref_pic_set( ) syntax structures since there may be a short_term_ref_pic_set( ) syntax structure directly signalled in the slice headers of a current picture. A short_term_ref_pic_set( ) syntax structure directly signalled in the slice headers of a current picture has an index equal to num_short_term_ref_pic_sets.

The parameter pred_st_rps_cand_idx_plus1 minus1 specifies the index, into the set of short_term_rps_candidates( ) syntax structures in the VPS, of the short_term_rps_candidates( ) syntax structure that is used to infer at least one short_term_ref_pic_set( ) syntax structure of the current short_term_rps_candidates( ) syntax structure. When not present, pred_st_rps_cand_idx_plus1 may be inferred to be equal to 0. The value of pred_st_rps_cand_idx_plus1 may be in the range of 1 to vps_num_st_rps_candidates−1, inclusive.

Having the pred_from_rps_cand_list_flag[i] equal to 1 specifies the i-th short_term_ref_pic_set( ) syntax structure of the current short_term_rps_candidates( ) syntax structure is not present and set to be one of the short_term_ref_pic_set( ) syntax structures present in another short_term_rps_candidates( ) syntax structure. pred_from_rps_cand_list_flag[i] equal to 0 specifies the i-th short_term_ref_pic_set( ) syntax structure of the current short_term_rps_candidates( ) syntax structure is present. When not present, the value of pred_from_rps_cand_list_flag[i] may be inferred to be equal to 0. [END EXAMPLE D]

Alternatively, pred_from_rps_cand_list_flag[i] equal to 1 specifies that the variables DeltaPocS0, DeltaPocS1, UsedByCurrPicS1, UsedByCurrPicS0, NumPositivePics, NumNegativePics, and NumDeltaPocs corresponding to the i-th short_ter_ref_pic_set( ) are derived to be equal to the variables DeltaPocS0, DeltaPocS1, UsedByCurrPicS1, UsedByCurrPicS0, NumPositivePics, NumNegativePics, and NumDeltaPocs, respectively, that correspond to another short_term_rps_candidates( ) structure.

[START EXAMPLE D] The parameter idx_in_rps_cand[i] specifies the index, into the set of short_term_ref_pic_set( ) syntax structures of the (pred_st_rps_cand_idx_plus1−1)-th short_term_rps_candidates( ) syntax structure in the VPS, of the short_term_ref_pic_set( ) syntax structure that is identical to the i-th short_term_ref_pic_set( ) syntax structure of the current short_term_rps_candidates( ).

When pred_from_rps_cand_list_flag[i] is equal to 1, the i-th short_term_ref_pic_set( ) syntax structure in the current short_term_rps_candidates( ) syntax structure is set to be the same as the idx_in_rps_cand[i]-th short_term_ref_pic_set( ) syntax structure of the (pred_st_rps_cand_idx_plus1−1)-th short_term_rps_candidates( ) syntax structure in the VPS. [END EXAMPLE D]

Alternatively, when pred_from_rps_cand_list_flag[i] is equal to 1, the variables DeltaPocS0, DeltaPocS1, UsedByCurrPicS1, UsedByCurrPicS0, NumPositivePics, NumNegativePics, and NumDeltaPocs corresponding to the i-th short_term_ref_pic_set( ) syntax structure in the current short_term_rps_candidates( ) syntax structure is set to be equal to the variables DeltaPocS0, DeltaPocS1, UsedByCurrPicS1, UsedByCurrPicS0, NumPositivePics, NumNegativePics, and NumDeltaPocs, respectively, that correspond to the idx_in_rps_cand[i]-th short_term_ref_pic_set( ) syntax structure of the (pred_st_rps_cand_idx_plus1−1)-th short_term_rps_candidates( ) syntax structure in the VPS. Table 8 illustrates an example of VUI parameters syntax and semantics.

TABLE 8

VUI parameters syntax and semantics

| | Descriptor |
|---|---|
| vui_parameters( [START EXAMPLE E] timingParamsPresentFlag ) { | |
| [START EXAMPLE E]    vui_parameters_present_flag | u(1) |
|   if( vui_parameters_present_flag ) { [END EXAMPLE E] | |
|     aspect_ratio_info_present_flag | u(1) |
|     if( aspect_ratio_info_present_flag ) { | |
|       aspect_ratio_idc | u(8) |
|       if( aspect_ratio_idc = = EXTENDED_SAR ) { | |
|         sar_width | u(16) |
|         sar_height | u(16) |
|       } | |
|     } | |
|     overscan_info_present_flag | u(1) |
|     if( overscan_info_present_flag ) | |
|       overscan_appropriate_flag | u(1) |
|     video_signal_type_present_flag | u(1) |
|     if( video_signal_type_present_flag ) { | |
|       video_format | u(3) |
|       video_full_range_flag | u(1) |
|       colour_description_present_flag | u(1) |
|       if( colour_description_present_flag ) { | |
|         colour_primaries | u(8) |
|         transfer_characteristics | u(8) |
|         matrix_coeffs | u(8) |
|       } | |
|     } | |
|     chroma_loc_info_present_flag | u(1) |
|     if( chroma_loc_info_present_flag ) { | |
|       chroma_sample_loc_type_top_field | ue(v) |
|       chroma_sample_loc_type_bottom_field | ue(v) |
|     } | |
|     neutral_chroma_indication_flag | u(1) |
|     field_seq_flag | u(1) |
|     frame_field_info_present_flag | u(1) |
|     default_display_window_flag | u(1) |
|     if( default_display_window_flag ) { | |
|       def_disp_win_left_offset | ue(v) |
|       def_disp_win_right_offset | ue(v) |
|       def_disp_win_top_offset | ue(v) |
|       def_disp_win_bottom_offset | ue(v) |
|     } | |
| [START EXAMPLE E]    if( timingParamsPresentFlag ) { [END EXAMPLE E] | |
|     vui_timing_info_present_flag | u(1) |
|     if( vui_timing_info_present_flag ) { | |
|       vui_num_units_in_tick | u(32) |
|       vui_time_scale | u(32) |
|       vui_poc_proportional_to_timing_flag | u(1) |
|       if( vui_poc_proportional_to_timing_flag ) | |
|         vui_num_ticks_poc_diff_one_minus1 | ue(v) |
|       vui_hrd_parameters_present_flag | u(1) |
|       if( vui_hrd_parameters_present_flag ) | |
|         hrd_parameters( 1, sps_max_sub_layers_minus1 ) | |
|     } | |
| [START EXAMPLE E] }    [END EXAMPLE E] | |
|     bitstream_restriction_flag | u(1) |
|     if( bitstream_restriction_flag) { | |
|       tiles_fixed_structure_flag | u(1) |
|       motion_vectors_over_pic_boundaries_flag | u(1) |
|       restricted_ref_pic_lists_flag | u(1) |
|       min_spatial_segmentation_idc | ue(v) |
|       max_bytes_per_pic_denom | ue(v) |
|       max_bits_per_min_cu_denom | ue(v) |
|       log2_max_mv_length_horizontal | ue(v) |
|       log2_max_mv_length_vertical | ue(v) |
|     } | |
| [START EXAMPLE E] }    [END EXAMPLE E] | |
| } | |

[START EXAMPLE E] When timingParamsPresentFlag is equal to 0, the following applies: The values of vui_timing_info_present_flag, vui_num_units_in_tick, vui_time_scale, vui_poc_proportional_to_timing_flag, vui_num_ticks_poc_diff_one_minus1 are inferred to be equal to vps_timing_info_present_flag, vps_num_units_in_tick, vps_time_scale, vps_poc_proportional_to_timing_flag, and vps_num_ticks_poc_diff_one_minus1, respectively. The value of vui_hrd_parameters_present_flag may be inferred to be equal to 0.

The parameter vui_parameters_present_flag equal to 1 specifies that there are more syntax elements in the vui_parameters( ) syntax structure. vui_parameters_present_flag equal to 0 specifies that there is no more syntax elements in the vui_parameters( ) syntax structure . . . [END EXAMPLE E]

In one example, as can be seen in Tables 8, visual signal information (e.g., video_format, video_full_range_flag, colour_primaries, transfer_characteristics, matrix_coeffs) is a subset of the VUI parameters. Further, as illustrated in the example of Table 4 the VUI, and hence the visual signal information, is in the VPS. By combining the information from Table 4 and Table 8 it is shown that the visual signal information is signalled per layer in the VPS.

Table 9 illustrates an example sequence parameter set RBSP syntax and semantics.

TABLE 9

Sequence parameter set RBSP syntax and semantics

| seq_parameter_set_rbsp( ) { | Descriptor |
|---|---|
| sps_video_parameter_set_id | u(4) |
| [START EXAMPLE F] if( nuh_layer_id > 0 ) | |
|    inherit_sps_params_from_vps_ flag | u(1) |
| if( !inherit_sps_params_from_vps_flag ) { [END EXAMPLE F] | |
|    sps_max_sub_layers_minus1 | u(3) |
|    sps_temporal_id_nesting_flag | u(1) |
| [START EXAMPLE F] } [END EXAMPLE F] | |
| if( nuh_layer_id = = 0 ) | |
|    profile_tier_level( 1, sps_max_sub_layers_minus1 ) | |
| sps_seq_parameter_set_id | ue(v) |
| [START EXAMPLE B] if( nuh_layer_id = = 0) { [END EXAMPLE B] | |
|    chroma_format_idc | ue(v) |
|    if( chroma_format_idc = = 3 ) | |
|      separate_colour_plane_flag | u(1) |
|    pic_width_in_luma_samples | ue(v) |
|    pic_height_in_luma_samples | ue(v) |
| [START EXAMPLE B] } [END EXAMPLE B] | |
| [START EXAMPLE F] if( !inherit_sps_params_from_vps_flag ) { [END EXAMPLE F] | |
|    conformance_window_flag | u(1) |
|    if( conformance_window_flag ) { | |
|      conf_win_left_offset | ue(v) |
|      conf_win_right_offset | ue(v) |
|      conf_win_top_offset | ue(v) |
|      conf_win_bottom_offset | ue(v) |
|    } | |
| [START EXAMPLE F] } [END EXAMPLE F] | |
| [START EXAMPLE B] if( nuh_layer_id = = 0) { [END EXAMPLE B] | |
|    bit_depth_luma_minus8 | ue(v) |
|    bit_depth_chroma_minus8 | ue(v) |
| [START EXAMPLE B] } [END EXAMPLE B] | |
| [START EXAMPLE F] if( !inherit_sps_params_from_vps_flag ) { [END EXAMPLE F] | |
|    log2_max_pic_order_cnt_lsb_minus4 | ue(v) |
|    sps_sub_layer_ordering_info_present_flag | u(1) |
|    for( i = ( sps_sub_layer_ordering_info_present_flag ? 0 : sps_max_sub_layers_minus1 ); | |
|      i <= sps_max_sub_layers_minus1; i++) { | |
|      sps_max_dec_pic_buffering_minus1[ i ] | ue(v) |
|      sps_max_num_reorder_pics[ i ] | ue(v) |
|      sps_max_latency_increase_plusl[ i ] | ue(v) |
|    } | |
|    log2_min_luma_coding_block_size_minus3 | ue(v) |
|    log2_diff_max_min_luma_coding_block_size | ue(v) |
|    log2_min_transform_block_size_minus2 | ue(v) |
|    log2_diff_max_min_transform_block_size | ue(v) |
|    max_transform_hierarchy_depth_inter | ue(v) |
|    max_transform_hierarchy_depth_intra | ue(v) |
|    scaling_list_enabled_flag | u(1) |
|    if( scaling_list_enabled_flag ) { | |
|      sps_scaling_list_data_present_flag | u(1) |
|      if( sps_scaling_list_data_present_flag ) | |
|         scaling_list_data( ) | |
|    } | |
|    amp_enabled_flag | u(1) |
|    sample_adaptive_offset_enabled_flag | u(1) |
|    pcm_enabled_flag | u(1) |
|    if( pcm_enabled flag ) { | |
|      pcm_sample_bit_depth_luma_minus1 | u(4) |
|      pcm_sample_bit_depth_chroma_minus1 | u(4) |
|      log2_min_pcm_luma_coding_block_size_minus3 | ue(v) |
|      log2_diff_max_min_pcm_luma_coding_block_size | ue(v) |
|      pcm_loop_filter_disabled_flag | u(1) |
|    } | |

TABLE 9-continued

```
[START EXAMPLE D] short_term_rps_candidates( 0 )
    num_short_term_ref_pic_sets                                    ue(v)
    for( i = 0; i < num_short_term_ref_pic_sets; i++)
        short_term_ref_pic_set( i ) [END EXAMPLE D]
    long_term_ref_pics_present_flag                                u(1)
    if( long_term_ref_pics_present flag ) {
        num_long_term_ref_pics_sps                                 ue(v)
        for( i = 0; i < num_long_term_ref_pics_sps; i++) {
            lt_ref_pic_poc_lsb_ sps[ i ]                           u(v)
            used_by_curr_pic_lt_sps_flag[ i ]                      u(1)
        }
    }
    sps_temporal_mvp_enabled_flag                                  u(1)
    strong_intra_smoothing_enabled_flag                            u(1)
[START EXAMPLE E] vui_parameters_present_flag                      u(1)
    if( vui_parameters_present_flag ) [END EXAMPLE E]
    vui_parameters( [START EXAMPLE E] nuh_layer_id = =
0 [END EXAMPLE E] )
[START EXAMPLE F] } [END EXAMPLE F]
    sps_extension_flag                                             u(1)
    if( sps_extension_flag ) {
        sps_extension( )
        sps_extension2_flag                                        u(1)
        if( sps_extension2_flag )
            while( more_rbsp_data( ) )
                sps_extension_data_flag                            u(1)
    }
    rbsp_trailing_bits( )
}
```

[START EXAMPLE B]

When nuh_layer_id of the SPS is equal to 0, the values of chroma_format_idc, separate_colour_plane_flag, pic_width_in_luma_samples, pic_height_in_luma_samples, bit_depth_luma_minus8, and bit_depth_chroma_minus8 may be equal to chroma_format_vps_idc, separate_colour_plane_vps_flag, pic_width_vps_in_luma_samples, pic_height_vps_in_luma_samples, bit_depth_vps_luma_minus8, and bit_depth_vps_chroma_minus8, respectively, of the 0-th rep_format( ) syntax structure in the active VPS.

For each layer with nuh_layer_id greater than 0 that refers to the SPS, let layerIdx be set equal to the value for which layer_id_in_nuh[layerIdx] is equal to the nuh_layer_id of the layer, the following applies: [END EXAMPLE B]

[START EXAMPLE A] When nuh_layer_id of the SPS is equal to 0, the profile_tier_level( ) syntax structure in the SPS is ignored. [END EXAMPLE A]

As illustrated in Table 8 and Table 9, no timing information is signalled in an SPS VUI, e.g., for any layer greater than layer 0.

[START EXAMPLE B] The values of chroma_format_idc, separate_colour_plane_flag, pic_width_in_luma_samples, pic_height_in_luma_samples, bit_depth_luma_minus8, and bit_depth_chroma_minus8 are inferred to be equal to chroma_format_vps_idc, separate_colour_plane_vps_flag, pic_width_vps_in_luma_samples, pic_height_vps_in_luma_samples, bit_depth_vps_luma_minus8, and bit_depth_vps_chroma_minus8, respectively, of the vps_rep_format_idx [layerIdx]-th rep_format( ) syntax structure in the active VPS, regardless of whether these syntax elements are present in the VPS. [END EXAMPLE B]

[START EXAMPLE F] The parameterinherit_sps_params_from_vps_flag equal to 1 specifies that, for the SPS RBSP, the values of all syntax elements and syntax structures until the syntax element sps_extension_flag, other than the syntax elements sps_video_parameter_set_id and sps_seq_parameter_set_id, may be inherited from the active VPS. inherit_sps_params_from_vps_flag equal to 0 specifies that these values are not inherited from the active VPS. When not present, the value of inherit_sps_params_from_vps_flag may be inferred to be equal to 0. When vps_num_rep_formats, vps_num_other_sps_params, vps_num_st_rps_candidates, or vps_num_vui_params is equal to 0, the value of inherit_sps_params_from_vps_flag may be equal to 0. When inherit_sps_params_from_vps_flag is equal to 1, the following applies: [END EXAMPLE F]

[START EXAMPLE C] The value of sps_max_sub_layers_minus1 for each layer that refers to the SPS may be inferred to be equal to max_sub_layers_vps_minus1[layerIdx] where layerIdx is equal to the value for which layer_id_in_nuh[layerIdx] is equal to the nuh_layer_id of the layer.

The values of sps_max_dec_pic_buffering_minus1[i] for each layer that refers to the SPS may be inferred to be equal to max_vps_dec_pic_buffering_minus1[1sIdx][i] for i in the range of 0 to MaxSubLayers[1xIdx]−1, inclusive, where 1sIdx is in the range of 0 to vps_num_layer_sets_minus1, inclusive, and denotes the index, into the set of output layer sets that is specified by the VPS, of the output layer set for which the layer is the highest layer and the only target output layer.

The values of sps_max_num_reorder_pics[i], and sps_max_latency_increase_plus1[i] for each layer that refers to the SPS are inferred to be equal to max_vps_num_reorder_pics[layerIdx][i] and max_vps_latency_increase_plus1 [layerIdx][i], where layerIdx is equal to the value for which layer_id_in_nuh[layerIdx] is equal to the nuh_layer_id of the layer, for i in the range of 0 to sps_max_sub_layers_minus1, inclusive. The value of sps_temporal_id_nesting_flag for each layer that refers to the SPS may be inferred to be equal to vps_temporal_id_nesting_flag. [END EXAMPLE C]

As can be seen from the above discussion and Table 9, some examples do not signal sps_max_sub_layers_minus1 and sps_temporal_id_nesting_flag when nuh_layer_id_>0.

[START EXAMPLE F] The values of conformance_window_flag, conf_win_left_offset, conf_win_right_offset, conf_win_top_offset, conf_win_bottom_offset, log 2_max_pic_order_cnt_lsb_minus4, log 2_min_luma_coding_block_size_minus3, log 2_diff_max_min_luma_coding_block_size, log 2_min_transform_block_size_minus2, log 2_diff_max_min_transform_block_size, max_transform_hierarchy_depth_inter, max_transform_hierarchy_depth_intra, scaling_list_enabled_flag, sps_scaling_list_data_present_flag, amp_enabled_flag, sample_adaptive_offset_enabled_flag, pcm_enabled_flag, pcm_sample_bit_depth_luma_minus1, pcm_sample_bit_depth_chroma_minus1, log 2_min_pcm_luma_coding_block_size_minus3, log 2_diff_max_min_pcm_luma_coding_block_size, pcm_loop_filter_disabled_flag, long_term_ref_pics_present_flag, num_long_term_ref_pics_sps, lt_ref_pic_poc_lsb_sps[i], used_by_curr_pic_lt_flag[i], sps_temporal_mvp_enabled_flag, and strong_intra_smoothing_enabled_flag for each layer that refers to the SPS are inferred to be equal to conformance_window_vps_flag, conf_win_vps_left_offset, conf_win_vps_right_offset, conf_win_vps_top_offset, conf_win_vps_bottom_offset, log 2_vps_max_pic_order_cnt_lsb_minus4, log 2_vps_min_luma_coding_block_size_minus3, log 2_vps_diff_max_min_luma_coding_block_size, log 2_vps_min_transform_block_size_minus2, log 2_vps_diff_max_min_transform_block_size, max_vps_transform_hierarchy_depth_inter, max_vps_transform_hierarchy_depth_intra, scaling_list_enabled_vps_flag, sps_scaling_list_data_present_vps_flag, amp_enabled_vps_flag, sample_adaptive_offset_enabled_vps_flag, pcm_enabled_vps_flag, pcm_vps_sample_bit_depth_luma_minus1, pcm_vps_sample_bit_depth_chroma_minus1, log 2_vps_min_pcm_luma_coding_block_size_minus3, log 2_vps_diff_max_min_pcm_luma_coding_block_size, pcm_vps_loop_filter_disabled_flag, long_term_ref_pics_present_vps_flag, num_long_term_ref_pics_vps, lt_ref_pic_poc_lsb_vps[i], used_by_curr_pic_lt_vps_flag[i], temporal_mvp_enabled_vps_flag, and strong_intra_smoothing_enabled_vps_flag, respectively, of the vps_other_sps_params_idx[layerIdx]-th other_sps_parameters( ) syntax structure in the active VPS, where layerIdx is equal to the value for which layer_id_in_nuh[layerIdx] is equal to the nuh_layer_id of the layer.

When sps_scaling_list_data_present_vps_flag is equal to 1, the value of the syntax structure scaling_list_data( ) for each layer that refers to the SPS may be inferred to be equal to the syntax structure scaling_list_data( ) in the vps_other_sps_params_idx[layerIdx]-th other_sps_parameters( ) syntax structure in the active VPS, where layerIdx is equal to the value for which layer_id_in_nuh[layerIdx] may be equal to the nuh_layer_id of the layer. [END EXAMPLE F]

[START EXAMPLE D] The value of the syntax structure short_term_rps_candidates( ) for each layer that refers to the SPS may be inferred to be equal to the vps_st_rps_idx[layerIdx]-th short_term_rps_candidates( ) syntax structure in the active VPS, where layerIdx is equal to the value for which layer_id_in_nuh[layerIdx] is equal to the nuh_layer_id of the layer. [END EXAMPLE D]

[START EXAMPLE E] In some examples, the value of the syntax structure vui_parameters( ) for each layer that refers to the SPS may be inferred to be equal to the vps_vui_params_idx[layerIdx]-th vui_parameters( ) syntax structure in the active VPS, where layerIdx is equal to the value for which layer_id_in_nuh[layerIdx] is equal to the nuh_layer_id of the layer. [END EXAMPLE E]

. . .

The parameter conf_win_left_offset, conf_win_right_offset, conf_win_top_offset, and conf_win_bottom_offset specify the samples of the pictures in the coded video stream (CVS) that are output from the decoding process, in terms of a rectangular region specified in picture coordinates for output. When [START EXAMPLE F] inherit_sps_params_from_vps_flag is equal to 0 and [END EXAMPLE F] conformance_window_flag is equal to 0, the values of conf_win_left_offset, conf_win_right_offset, conf_win_top_offset, and conf_win_bottom_offset may be inferred to be equal to 0.

The conformance cropping window contains the luma samples with horizontal picture coordinates from SubWidthC*conf_win_left_offset to pic_width_in_luma_samples−(SubWidthC*conf_win_right_offset+1) and vertical picture coordinates from SubHeightC*conf_win_top_offset to pic_height_in_luma_samples−(SubHeightC*conf_win_bottom_offset+1), inclusive.

The value of SubWidthC*(conf_win_left_offset+conf_win_right_offset) may be less than pic_width_in_luma_samples, and the value of SubHeightC*(conf_win_top_offset+conf_win_bottom_offset) may be less than pic_height_in_luma_samples.

When ChromaArrayType is not equal to 0, the corresponding specified samples of the two chroma arrays are the samples having picture coordinates (x/SubWidthC, y/SubHeightC), where (x,y) are the picture coordinates of the specified luma samples.

NOTE 3—The conformance cropping window offset parameters are only applied at the output. All internal decoding processes are applied to the uncropped picture size.

. . .

The parameter sps_sub_layer_ordering_info_present_flag equal to 1[START EXAMPLE C], when inherit_sps_params_from_vps_flag is equal to 0, [END EXAMPLE C] specifies that sps_max_dec_pic_buffering_minus1[i], sps_max_num_reorder_pics[i], and sps_max_latency_increase_plus1[i] are present for sps_max_sub_layers_minus1+1 sub-layers. sps_sub_layer_ordering_info_present_flag equal to 0[START EXAMPLE C], when inherit_sps_params_from_vps_flag is equal to 0, [END EXAMPLE C] specifies that the values of sps_max_dec_pic_buffering_minus1[sps_max_sub_layers_minus1], sps_max_num_reorder_pics[sps_max_sub_layers_minus1], and sps_max_latency_increase_plus1[sps_max_sub_layers_minus1] apply to all sub-layers.

The parameter sps_max_dec_pic_buffering_minus1[i] plus 1 specifies the maximum required size of the decoded picture buffer for the CVS in units of picture storage buffers when HighestTid is equal to i. In some examples, the value of sps_max_dec_pic_buffering_minus1[i] may be in the range of 0 to MaxDpbSize−1 (as specified in subclause A.4), inclusive. When i is greater than 0, sps_max_dec_pic_buffering_minus1[i] may be greater than or equal to sps_max_dec_pic_buffering_minus1[i−1]. The value of sps_max_dec_pic_buffering_minus1[i] may be less than or equal to vps_max_dec_pic_buffering_minus1[i] for each value of i. When [START EXAMPLE C] inherit_sps_params_from_vps_flag is equal to 0 and [END EXAMPLE C] sps_max_dec_pic_buffering_minus1[i] is not present for i in the range of 0 to sps_max_sub_layers_minus1−1, inclusive, due to sps_sub_layer_ordering_info_present_flag being equal to 0, it may be inferred to be equal to sps_max_dec_pic_buffering_minus1[sps_max_sub_layers_minus1].

The parameter sps_max_num_reorder_pics[i] indicates the maximum allowed number of pictures that can precede any picture in the CVS in decoding order and follow that picture in output order when HighestTid is equal to i. The value of sps_max_num_reorder_pics[i] may be in the range of 0 to sps_max_dec_pic_buffering_minus1[i], inclusive. When i is greater than 0, sps_max_num_reorder_pics[i] may be greater than or equal to sps_max_num_reorder_pics[i−1]. The value of sps_max_num_reorder_pics[i] may be less than or equal to vps_max_num_reorder_pics[i] for each value of i. When [START EXAMPLE C] inherit_sps_params_from_vps_flag is equal to 0 and [END EXAMPLE C] sps_max_num_reorder_pics[i] is not present for i in the range of 0 to sps_max_sub_layers_minus1−1, inclusive, due to sps_sub_layer_ordering_info_present_flag being equal to 0, it may be inferred to be equal to sps_max_num_reorder_pics[sps_max_sub_layers_minus1].

The parameter sps_max_latency_increase_plus1[i] not equal to 0 is used to compute the value of SpsMaxLatencyPictures[i], which specifies the maximum number of pictures that can precede any picture in the CVS in output order and follow that picture in decoding order when HighestTid is equal to i.

When sps_max_latency_increase_plus1[i] is not equal to 0, the value of SpsMaxLatencyPictures[i] is specified as follows: SpsMaxLatencyPictures[i]=sps_max_num_reorder_pics[i]+(7-9)

sps_max_latency_increase_plus1[i]−1

When sps_max_latency_increase_plus1[i] is equal to 0, no corresponding limit is expressed. In some examples, the value of sps_max_latency_increase_plus1[i] may be in the range of 0 to 232-2, inclusive. In some examples, when vps_max_latency_increase_plus1[i] is not equal to 0, the value of sps_max_latency_increase_plus1 [i] may not be equal to 0 and may be less than or equal to vps_max_latency_increase_plus1 [i] for each value of i. When [START EXAMPLE C] inherit_sps_params_from_vps_flag is equal to 0 and [END EXAMPLE C] sps_max_latency_increase_plus1[i] is not present for i in the range of 0 to sps_max_sub_layers_minus1−1, inclusive, due to sps_sub_layer_ordering_info_present_flag being equal to 0, it may be inferred to be equal to sps_max_latency_increase_plus1[sps_max_sub_layers_minus1].

. . .

The parameter sps_scaling_list_data_present_flag equal to 1 specifies that scaling list data are present in the SPS [START EXAMPLE F] or inherited from the active VPS [END EXAMPLE F]. In some examples, sps_scaling_list_data_present_flag equal to 0 specifies that scaling list data are not present in the SPS [START EXAMPLE F] and not inherited from the active VPS [END EXAMPLE F]. When [START EXAMPLE F] inherit_sps_params_from_vps_flag is equal to 0 and sps_scaling_list_data_present_flag [END EXAMPLE F] is not present, the value of sps_scaling_list_data_present_flag may be inferred to be equal to 0. When scaling_list_enabled_flag is equal to 1 and sps_scaling_list_data_present_flag is equal to 0, the default scaling list data are used to derive the array ScalingFactor as described in the scaling list data semantics specified in subclause 7.4.5 of the HEVC standard.

The parameter pcm_loop_filter_disabled_flag specifies whether the loop filter process is disabled on reconstructed samples in a coding unit with pcm_flag equal to 1 as follow: If pcm_loop_filter_disabled_flag is equal to 1, the deblocking filter and sample adaptive offset filter processes on the reconstructed samples in a coding unit with pcm_flag equal to 1 are disabled. Otherwise (pcm_loop_filter_disabled_flag value is equal to 0), the deblocking filter and sample adaptive offset filter processes on the reconstructed samples in a coding unit with pcm_flag equal to 1 are not disabled.

When [START EXAMPLE F] inherit_sps_params_from_vps_flag is equal to 0 and [END EXAMPLE F] pcm_loop_filter_disabled_flag is not present, it may be inferred to be equal to 0.

[START EXAMPLE D] num_short_term_ref _pic_sets specifies the number of short_term_ref_pic _set( ) syntax structures included in the SPS. The value of num_short_term_ref _pic_sets shall be in the range of 60 to 64, inclusive. NOTE 5 A decoder should allocate money for a total number of num_short_term_ref num_short_term_ref _pic_sets + 1 short- _term_ref_pic_set ( ) syntax structure since there may be a short _term_ref_pic_set ( ) syntax structure directly signalled in the slice headers of a current picture. A short_term _ref_pic_set( ) syntax structure directly signalled in the slice headers of a current picture has an index equal to num_short_term _ref_pic_sets. [END EXAMPLE D]

. . .

The parameter lt_ref_pic_poc_lsb_sps[i] specifies the picture order count modulo MaxPicOrderCntLsb of the i-th candidate long-term reference picture specified [START EXAMPLE F] by in [END EXAMPLE F] the SPS. The number of bits used to represent lt_ref_pic_poc_lsb_sps[i] is equal to log 2_max_pic_order_cnt_lsb_minus4+4.

The parameter used_by_curr_pic_lt_sps_flag[i] equal to 0 specifies that the i-th candidate long-term reference picture specified [START EXAMPLE F] by in [END EXAMPLE F] the SPS is not used for reference by a picture that includes in its long-term RPS the i-th candidate long-term reference picture specified [START EXAMPLE F] by in [END EXAMPLE F] the SPS.

. . .

[START EXAMPLE E] vui_parametes_present _flag equal to 1 specifies that the vui_parameters ( ) syntax structure as specified in Annex E is present. vui_parameters_present _flag equal to 0 specifies that the vui_parameters( ) snytax structure as specified in Annex E is not present. [END EXAMPLE E]

Figure 4:
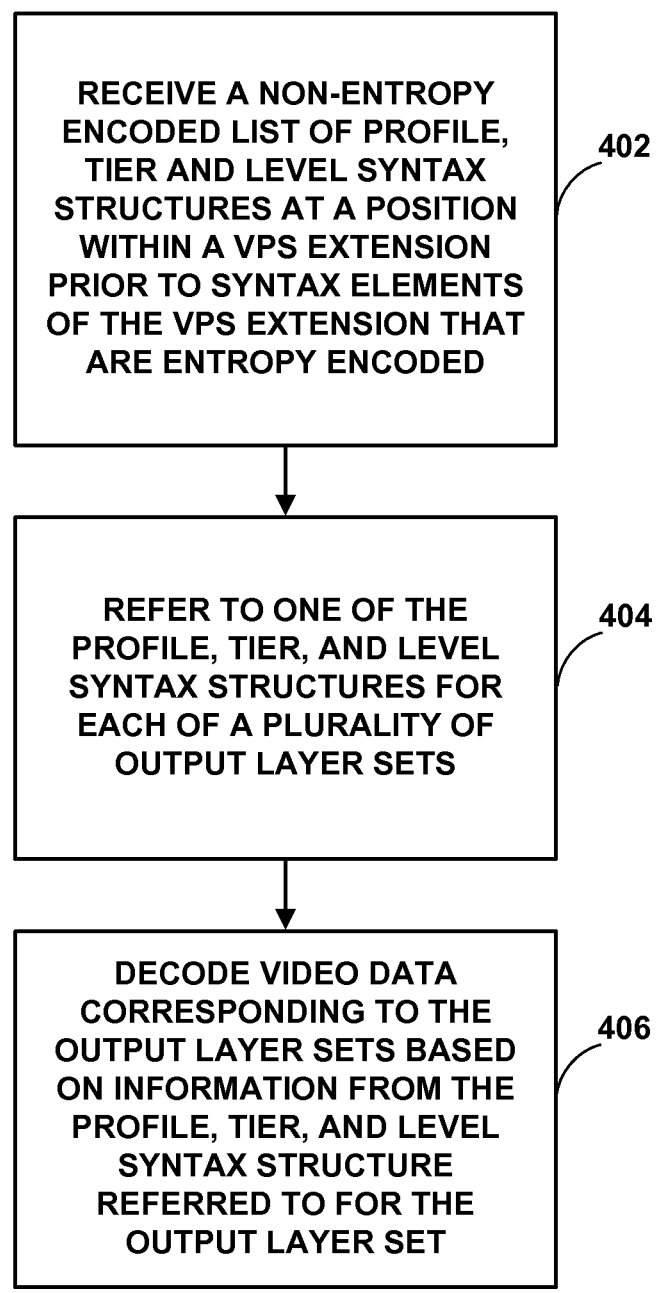
FIG. 4 is a flowchart illustrating an example method for decoding video data in accordance with the systems and methods described herein.

FIG. 4 is a flowchart illustrating an example method for decoding video data in accordance with the systems and methods described herein. In the illustrated example of FIG. 4, a video decoder 30 may receive a non-entropy encoded set of profile, tier, and level syntax structures (402). The non-entropy encoded set of profile, tier, and level syntax structures may be at a position within a VPS extension prior to syntax elements of the VPS extension that are entropy encoded.

Video decoder 30 may refer to one of the profile, tier, and level syntax structures for each of a plurality of output layer sets (404) and decode video data of one of the output layer sets based on information from the profile, tier, and level syntax structure referred to for the output layer set (406). For example, video decoder 30 may ignore an output layer set if the profile, tier, and level of the bitstream of the output layer set indicate that a higher capability than the decoding capability of video decoder 30, as indicated by the decoder's profile, tier, and level, is needed for decoding of the bitstream. When the required decoding capability, as indicated by the profile, tier, and level of the bitstream of the output layer set, is not higher than the decoding capability of video decoder 30, video decoder 30 decodes the bitstream of the output layer set using the required decoding processes as indicated by the profile, tier, and level of the bitstream.

In some examples, video decoder 30 may receive an SPS with a nuh_layer_id equal to 0, wherein the SPS includes a profile, tier, and level syntax structure for a layer of video data.

In some examples, video decoder 30 may receive an output layer flag [i][j] that, when equal to 1, specifies that a j-th layer in the layer set is a target output layer of an i-th output layer set, and, when equal to 0, specifies that the j-th layer in the layer set is not the target output layer of the i-th output layer set. For example, video encoder 20 may transmit an output layer flag [i][j] that, when equal to 1, specifies that a j-th layer in the layer set is a target output layer of an i-th output layer set, and, when equal to 0, specifies that the j-th layer in the layer set is not the target output layer of the i-th output layer set. Video decoder 30 may transmit an output layer flag [i][j] that, when equal to 1, specifies that a j-th layer in the layer set is a target output layer of an i-th output layer set, and, when equal to 0, specifies that the j-th layer in the layer set is not the target output layer of the i-th output layer set.

Video decoder 30 may also generate the output layer set based on the output layer flag [i][j]. For example, video encoder 20 may also encode the output layer set based on the output layer flag [i][j].

Figure 5:
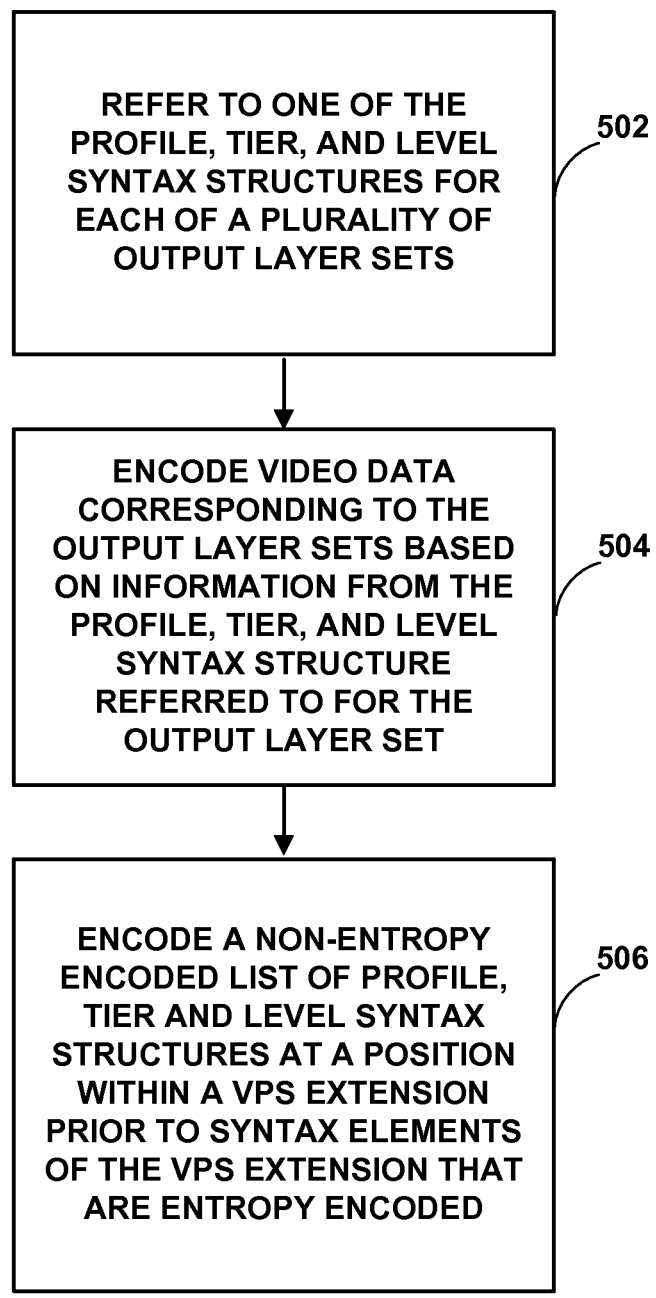
FIG. 5 is a flowchart illustrating another example method for encoding video data in accordance with the systems and methods described herein.

FIG. 5 is a flowchart illustrating an example method for encoding video data in accordance with the systems and methods described herein. In the illustrated example of FIG. 5, video encoder 20 may generate an output layer set based on the output layer flag [i][j]. For example, video encoder 20 may refer to one of the profile, tier, and level syntax structures for each of a plurality of output layer sets (502). Video encoder 20 may also encode the output layer set based on the output layer flag [i][j](504).

Video encoder 20 may encode a VPS with VPS extension having a non-entropy encoded set of profile, tier, and level syntax structures (506). In some examples, video encoder 20 may transmit, store, or cause to be stored the VPS and VPS extension having a non-entropy encoded set of profile, tier, and level syntax structures. The non-entropy encoded set of profile, tier, and level syntax structures may be at a position within a VPS extension prior to syntax elements of the VPS extension that are entropy encoded. For example, video encoder 20 may encode video data according to a profile, tier, level that is selected. Video encoder 20 may also encode the profile, tier, level syntax in the VPS for use by the decoder.

In some examples, video encoder 20 may encode an SPS with a nuh_layer_id equal to 0, wherein the SPS includes a profile, tier, and level syntax structure for a layer of video data. For example, video encoder 20 may send an SPS with a nuh_layer_id equal to 0, wherein the SPS includes a profile, tier, and level syntax structure for a layer of video data. When an SPS with nuh_layer_id equal to 0 is referred by a layer with nuh_layer_id greater than 0, the profile_tier_level( ) syntax structure in the SPS is not applied for that layer.

Accordingly, as can be seen above, each layer needs to refer to an SPS. Conventionally, any two layers that are of different values of spatial resolutions, bit depths, or color formats have to refer to two different SPSs as these representation format parameters are signalled in the SPS. However, when these parameters for all SPSs except those with nuh_layer_id equal to 0 are moved to the VPS, and when it is specified that the representation format parameters in an SPS with nuh_layer_id equal to 0 that is referred to by a layer with nuh_layer_id greater than 0 are ignored, it is possible for layers with different values of spatial resolutions, bit depths, or color formats to refer to the same SPSs. In other words, according to some embodiments of this disclosure, layers with different values of spatial resolutions, bit depths, or color formats can share the same SPS, as long as other SPS parameters required for the layers are the same.

In some examples, video encoder 20 may transmit an output layer flag [i][j] that, when equal to 1, specifies that a j-th layer in the layer set is a target output layer of an i-th output layer set, and, when equal to 0, specifies that the j-th layer in the layer set is not the target output layer of the i-th output layer set. For examples, video encoder 20 may transmit an output layer flag [i][j] that, when equal to 1, specifies that a j-th layer in the layer set is a target output layer of an i-th output layer set, and, when equal to 0, specifies that the j-th layer in the layer set is not the target output layer of the i-th output layer set.

Figure 6:
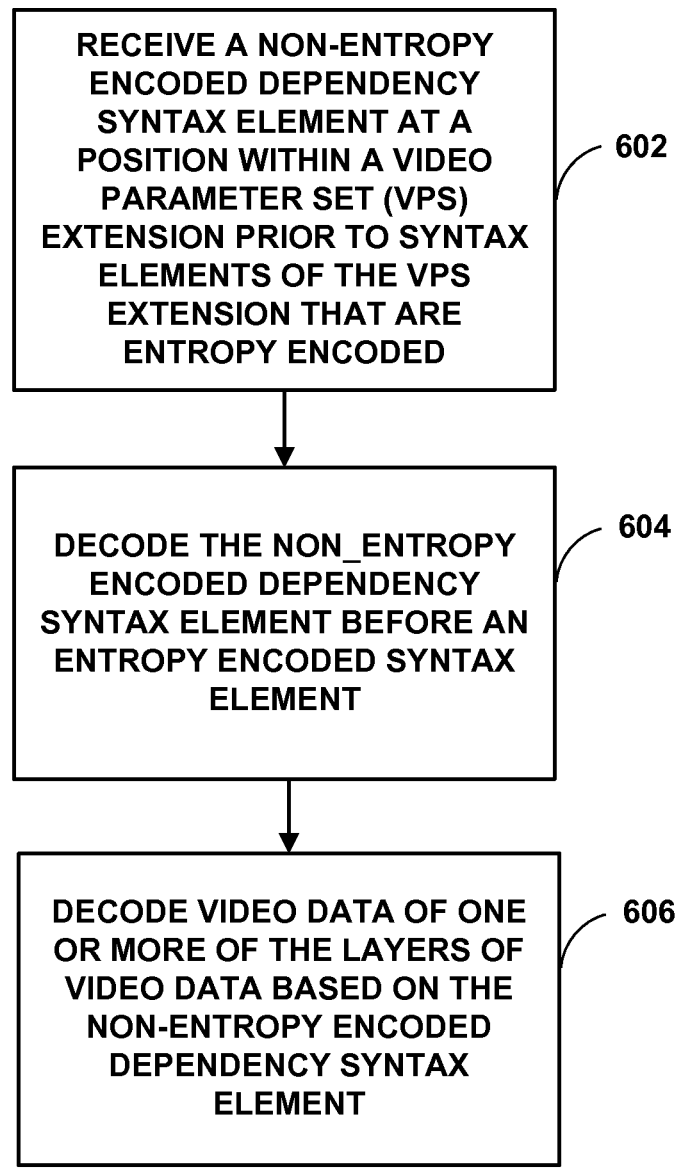
FIG. 6 is a flowchart illustrating an example method for decoding video data in accordance with the systems and methods described herein.

FIG. 6 is a flowchart illustrating an example method for decoding video data in accordance with the systems and methods described herein. In the illustrated example of FIG. 6, a video decoder 30 may receive a non-entropy encoded layer dependency information at a position within a VPS extension prior to syntax elements of the VPS extension that are entropy encoded (602).

Video decoder 30 may decode the non-entropy encoded layer dependency information before an entropy encoded syntax element (604). In an example, video decoder 30 may decode the non-entropy encoded layer dependency information before any entropy encoded syntax element.

Video decoder 30 may decode video data of one or more of the layers of video data based on the non-entropy encoded layer dependency information (606). The layer dependency information may indicate whether one of the layers is a direct reference layer for another of the layers. In some examples, when the layer dependency information indicates whether one of the layers is a direct reference layer for another of the layers, the layer dependency information may also indicate which one of the layers is a direct reference layer for another of the layers. In other words, the layer dependency information may indicate whether one of the layers is a direct reference layer for another of the layers and identify the one of the layers that is a direct reference layer for another of the layers. In some examples, the layer dependency information includes a direct_dependency_flag [i][j] that, when equal to 0, specifies that a layer with index j is not a direct reference layer for a layer with index i, and when equal to 1, specifies that the layer with index j may be a direct reference layer for the layer with index i. When decoding a picture, video decoder 30 may derive an inter-layer reference picture set based on the layer dependency information, among other information, and may further derive a reference picture list based on the inter-layer reference picture set, among other information, and then may decode the picture using inter-layer prediction from a picture in a direct reference layer.

Figure 7:
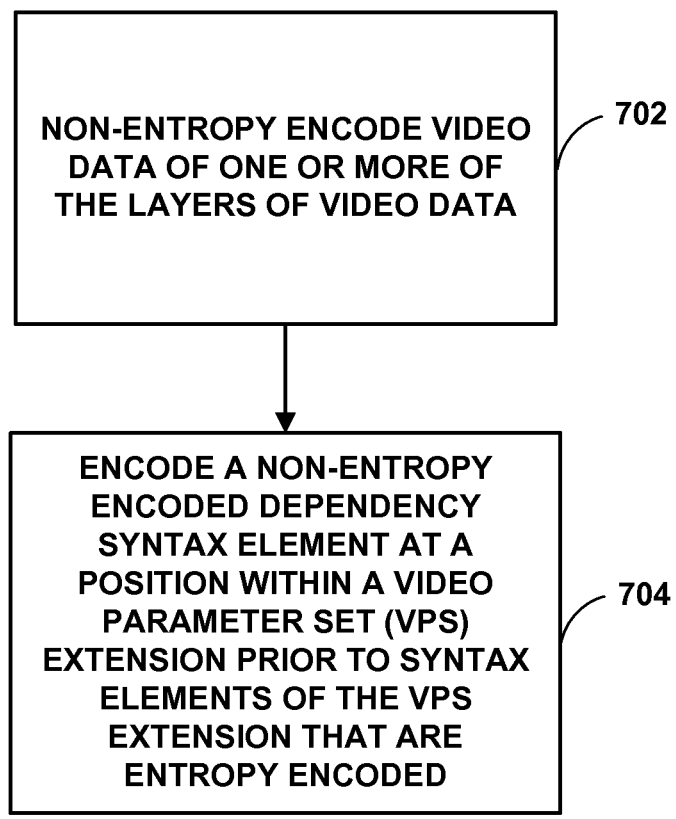
FIG. 7 is a flowchart illustrating an example method for encoding video data in accordance with the systems and methods described herein.

FIG. 7 is a flowchart illustrating an example method for encoding video data in accordance with the systems and methods described herein. Video encoder 20 may encode video data of one or more of the layers of video data based on a non-entropy encoded layer dependency information (702). Video encoder 20 may encode a non-entropy encoded layer dependency information at a position within a video parameter set (VPS) extension prior to syntax elements of the VPS extension that are entropy encoded (704). For example, video encoder 20 may encode video data of one or more of the layers of video data based on the non-entropy encoded layer dependency information. The layer dependency information may indicate whether one of the layers is a direct reference layer for another of the layers. In some examples, video encoder 20 may transmit, store, or cause to be stored a non-entropy encoded layer dependency information at a position within a video parameter set (VPS) extension prior to syntax elements of the VPS extension that are entropy encoded.

In some examples, the layer dependency information includes a direct_dependency_flag[i][j] that, when equal to 0, specifies that a layer with index j is not a direct reference layer for a layer with index i, and when equal to 1, specifies that the layer with index j may be a direct reference layer for the layer with index i.

Figure 8:
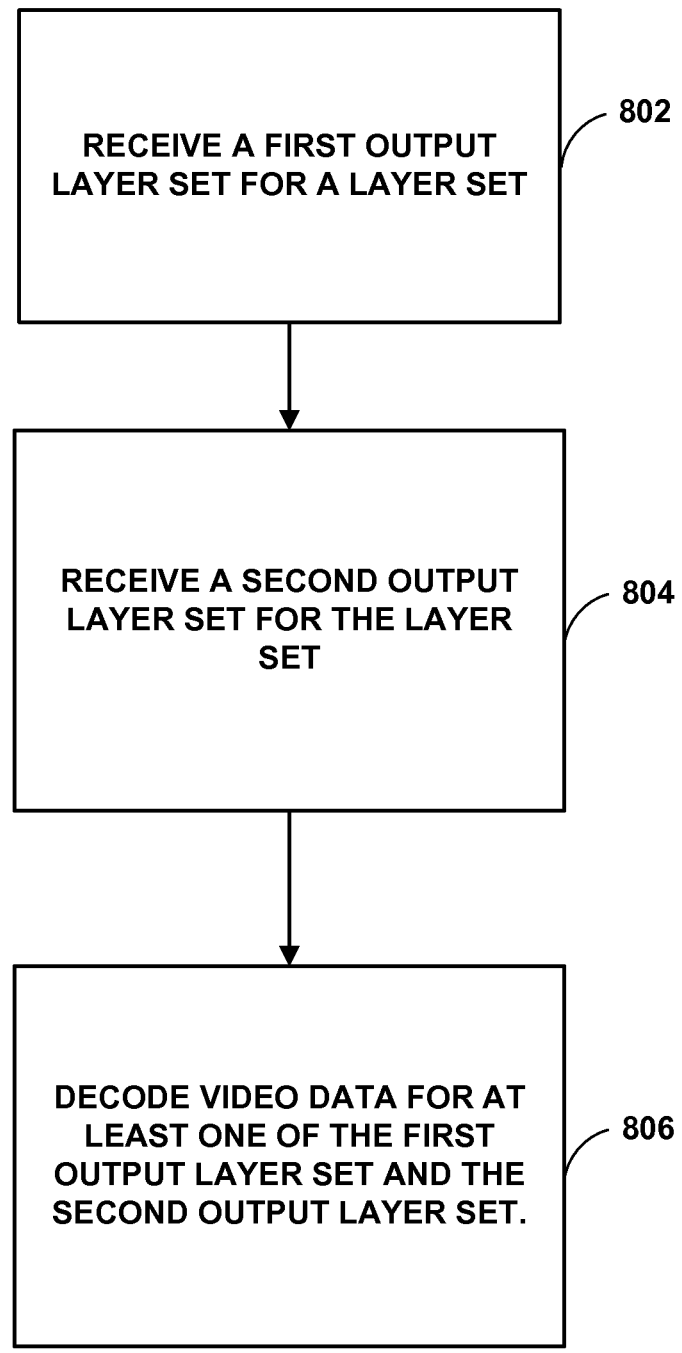
FIG. 8 is a flowchart illustrating an example method for decoding video data in accordance with the systems and methods described herein.

FIG. 8 is a flowchart illustrating an example method for decoding video data in accordance with the systems and methods described herein. In the example of FIG. 8, more than one output layer set may be signalled for one layer set. Accordingly, if more than one output layer set is signalled for one layer set a video decoder 30, e.g., by way of input interface 28, may receive a first output layer set for a layer set (802). Video decoder 30 may also receive a second output layer set for the layer set (804). Furthermore, while the example of FIG. 8 illustrates two output layer set for one layer set, it will be understood that three, four, or even more output layer sets may be signalled for a layer set. Video decoder 30 may decode video data for at least one of the first output layer set and the second output layer set (806).

Figure 9:
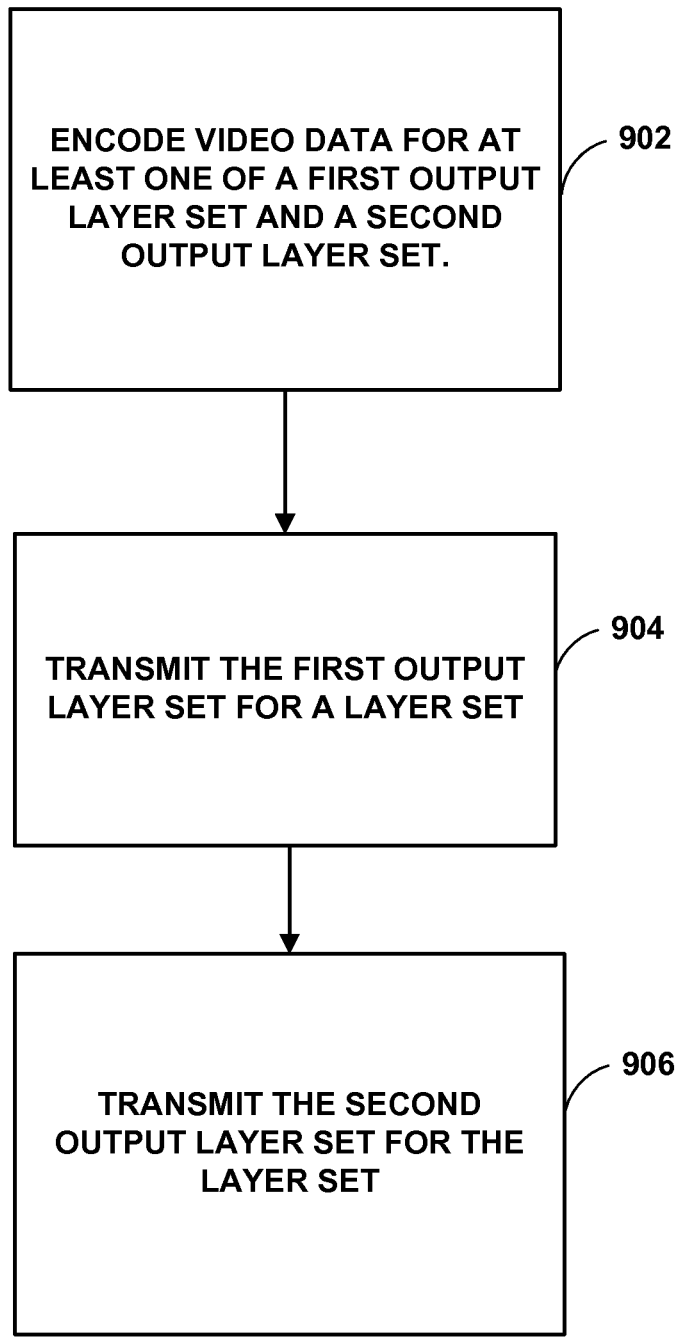
FIG. 9 is a flowchart illustrating an example method for encoding video data in accordance with the systems and methods described herein.

FIG. 9 is a flowchart illustrating an example method for encoding video data in accordance with the systems and methods described herein. In the example of FIG. 9, more than one output layer set may be signalled for one layer set. Accordingly, video encoder 20 may encode video data for at least one of a first output layer set and a second output layer set (902). Accordingly, output interface 22 may transmit encoded data from video encoder 20. The data transmitted may include the first output layer set for a layer set (904) and the second output layer set for the layer set (906). In some examples, output interface 22 may transmit the data to input interface 28. In other examples, output interface 22 may transmit the data to storage device 34 for storage.

Figure 10:
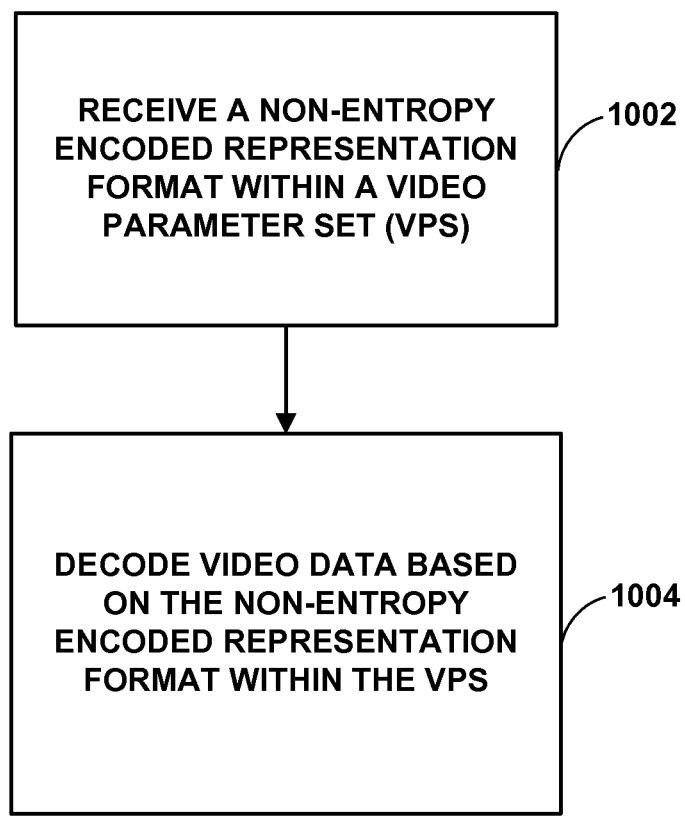
FIG. 10 is a flowchart illustrating an example method for decoding video data in accordance with the systems and methods described herein.

FIG. 10 is a flowchart illustrating an example method for decoding video data in accordance with the systems and methods described herein. The example of FIG. 10 illustrates signaling of representation format in the VPS, potentially in a way that it is accessible without entropy decoding. In other words, a representation format in the VPS is not entropy encoded. It may, for example, be fixed length coded. Accordingly, video decoder 30 may receive a non-entropy encoded representation format within a VPS, e.g., through input interface 28 (1002). The representation format may include one or more of chroma format, whether different colour planes are separately coded, picture width, picture height, luma bit depth, and chroma bit depth. Video decoder 30 may also decode video data based on the non-entropy encoded representation format within the VPS (1004). Because the representation format is in the VPS potentially in a way that it is accessible without entropy decoding devices that do not perform entropy coding may have access to the representation format, for example, in some cases a Media Aware Network Entities (MANEs) may not have an entropy coding device. Video decoder 30 may decode representation format in the VPS, potentially without entropy decoding in accordance with the techniques of this disclosure, and each layer may be associated with a particular representation format.

Figure 11:
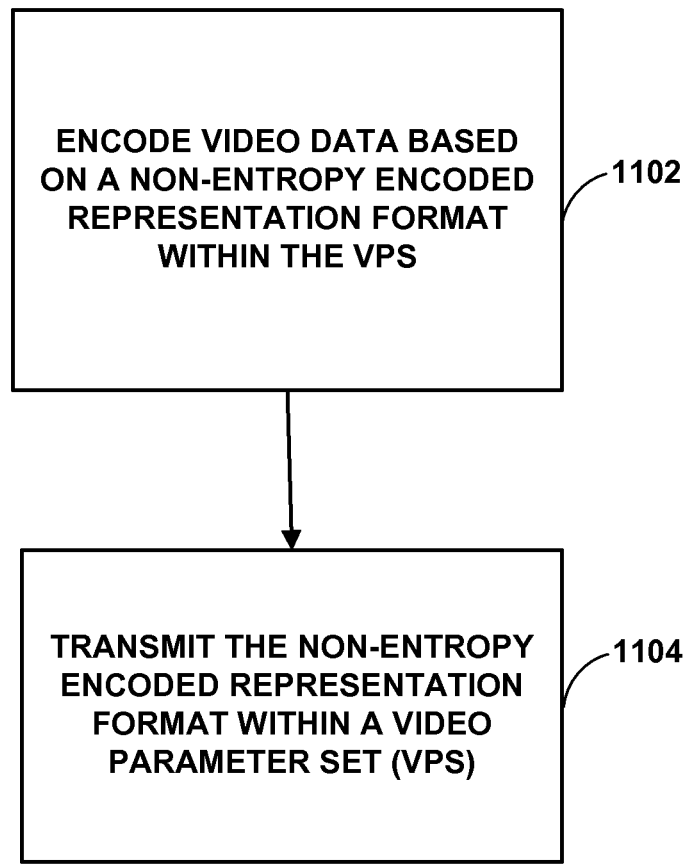
FIG. 11 is a flowchart illustrating an example method for encoding video data in accordance with the systems and methods described herein.

FIG. 11 is a flowchart illustrating an example method for encoding video data in accordance with the systems and methods described herein. The example of FIG. 11 illustrates signaling of representation format in the VPS, potentially in a way that it is accessible without entropy decoding. In other words, a representation format in the VPS is not entropy encoded. It may be, for example, fixed length coded. Accordingly, video encoder 20 may encode video data based on the non-entropy encoded representation format within the VPS (1102). The representation format may include one or more of chroma format, whether different colour planes are separately coded, picture width, picture height, luma bit depth, and chroma bit depth. Video encoder 20 may transmit a non-entropy encoded representation format within a VPS (1104). Video encoder 20 may encode representation format in the VPS, in a way that is accessible without entropy decoding in accordance with the techniques of this disclosure, and each layer may be associated with a particular representation format.

Figure 12:
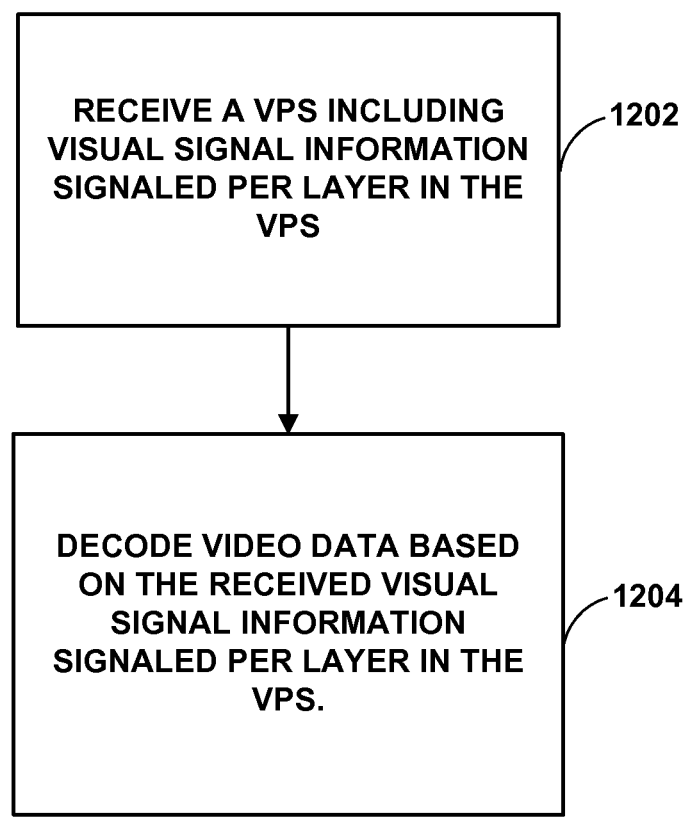
FIG. 12 is a flowchart illustrating an example method for decoding video data in accordance with the systems and methods described herein.

FIG. 12 is a flowchart illustrating an example method for encoding video data in accordance with the systems and methods described herein. The example of FIG. 12 illustrates signaling of visual signal information, e.g., video_format, video_full_range_flag, colour_primaries, transfer_characteristics, matrix_coeffs, per layer in the VPS. Accordingly, video decoder 30 may receive a VPS including a series of layers, each layer including visual signal information (1002). Video decoder 30 may also decode video data based on the received visual signal information signalled per layer in the VPS.

Figure 13:
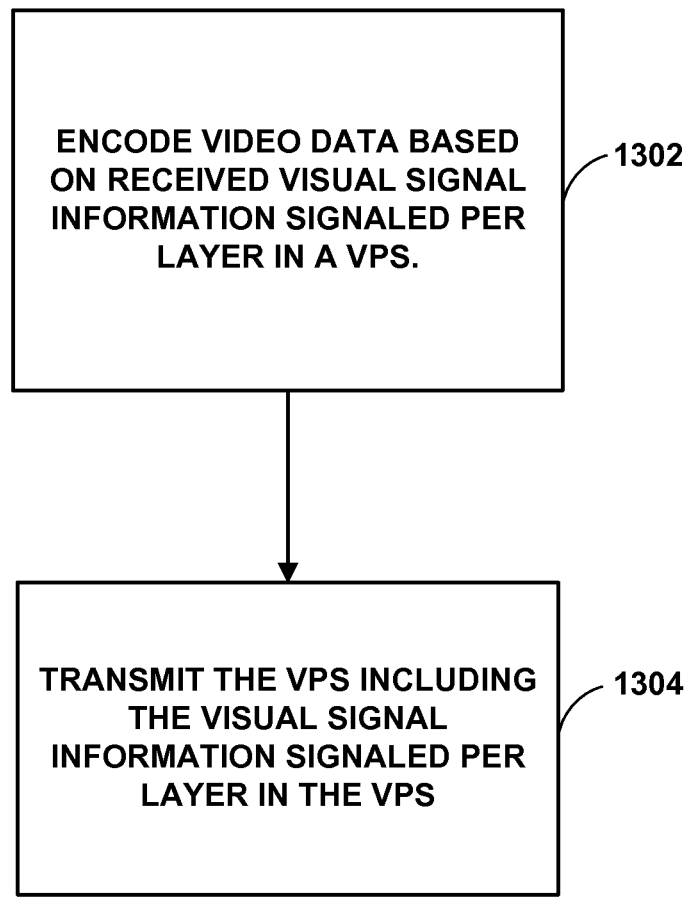
FIG. 13 is a flowchart illustrating an example method for encoding video data in accordance with the systems and methods described herein.

FIG. 13 is a flowchart illustrating an example method for encoding video data in accordance with the systems and methods described herein. The example of FIG. 13 illustrates signaling of visual signal information, e.g., video_format, video_full_range_flag, colour_primaries, transfer_characteristics, matrix_coeffs, per layer in the VPS. Accordingly, video encoder 20 may encode video data based on the received visual signal information signalled per layer in the VPS (1302). Video encoder 20 may transmit the VPS including a series of layers, each layer including visual signal information for each of a series of layers (1304).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of intraoperative hardware units, including one or more processors as described above, in conjunction with suitable software and/or firmware.

Various examples have been described. These and other examples are within the scope of the following claims.

What is claimed is:

1. A method of decoding multilayer video data, the method comprising:
    for each respective layer in a plurality of layers, receiving, within a video parameter set (VPS), a respective syntax element specifying an index, into a list of syntax structures, of a syntax structure that applies to the respective layer, wherein each respective syntax structure in the list of syntax structures includes one or more of: a syntax element specifying a chroma format for a layer to which the respective syntax structure applies, a syntax element specifying whether different color planes are separately coded in the layer to which the respective syntax structure applies, a syntax element specifying a picture width for the layer to which the respective syntax structure applies, a syntax element specifying a picture height for the layer to which the respective syntax structure applies, a syntax element specifying a luma bit depth for the layer to which the respective syntax structure applies, or a syntax element specifying a chroma bit depth for the layer to which the respective syntax structure applies;
    parsing the following syntax elements from a sequence parameter set (SPS) only if a layer identifier of the SPS is equal to 0: a syntax element specifying a chroma format, a syntax element specifying whether different color planes are separately coded, a syntax element specifying a picture width, a syntax element specifying a picture height, a syntax element specifying a luma bit depth, and a syntax element specifying a chroma bit depth; and
    decoding the multilayer video data based on at least one of the syntax structures.

2. The method of claim 1, wherein the syntax element specifying the chroma format, the syntax element specifying whether different color planes are separately coded, the syntax element specifying the picture width, the syntax element specifying the picture height, the syntax element specifying the luma bit depth, and the syntax element specifying the chroma bit depth are represented by chroma_format_vps_idc, separate_colour_plane_vps_flag, pic_width_vps_in_luma_samples, pic_height_vps_in_luma_samples, bit_depth_vps_luma_minus8, and bit_depth_vps_chroma_minus8 syntax elements, respectively.

3. The method of claim 2, wherein one or more of the chroma_format_idc, separate_colour_plane_flag, pic_width_in_luma_samples, pic_height_in_luma_samples, bit_depth_luma_minus8, or bit_depth_chroma_minus8 syntax elements are fixed length coded.

4. The method of claim 3, wherein the chroma_format_idc syntax element is fixed length coded with a length of 2 bits, the separate_colour_plane_flag syntax element is fixed length coded with a length of 1 bit, the pic_width_in_luma_samples syntax element is fixed length coded with a length of 16 bits, the pic_height_in_luma_samples syntax element is fixed length coded with a length of 16 bits, the bit_depth_luma_minus8 syntax element is fixed length coded with a length of 3 bits, and the bit_depth_chroma_minus8 syntax element is fixed length coded with a length of 3 bits.

5. The method of claim 1, further comprising receiving visual signal information signaled for each layer in the VPS.

6. The method of claim 5, wherein visual signal information includes one or more of the following parameters: video_format, video_full_range_flag, colour_primaries, transfer_characteristics, or matrix_coeffs.

7. A method of encoding multilayer video data, the method comprising:
    generating the following syntax elements from a sequence parameter set (SPS) only if a layer identifier of the SPS is equal to 0: a syntax element specifying a chroma format, a syntax element specifying whether different color planes are separately coded, a syntax element specifying a picture width, a syntax element specifying a picture height, a syntax element specifying a luma bit depth, and a syntax element specifying a chroma bit depth;
    encoding the multilayer video data based on at least one syntax structure of a list of syntax structures, wherein each respective syntax structure in the list of syntax structures includes one or more of: a syntax element specifying a chroma format for a layer to which the respective syntax structure applies, a syntax element specifying whether different color planes are separately coded in the layer to which the respective syntax structure applies, a syntax element specifying a picture width for the layer to which the respective syntax structure applies, a syntax element specifying a picture height for the layer to which the respective syntax structure applies, a syntax element specifying a luma bit depth for the layer to which the respective syntax structure applies, or a syntax element specifying a chroma bit depth for the layer to which the respective syntax structure applies; and for each respective layer in a plurality of layers of the multilayer video data, transmitting, within the VPS, a respective syntax element specifying an index, into the list of syntax structures, of the syntax structure that applies to the respective layer.

8. The method of claim 7, wherein the syntax element specifying the chroma format, the syntax element specifying whether different color planes are separately coded, the syntax element specifying the picture width, the syntax element specifying the picture height, the syntax element specifying the luma bit depth, and the syntax element specifying the chroma bit depth are represented by chroma_format_vps_idc, separate_colour_plane_vps_flag, pic_width_vps_in_luma_samples, pic_height_vps_in_luma_samples, bit_depth_vps_luma_minus8, and bit_depth_vps_chroma_minus8 syntax elements, respectively.

9. The method of claim 8, wherein one or more of the chroma_format_idc, separate_colour_plane_flag, pic_width_in_luma_samples, pic_height_in_luma_samples, bit_depth_luma_minus8, or bit_depth_chroma_minus8 syntax elements are fixed length coded.

10. The method of claim 9, wherein the chroma_format_idc syntax element is fixed length coded with a length of 2 bits, the separate_colour_plane_flag syntax element is fixed length coded with a length of 1 bit, the pic_width_in_luma_samples syntax element is fixed length coded with a length of 16 bits, the pic_height_in_luma_samples syntax element is fixed length coded with a length of 16 bits, the bit_depth_luma_minus8 syntax element is fixed length coded with a length of 3 bits, and the bit_depth_chroma_minus8 syntax element is fixed length coded with a length of 3 bits.

11. The method of claim 7, further comprising signaling of visual signal information and wherein the signaling of visual information is for each layer in the VPS.

12. The method of claim 11, wherein visual signal information includes one or more of the following parameters: video_format, video_full_range_flag, colour_primaries, transfer_characteristics, or matrix_coeffs.

13. An apparatus for decoding multilayer video data comprising:

a memory configured to store the multilayer video data; and one or more processors configured to:

for each respective layer in a plurality of layers, receive, within a video parameter set (VPS), a respective syntax element specifying an index, into a list of syntax structures, of a syntax structure that applies to the respective layer, wherein each respective syntax structure in the list of syntax structures includes one or more of: a syntax element specifying a chroma format for a layer to which the respective syntax structure applies, a syntax element specifying whether different color planes are separately coded in the layer to which the respective syntax structure applies, a syntax element specifying a picture width for the layer to which the respective syntax structure applies, a syntax element specifying a picture height for the layer to which the respective syntax structure applies, a syntax element specifying a luma bit depth for the layer to which the respective syntax structure applies, or a syntax element specifying a chroma bit depth for the layer to which the respective syntax structure applies;

parse the following syntax elements from a sequence parameter set (SPS) only if a layer identifier of the SPS is equal to 0: a syntax element specifying a chroma format, a syntax element specifying whether different color planes are separately coded, a syntax element specifying a picture width, a syntax element specifying a picture height, a syntax element specifying a luma bit depth, and a syntax element specifying a chroma bit depth; and decode the multilayer video data based on at least one of the syntax structures.

14. The apparatus of claim 13, wherein the syntax element specifying the chroma format, the syntax element specifying whether different color planes are separately coded, the syntax element specifying the picture width, the syntax element specifying the picture height, the syntax element specifying the luma bit depth, and the syntax element specifying the chroma bit depth are represented by chroma_format_vps_idc, separate_colour_plane_vps_flag, pic_width_vps_in_luma_samples, pic_height_vps_in_luma_samples, bit_depth_vps_luma_minus8, and bit_depth_vps_chroma_minus8 syntax elements, respectively.

15. The apparatus of claim 14, wherein one or more of the chroma_format_idc, separate_colour_plane_flag, pic_width_in_luma_samples, pic_height_in_luma_samples, bit_depth_luma_minus8, or bit_depth_chroma_minus8 syntax elements are fixed length coded.

16. The apparatus of claim 15, wherein the chroma_format_idc syntax element is fixed length coded with a length of 2 bits, the separate_colour_plane_flag syntax element is fixed length coded with a length of 1 bit, the pic_width_in_luma_samples syntax element is fixed length coded with a length of 16 bits, the pic_height_in_luma_samples syntax element is fixed length coded with a length of 16 bits, the bit_depth_luma_minus8 syntax element is fixed length coded with a length of 3 bits, and the bit_depth_chroma_minus8 syntax element is fixed length coded with a length of 3 bits.

17. The apparatus of claim 13, further comprising receiving visual signal information signaled for each layer in the VPS.

18. The apparatus of claim 17, wherein visual signal information includes one or more of the following parameters: video_format, video_full_range_flag, colour_primaries, transfer_characteristics, or matrix_coeffs.

19. An apparatus for decoding multilayer video data comprising:

for each respective layer in a plurality of layers, means for receiving, within a video parameter set (VPS), a respective syntax element specifying an index, into a list of syntax structures, of a syntax structure that applies to the respective layer, wherein each respective syntax structure in the list of syntax structures includes one or more of: a syntax element specifying a chroma format for a layer to which the respective syntax structure applies, a syntax element specifying whether different color planes are separately coded in the layer to which the respective syntax structure applies, a syntax element specifying a picture width for the layer to which the respective syntax structure applies, a syntax element specifying a picture height for the layer to which the respective syntax structure applies, a syntax element specifying a luma bit depth for the layer to which the respective syntax structure applies, or a syntax element specifying a chroma bit depth for the layer to which the respective syntax structure applies;

means for parsing the following syntax elements from a sequence parameter set (SPS) only if a layer identifier of the SPS is equal to 0: a syntax element specifying a chroma format, a syntax element specifying whether different color planes are separately coded, a syntax element specifying a picture width, a syntax element specifying a picture height, a syntax element specifying a luma bit depth, and a syntax element specifying a chroma bit depth; and means for decoding the multilayer video data based on at least one of the syntax structures.

20. A non-transitory computer readable storage medium storing instructions that upon execution by one or more processors cause the one or more processors to:

for each respective layer in a plurality of layers, receive, within a video parameter set (VPS), a respective syntax element specifying an index, into a list of syntax structures, of a syntax structure that applies to the respective layer, wherein each respective syntax structure in the list of syntax structures includes one or more of: a syntax element specifying a chroma format for a layer to which the respective syntax structure applies, a syntax element specifying whether different color planes are separately coded in the layer to which the respective syntax structure applies, a syntax element specifying a picture width for the layer to which the respective syntax structure applies, a syntax element specifying a picture height for the layer to which the respective syntax structure applies, a syntax element specifying a luma bit depth for the layer to which the respective syntax structure applies, or a syntax element specifying a chroma bit depth for the layer to which the respective syntax structure applies;

parse the following syntax elements from a sequence parameter set (SPS) only if a layer identifier of the SPS is equal to 0: a syntax element specifying a chroma format, a syntax element specifying whether different color planes are separately coded, a syntax element specifying a picture width, a syntax element specifying a picture height, a syntax element specifying a luma bit depth, and a syntax element specifying a chroma bit depth; and decode the multilayer video data based on at least one of the syntax structures.

* * * * *